US012804346B2

(12) United States Patent
Munoz et al.

(10) Patent No.: US 12,804,346 B2
(45) Date of Patent: Nov. 17, 2026

(54) SOUND FIELD ADJUSTMENT

(71) Applicant: QUALCOMM Incorporated, San Diego, CA (US)

(72) Inventors: Isaac Garcia Munoz, San Diego, CA (US); Shankar Thagadur Shivappa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 18/762,208

(22) Filed: Jul. 2, 2024

(65) Prior Publication Data

US 2025/0024219 A1 Jan. 16, 2025

Related U.S. Application Data

(60) Provisional application No. 63/513,297, filed on Jul. 12, 2023.

(51) Int. Cl.
*H04S 7/00* (2006.01)

(52) U.S. Cl.
CPC .................................... *H04S 7/304* (2013.01)

(58) Field of Classification Search
CPC ............................. H04S 7/304; H04S 2420/01
USPC .................. 381/303, 304, 305, 309, 310, 26
See application file for complete search history.

(56) References Cited

U.S. PATENT DOCUMENTS

| | | | | |
|---|---|---|---|---|
| 7,492,915 | B2 * | 2/2009 | Jahnke | H04S 7/30 345/473 |
| 11,089,425 | B2 * | 8/2021 | Lee | H04R 5/04 |
| 11,653,166 | B2 * | 5/2023 | Thagadur | H04S 7/303 381/303 |
| 2006/0287748 | A1 * | 12/2006 | Layton | H04S 3/00 700/94 |
| 2014/0328505 | A1 * | 11/2014 | Heinemann | G06F 3/012 381/303 |
| 2017/0295446 | A1 * | 10/2017 | Thagadur Shivappa | G06F 3/16 |
| 2019/0246236 | A1 * | 8/2019 | Ehara | G10L 19/008 |
| 2020/0094141 | A1 * | 3/2020 | Fersch | G09G 5/36 |
| 2022/0225050 | A1 | 7/2022 | Ninan et al. | |

OTHER PUBLICATIONS

International Search Report and Written Opinion—PCT/US2024/036689—ISA/EPO—Oct. 17, 2024.

* cited by examiner

*Primary Examiner* — Xu Mei
(74) *Attorney, Agent, or Firm* — QUALCOMM Incorporated; Espartaco Diaz Hidalgo

(57) ABSTRACT

A device includes a memory configured to store audio data associated with an immersive audio environment. The device also includes one or more processors configured to obtain a listener pose in the immersive audio environment associated with a first time and determine whether the listener pose is associated with a pre-rendered asset. The one or more processors are configured to obtain a rendered asset by selecting, based on the determination, between obtaining the pre-rendered asset and performing a rendering operation to generate the rendered asset. The one or more processors are also configured to generate an output audio signal based on the rendered asset.

20 Claims, 41 Drawing Sheets

SOUND FIELD ADJUSTMENT

I. CROSS-REFERENCE TO RELATED APPLICATIONS

The present application claims priority from Provisional Patent Application No. 63/513,297, filed Jul. 12, 2023, entitled "SOUND FIELD ADJUSTMENT," the content of which is incorporated herein by reference in its entirety.

II. FIELD

The present disclosure is generally related to adjusting sound fields.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

One application of such devices includes providing immersive audio to a user. As an example, a headphone device worn by a user can receive streaming audio data from a remote server for playback to the user. Conventional multi-source spatial audio systems are often designed to use a relatively high complexity rendering of audio streams from multiple audio sources with the goal of ensuring that a worst-case performance of the headphone device still results in an acceptable quality of the immersive audio that is provided to the user. However, real-time local rendering of immersive audio is resource intensive (e.g., in terms of processor cycles, time, power, and memory utilization).

Another conventional approach is to offload local rendering of the immersive audio to the streaming device. For example, the headphone device can detect a rotation of the user's head and transmit head tracking information to a remote server. The remote server updates an audio scene based on the head tracking information, generates binaural audio data based on the updated audio scene, and transmits the binaural audio data to the headphone device for playback to the user.

Performing audio scene updates and binauralization at the remote server enables the user to experience an immersive audio experience via a headphone device that has relatively limited processing resources. However, due to latencies associated with transmitting the head tracking information to the remote server, updating the audio data based on the head rotation, and transmitting the updated binaural audio data to the headphone device, such a system can result in an unnaturally high motion-to-sound latency. In other words, the time delay between a rotation of the user's head and the corresponding modified spatial audio being played out at the user's ears can be unnaturally long, which may diminish the user's immersive audio experience.

IV. SUMMARY

According to a particular implementation of the techniques disclosed herein, a device includes a memory configured to store audio data associated with an immersive audio environment. The device also includes one or more processors configured to obtain a listener pose in the immersive audio environment. The one or more processors are configured to determine whether an asset associated with the listener pose is stored locally at the memory. The one or more processors are configured to, based on the determination, select whether to retrieve the asset from the memory or to obtain the asset from a remote device. The one or more processors are also configured to generate an output audio signal based on the asset.

According to a particular implementation of the techniques disclosed herein, a method includes obtaining, at one or more processors, a listener pose in an immersive audio environment. The method includes determining, at the one or more processors, whether an asset associated with the listener pose is stored locally at a memory. The method includes selecting, at the one or more processors and based on the determination, whether to retrieve the asset from the memory or to obtain the asset from a remote device. The method also includes generating, at the one or more processors, an output audio signal based on the asset.

According to a particular implementation of the techniques disclosed herein, a computer-readable device stores instructions that are executable by one or more processors to cause the one or more processors to obtaining a listener pose in an immersive audio environment. The instructions are executable by one or more processors to cause the one or more processors to determine whether an asset associated with the listener pose is stored locally at a memory. The instructions are executable by one or more processors to cause the one or more processors to select, based on the determination, whether to retrieve the asset from the memory or to obtain the asset from a remote device. The instructions are executable by one or more processors to also cause the one or more processors to generate an output audio signal based on the asset.

According to a particular implementation of the techniques disclosed herein, an apparatus includes means for obtaining a listener pose in an immersive audio environment. The apparatus includes means for determining whether an asset associated with the listener pose is stored locally at a memory. The apparatus includes means for selecting, based on the determination, whether to retrieve the asset from the memory or to obtain the asset from a remote device. The apparatus includes means for generating an output audio signal based on the asset.

According to a particular implementation of the techniques disclosed herein, a device includes a memory configured to store audio data associated an immersive audio environment. The device includes one or more processors configured to obtain a listener pose in the immersive audio environment associated with a first time. The one or more processors are configured to determine whether the listener pose is associated with a pre-rendered asset. The one or more processors are configured to obtain a rendered asset by selecting, based on the determination, between obtaining the pre-rendered asset and performing a rendering operation to generate the rendered asset. The one or more processors are configured to generate an output audio signal based on the rendered asset.

According to a particular implementation of the techniques disclosed herein, a method includes obtaining a listener pose in an immersive audio environment associated with a first time. The method includes determining whether the listener pose is associated with a pre-rendered asset. The method includes obtaining a rendered asset by selecting, based on the determination, between obtaining the pre-rendered asset and performing a rendering operation to generate the rendered asset. The method includes generating an output audio signal based on the rendered asset.

According to a particular implementation of the techniques disclosed herein, a computer-readable device stores instructions that are executable by one or more processors to cause the one or more processors to obtain a listener pose in an immersive audio environment associated with a first time. The instructions cause the one or more processors to determine whether the listener pose is associated with a pre-rendered asset. The instructions cause the one or more processors to obtain a rendered asset by selecting, based on the determination, between obtaining the pre-rendered asset and performing a rendering operation to generate the rendered asset. The instructions cause the one or more processors to generate an output audio signal based on the rendered asset.

According to a particular implementation of the techniques disclosed herein, an apparatus includes means for obtaining a listener pose in an immersive audio environment associated with a first time. The apparatus includes means for determining whether the listener pose is associated with a pre-rendered asset. The apparatus includes means for obtaining a rendered asset by selecting, based on the determination, between obtaining the pre-rendered asset and performing a rendering operation to generate the rendered asset. The apparatus includes means for generating an output audio signal based on the rendered asset.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
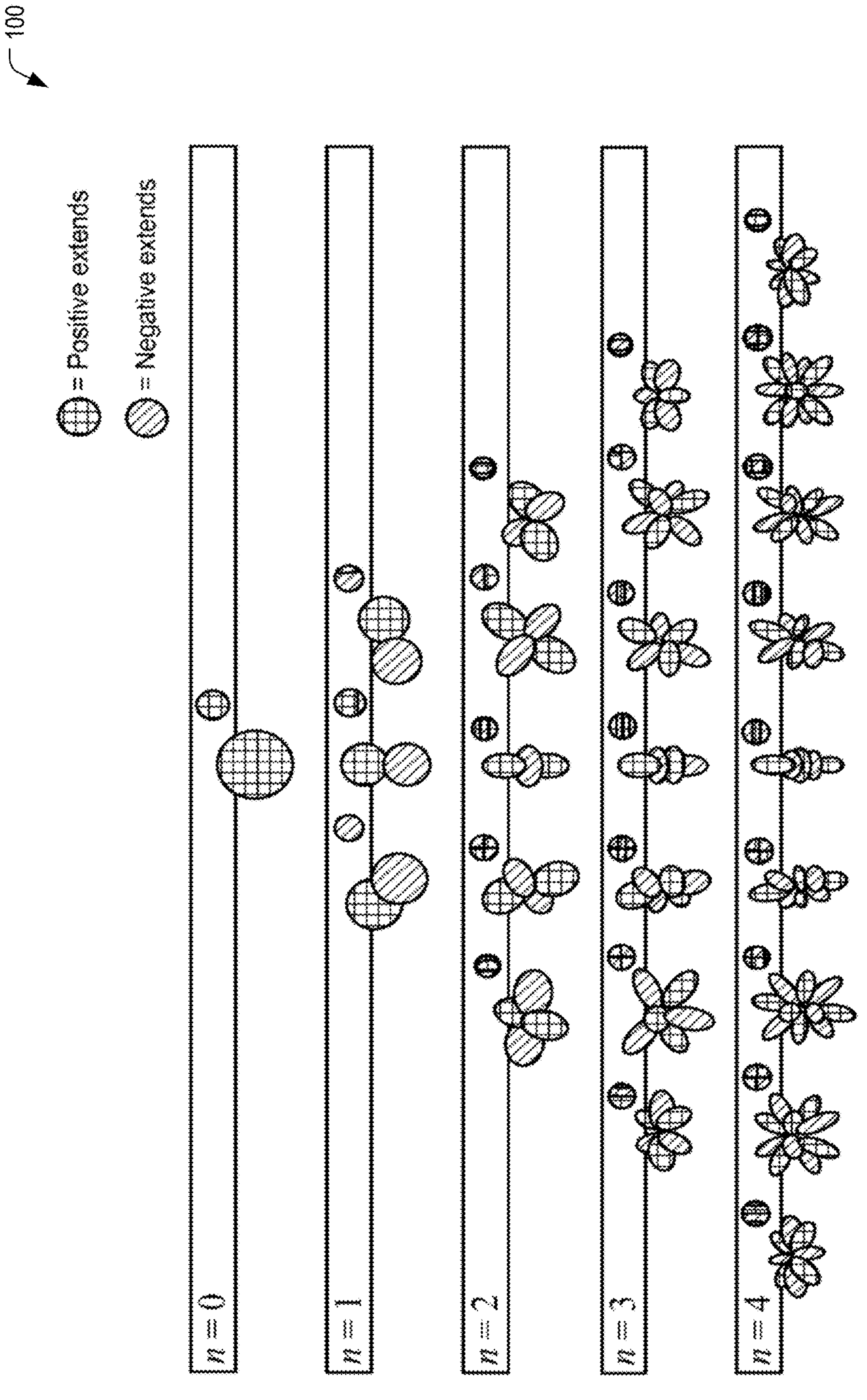
FIG. 1 is a diagram illustrating spherical harmonic basis functions of various orders and sub-orders.

Systems and methods for providing immersive audio based on pre-rendered assets are described. The described systems and methods conserve computing resources and power of a user device by pre-rendering immersive audio data for some listener poses. For example, in many applications, at least some of the poses that a listener can have are known in advance. To illustrate, in a game that includes immersive audio, at least the starting location and orientation of the user may be controlled by the game and known in advance. In other examples, various waypoints in the game can be controlled and associated with listener poses that are known in advance. To illustrate, when a user enters a new room in a game map through a door, the user can be entering a new immersive audio scene and may be expected to start at a particular location and orientation relative to the immersive audio environment based on a location of an entry point (e.g., a door or portal). Other listener poses may not be controlled but can be expected to occur for many listeners. For example, users of an augmented reality application (e.g., a museum tour guide application) may be free to move to any location; however, certain listener poses that are likely to occur can be known in advance based on the locations and orientations of popular waypoints, such as popular museum displays.

In a particular aspect, an asset representing an immersive audio scene at a particular listener pose can be rendered in advance (e.g., at a remote device such as a streaming server, or at a local device such as a media player) and stored for use when the listener has the particular listener pose. In this context, "rendering" refers to processing the immersive audio scene to determine sound field characteristics associated with a location of a listener in the immersive audio environment. For example, rendering can be performed using a Multi-Point Higher-Order Ambisonics (MO-HOA) stage of a renderer operating according to a Moving Picture Experts Group (MPEG) specification.

A rendered asset (whether pre-rendered or rendered as needed, e.g., in real-time) can include, for example, data describing sound from a plurality of sound sources of the immersive audio environment as such sound sources would be perceived by a listener at a particular position in the immersive audio environment or at the particular position and a particular orientation in the immersive audio environment. For example, for a particular listener pose, the rendered asset can include data representing sound field characteristics such as: an azimuth ($\theta$) and an elevation ($\varphi$) of a direction of an average intensity vector associated with a set of sources of the immersive audio environment; a signal energy (e) associated with the set of sources of the immersive audio environment; a direct-to-total energy ratio (r) associated with the set of sources of the immersive audio environment; and an interpolated audio signal($\hat{s}$) for the set of sources of the immersive audio environment. In this example, each of these sound field characteristics can be calculated for each, frame (f), sub-frame (k), and frequency bin (b).

When an asset is rendered as needed (e.g., is not pre-rendered, also referred to herein as a non-rendered asset), determining the data elements of sound field characteristics listed above is computationally complex and uses significant resources, (such as computing cycles, time, power, and memory). Accordingly, pre-rendering an asset can shift the resource burden associated with rendering operations to a device that has greater resource availability. To illustrate, pre-rendering can be performed at a server such that pre-rendered assets can be provided to multiple immersive audio player devices, thus enabling such assets to be rendered once rather than by each of the multiple immersive audio player devices. Further, many immersive audio player devices may be configured to be portable, and as a result may have less powerful processors, fewer processors, less available memory, limited power (e.g., battery power), or a combination thereof, as compared to a server computer or server system. Thus, shifting rendering operations to the server computer can improve a user-experience associated with playout of the immersive audio environment at an immersive audio player device. Even if the immersive audio player device is used to pre-render the asset, the user-experience can be improved by scheduling the pre-rendering operations at a convenient time, such as when the immersive audio player device is plugged in to a power source or is not performing other complex computations.

In some implementations, certain assets associated with the immersive audio environment can be stored locally (e.g., at a memory accessible to the immersive audio player device) and other assets associated with the immersive audio environment can be stored remotely (e.g., at a server). For example, the remote device can store all of the assets associated with the immersive audio environment, and a local device (such as the immersive audio player device) can download and store locally a subset of the assets associated with the immersive audio environment. To illustrate, the local device can stream assets associated with the immersive audio environment from the server. In this illustrative example, certain of the assets can be pre-fetched based on an expectation that such pre-fetched assets will be needed in the future. The pre-fetched assets can include, for example, one or more assets associated with a predicted future pose of the listener (e.g., based on a current pose of the listener, a prior pose of the listener, or both). As another example, the pre-fetched assets can include one or more assets associated with listener poses that are known in advance or expected to occur (possibly independently of a current or prior pose of the listener). When pre-fetching is used, an audio asset selector of the immersive audio player device can determine whether a target asset is available locally before sending a request for the target asset to a remote device. Pre-fetching assets can reduce impacts on user experience associated with communication delays (e.g., network delays and/or lost packets).

In some implementations, a rendered asset (whether pre-rendered or rendered as needed) is binauralized to generate an output audio signal. The output audio signal can include, for example, two channels corresponding to (or used to generate) left and right output audio channels. In other examples, the output audio signal can include more than two channels, such as five speaker channels and a subwoofer channel for a 5.1 surround sound system as one non-limiting example.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," " "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining", "calculating", "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating", "estimating", "using", "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

In general, techniques are described for coding of 3D sound data, such as ambisonics audio data. Ambisonics audio data may include different orders of ambisonic coefficients, e.g., first order or second order and more (which may be referred to as Higher-Order Ambisonics (HOA) coefficients corresponding to a spherical harmonic basis function having an order greater than one). Ambisonics audio data may also include Mixed Order Ambisonics (MOA). Thus, ambisonics audio data may include at least one ambisonic coefficient corresponding to a harmonic basis function.

The evolution of surround sound has made available many audio output formats for entertainment. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, and various formats that includes height speakers such as the 7.1.4 format and the 22.2 format (e.g., for use with the Ultra High Definition Television standard). Non-consumer formats can span any number of speakers (e.g., in symmetric and non-symmetric geometries) often termed 'surround arrays'. One example of such a sound array includes 32 loudspeakers positioned at coordinates on the corners of a truncated icosahedron.

The input to an encoder, such as a Moving Picture Experts Group (MPEG) encoder, may be optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); or (iii) scene-based audio, which involves representing the sound field using coefficients of spherical harmonic basis functions (also called "spherical harmonic coefficients" or SHC, "Higher-order Ambisonics" or HOA, and "HOA coefficients"). Such an encoder may be described in more detail in a document entitled "Call for Proposals for 3D Audio," by the International Organization for Standardization/International Electrotechnical Commission (ISO)/(IEC) JTC1/SC29/WG11/N13411, released January 2013 in Geneva, Switzerland, and available at http://mpeg.chiariglione.org/sites/default/files/files/standards/parts/docs/w13411.zip.

There are various 'surround-sound' channel-based formats currently available. The formats range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce a soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a sound field. The hierarchical set of elements may refer to a set of elements in which the elements are ordered such that a basic set of lower-ordered elements provides a full representation of the modeled sound field. As the set is extended to include higher-order elements, the representation becomes more detailed, increasing resolution.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty}\left[4\pi\sum_{n=0}^{\infty} j_n(kr_r)\sum_{m=-n}^{n} A_n^m(k)Y_n^m(\theta_r, \varphi_r)\right]e^{j\omega t},$$

The expression shows that the pressure $p_i$ at any point $\{r_r, \theta_r, \varphi_r\}$ of the sound field, at time t, can be represented uniquely by the SHC, $$A_n^m(k).$$

Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $$Y_n^m(\theta_r, \varphi_r)$$

are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram 100 illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes. A number of spherical harmonic basis functions for a particular order may be determined as: #basis functions=(n+1)^2. For example, a tenth order (n=10) would correspond to 121 spherical harmonic basis functions (e.g., (10+1)^2).

The SHC $$A_n^m(k)$$

can either be physically acquired (e.g., recorded) by various microphone array configurations or, alternatively, they can be derived from channel-based or object-based descriptions of the sound field. The SHC represent scene-based audio, where the SHC may be input to an audio encoder to obtain encoded SHC that may promote more efficient transmission or storage. For example, a fourth-order representation involving $(4+1)^2$(25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $$A_n^m(k)$$

for the soundfield corresponding to an individual audio object may be expressed as:

$$A_n^m(k) = g(\omega)(-4\pi ik)h_n^{(2)}(kr_s)Y_n^{m^*}(\theta_s, \varphi_s),$$

where i is $$\sqrt{-1}, h_n^{(2)}(\cdot)$$

is the spherical Hankel function (of the second kind) of order n, and $\{r_s, \theta_s, \varphi_s\}$ is the location of the object. Knowing the object source energy g (ω) as a function of frequency (e.g., using time-frequency analysis techniques, such as performing a fast Fourier transform on the PCM stream) enables conversion of each PCM object and the corresponding location into the SHC $$A_n^m(k).$$

Further, it can be shown (since the above is a linear and orthogonal decomposition) that the $$A_n^m(k)$$

coefficients for each object are additive. In this manner, a multitude of PCM objects can be represented by the $A_n^m(k)$ coefficients (e.g., as a sum of the coefficient vectors for the individual objects). Essentially, the coefficients contain information about the sound field (the pressure as a function of 3D coordinates), and the above represents the transformation from individual objects to a representation of the overall sound field, in the vicinity of the observation point $\{r_r, \theta_r, \varphi_r\}$.

Figure 2:
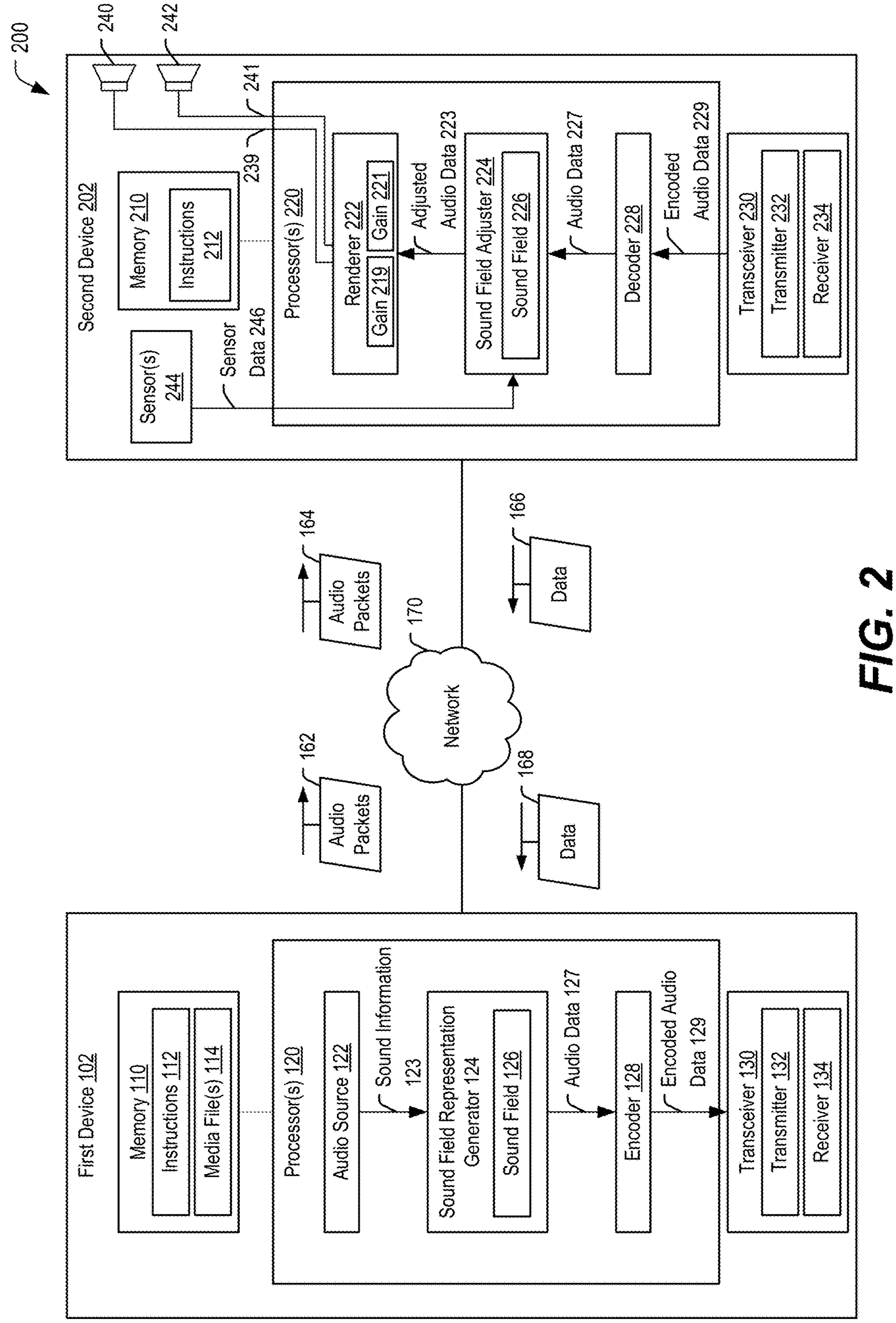
FIG. 2 is a block diagram illustrating an example of an implementation of a system for adjusting a sound field.

Referring to FIG. 2, a system 200 includes a first device 102 coupled to a second device 202 via a network 170. The network 170 may include one or more of a fifth generation (5G) cellular digital network, a Bluetooth® (a registered trademark of BLUETOOTH SIG, INC., Washington) network, an Institute of Electrical and Electronic Engineers (IEEE) 802.11-type network (e.g., WiFi), one or more other wireless networks, or any combination thereof. The first device 102 is configured to generate audio data representative of a sound field and transmit the audio data to the second device 202 via the network 170. The second device 202 is configured to perform one or more adjustments of the sound field based on movement of the second device 202 prior to playing out the resulting audio, reducing latency associated with transmitting movement information from the second device 202 to the first device 102 for adjustment of the sound field at the first device 102.

The first device 102 includes a memory 110, one or more processors 120, and a transceiver 130. The memory 110 includes instructions 112 that are executable by the one or more processors 120. The memory 110 also includes one or more media files 114. The one or more media files 114 are accessible to the processor 120 as a source of sound information, as described further below. In some examples, the one or more processors 120 are integrated in a portable electronic device, such as a smartphone, tablet computer, laptop computer, or other electronic device. In other examples, the one or more processors 120 are integrated in a server, such as an edge server.

The transceiver 130 is coupled to the one or more processors 120 and is configured to enable communication via the network 170 to the second device 202. The transceiver 130 includes a transmitter 132 and a receiver 134. Although the first device 102 is illustrated as including the transceiver 130, in other implementations the first device 102 does not include the transceiver 130 and instead includes the transmitter 132 and the receiver 134 as distinct components.

The one or more processors 120 are configured to execute the instructions 112 to perform operations associated with audio processing. To illustrate, the one or more processors 120 are configured to receive sound information 123 from an audio source 122. For example, the audio source 122 may correspond to a portion of one or more of the media files 114, a game engine, one or more other sources of sound information, or a combination thereof.

The one or more processors 120 are configured to adjust a sound field 126 associated with the sound information 123 via operation of a sound field representation generator 124. The sound field representation generator 124 is configured to output audio data 127 to an encoder 128. In an example, the audio data 127 includes ambisonics data and corresponds to at least one of two-dimensional (2D) audio data that represents a 2D sound field or three-dimensional (3D) audio data that represents a 3D sound field. In some implementations, the sound field representation generator 124 may obtain one or more representations of a sound field from a content creator or some other device or source external to the first device 102 (e.g., loaded from a webpage or stored in a file and loaded), and then processed and streamed to the second device 202.

The encoder 128 is configured to perform ambisonics encoding or transcoding (e.g., spatial encoding of the audio data 127 into ambisonics coefficients) to generate encoded audio data 129. In some implementations, the encoder 128 is configured to compress the encoded audio data 129 (e.g., psychoacoustic compression encoding), and in other implementations, the encoder 128 does not compress the encoded audio data 129, such as described in further detail with reference to FIG. 3. For example, the encoder 128 may be configurable by the one or more processors 120 to operate in a compression mode in which compression is performed to reduce the size of the encoded audio data 129, or to operate in a bypass mode in which the encoded audio data 129 is not compressed (e.g., raw ambisonics coefficients), such as based on a latency criterion associated with playback at the second device 202.

The encoded audio data 129 is output by the one or more processors 120 to the transceiver 130 for transmission to the second device 202. For example, the audio data 127 corresponding to the sound field 126 may be transmitted as streaming data via one or more first audio packets 162. In some implementations, the audio source 122 corresponds to a portion of a media file (e.g., a portion of the one or more media files 114), and the streaming data is associated with a virtual reality experience that is streamed to the second device 202 (e.g., a playback device) via at least one of a 5G cellular digital network or a Bluetooth® network.

In some implementations, the one or more processors 120 are also configured to receive translation data from a playback device, such as data 166 received from the second device 202. The translation data corresponds to a translation associated with the second device 202, such as a movement of the second device 202 (e.g., movement of the wearer of the second device 202 implemented as a headphone device). As used herein, "movement" includes rotation (e.g., a change in orientation without a change in location, such as a change in roll, tilt, or yaw), translation (e.g., non-rotation movement), or a combination thereof.

The one or more processors 120 are configured to convert the sound information 123 to audio data that represents a sound field based on the translation associated with the second device 202. To illustrate, the sound field representation generator 124 adjusts the sound field 126 to generate updated audio data 127 that represents the sound field after the translation. For example, in some implementations the sound field representation generator 124 performs the translation on objects prior to converting to ambisonics, and in some implementations the sound field representation generator 124 performs translation operations to apply the translation to ambisonics representing an existing sound field. The one or more processors 120 are configured to send the updated audio data as streaming data, via wireless transmission, to the second device 202, such as via second audio packets 164.

The first device 102 is configured to receive subsequent translation data, such as data 168 that is received after receiving the data 166, and may perform further adjustments to the sound field 126 to account for translation of the second device 202. Thus, the first device 102 can receive a stream of translation information indicating changes in the location of the second device 202 and update the streaming audio data transmitted to the second device 202 to represent an adjusted version of the sound field 126 that corresponds to the changing location of the second device 202. However, in some implementations, the first device 102 does not perform rotations of the sound field 126 responsive to changes in orientation of the second device 202, and instead rotations of the sound field are performed at the second device 202.

The second device 202 includes one or more processors 220 coupled to a memory 210, a transceiver 230, one or more sensors 244, a first loudspeaker 240, and a second loudspeaker 242. In an illustrative example, the second device 202 corresponds to a wearable device. To illustrate, the one or more processors 220, the memory 210, the transceiver 230, the one or more sensors 244, and the loudspeakers 240, 242 may be integrated in a headphone device in which the first loudspeaker 240 is configured to be positioned proximate to a first ear of a user while the headphone device is worn by the user, and the second loudspeaker 242 is configured to be positioned proximate to a second ear of the user while the headphone device is worn by the user.

The memory 210 is configured to store instructions 212 that are executable by the one or more processors 220. The one or more sensors 244 are configured to generate sensor data 246 indicative of a movement of the second device 202, a pose of the second device 202, or a combination thereof. As used herein, the "pose" of the second device 202 indicates a location and an orientation of the second device 202. The one or more sensors 244 include one or more inertial sensors such as accelerometers, gyroscopes, compasses, positioning sensors (e.g., a global positioning system (GPS) receiver), magnetometers, inclinometers, optical sensors, one or more other sensors to detect acceleration, location, velocity, acceleration, angular orientation, angular velocity, angular acceleration, or any combination thereof, of the second device 202. In one example, the one or more sensors 244 include GPS, electronic maps, and electronic compasses that use inertial and magnetic sensor technology to determine direction, such as a 3-axis magnetometer to measure the Earth's geomagnetic field and a 3-axis accelerometer to provide, based on a direction of gravitational pull, a horizontality reference to the Earth's magnetic field vector. In some examples, the one or more sensors 244 include one or more optical sensors (e.g., cameras) to track movement, individually or in conjunction with one or more other sensors (e.g., inertial sensors).

The transceiver 230 includes a wireless receiver 234 and a wireless transmitter 232. The wireless receiver 234 is configured to receive the encoded audio data 129 from the first device 102 via the wireless transmission and to output corresponding encoded audio data 229 to the one or more processors 220. In some implementations, the encoded audio data 229 matches the encoded audio data 129, while in other implementations the encoded audio data 229 may differ from the encoded audio data 129 due to one or more audio packets being lost during transmission, one or more bit errors occurring in a received audio packet, or one or more other causes of data loss. Any such data losses may be corrected (e.g., via forward error correction encoding or redundant information transmission) or may be compensated for (e.g., via interpolation between received packets to estimate audio data for a lost packet). Although the second device 202 is illustrated as including the transceiver 230, in other implementations the second device 202 may omit the transceiver 230 and may include the receiver 234 and the transmitter 232 as distinct components.

The one or more processors 220 are configured to receive, via wireless transmission, the encoded audio data 229 representing the sound field 126. In some implementations, the one or more processors 220 are configured to receive the encoded audio data 229 as streaming data from a streaming device (e.g., via the first audio packets 162 from the first device 102).

The one or more processors 220 are configured to decode the encoded audio data 229. For example, a decoder 228 is configured to process the encoded audio data 229 (e.g., decompressing if the encoded audio data 229 is compressed) to generate audio data 227 that corresponds to the audio data 127 at the first device 102 and is indicative of a sound field 226 that corresponds to the sound field 126 at the first device 102. In some implementations, the audio data 227 includes ambisonics data and corresponds to at least one of two-dimensional (2D) audio data or three-dimensional (3D) audio data.

The one or more processors 220 are configured to adjust the audio data 227 to alter the sound field 226 based on data associated with at least one of a translation or an orientation associated with movement of the second device 202, such as indicated by the sensor data 246. To illustrate, the sound field adjuster 224 is configured to adjust the audio data 227 to alter the sound field 226 based on the sensor data 246 indicating a change in orientation or translation of the second device 202. In one example, the one or more processors 220 are configured to adjust the audio data 227 to rotate the sound field 226 responsive to the sensor data 246 indicating a change of the orientation. In another example, the one or more processors 220 are configured to translate and rotate the sound field 226 responsive to the movement of the second device 202 and without sending translation data associated with the movement of the second device 202 to a streaming device (e.g., without sending the data 166, 168 to the first device 102). In one example, the one or more processors 120 are configured to perform one of a translation or a rotation of the sound field 126 based on translation data (e.g., the data 166, 168) received from the second device 202, and the processors 220 are configured to perform the other of the translation or the rotation of the sound field 226 based on the sensor data 246.

The one or more processors 220 are configured to render the adjusted decompressed audio data 223 into two or more loudspeaker gains to drive two or more loudspeakers. For example, a first loudspeaker gain 219 is generated to drive the first loudspeaker 240 and a second loudspeaker gain 221 is generated to drive the second loudspeaker 242. To illustrate, the one or more processors 220 are configured to perform binauralization of the adjusted decompressed audio data 223, such as using one or more HRTFs or BRIRs to generate the loudspeaker gains 219, 221, and output the adjusted decompressed audio data as pose-adjusted binaural audio signals 239, 241 to the loudspeakers 240, 242 for playback.

The first device 102 and the second device 202 may each perform operations that, when combined, correspond to a split audio rendering operation. The first device 102 processes the sound information 123 from the audio source 122 and generates audio data 127, such as 2D or 3D ambisonics data, representing the sound field 126. In some implementations, the first device 102 also performs translations to the sound field 126 prior to sending the encoded audio data 129 to the second device 202. In some implementations, the second device 202 adjusts the audio data 227 to alter the sound field 226 based on the orientation of the second device 202 and renders the resulting adjusted audio data 223 for playout. In some implementations, the second device 202 also performs translations to the sound field 226. Examples of various operations that may be performed by the first device 102 and the second device 202 are described in further detail with reference to FIGS. 3-19.

Thus, the first device 102 may operate as a streaming source device and the second device 202 may operate as a streaming client device. By performing operations to rotate the sound field 226 at the second device 202, latency associated with transmitting rotation tracking data from the second device 202 to the first device 102 is avoided and a user experience is improved.

Although the second device 202 is described as a headphone device for purpose of explanation, in other implementations the second device 202 is implemented as another type of device. For example, in some implementations the one or more processors 220 are integrated into a vehicle, and the data 166, 168 indicates a translation of the vehicle and an orientation of the vehicle, such as described further with reference to FIG. 24 and FIG. 25. In some implementations, the one or more processors 220 are integrated into a speaker array device and are further configured to perform a beam steering operation to steer binaural signals to a location associated with a user, such as described further with reference to FIG. 22. In some implementations, the one or more processors 220 are integrated in at least one of a mobile phone, a tablet computer device, a wearable electronic device, a camera device, or an extended reality headset, such as a virtual reality headset, a mixed reality headset, or an augmented reality headset.

Figure 3A:
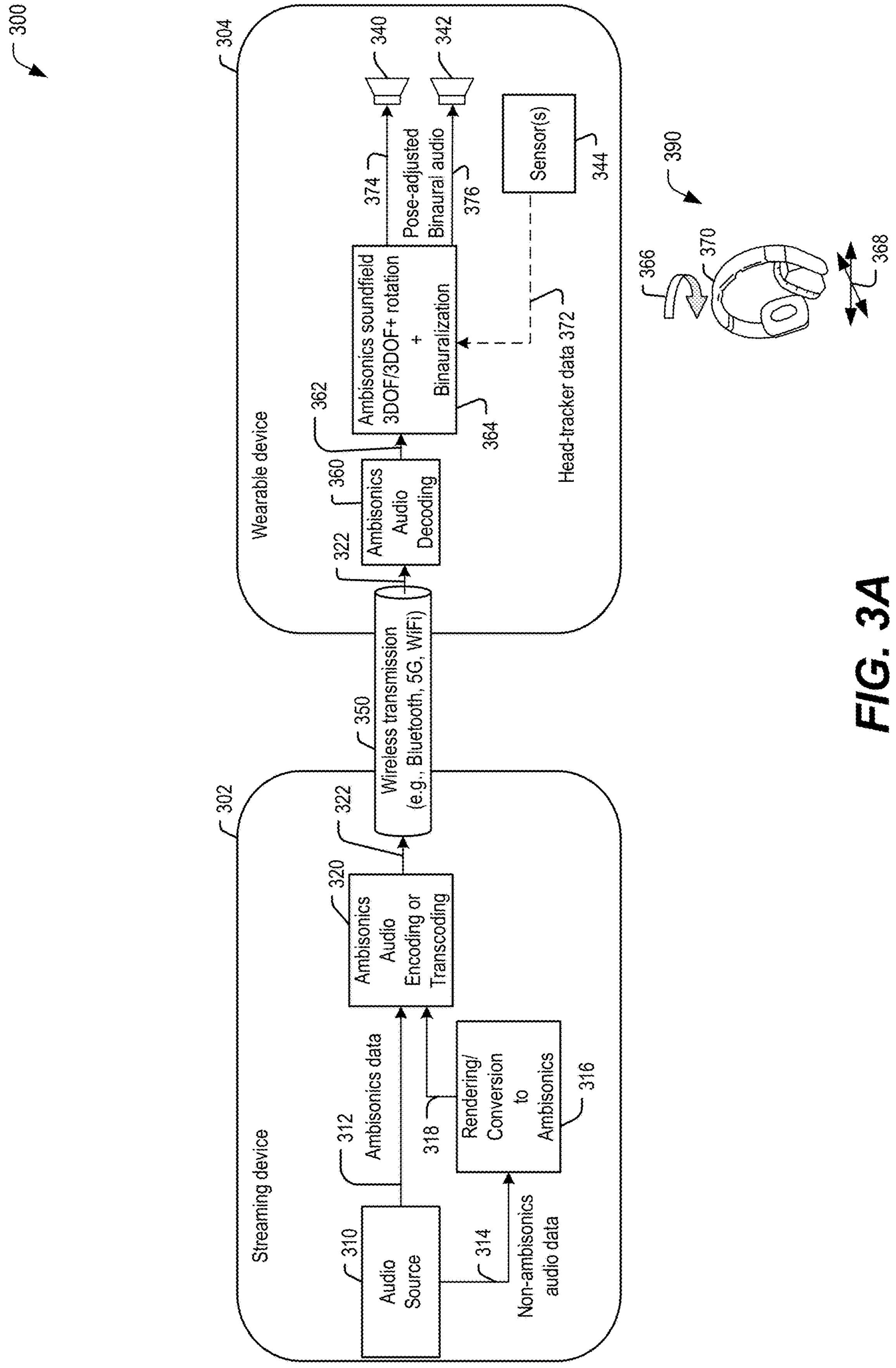
FIG. 3A is a block diagram illustrating a first implementation of components and operations of a system for adjusting a sound field.

FIG. 3A is a block diagram illustrating a first implementation of components and operations of a system for adjusting a sound field. A system 300 includes a streaming device 302 coupled to a wearable device 304.

The streaming device 302 includes an audio source 310 that is configured to provide ambisonics data 312 that represents first audio content, non-ambisonics audio data 314 that represents second audio content, or a combination thereof. The streaming device 302 is configured to perform a rendering/conversion to ambisonics operation 316 to convert the streamed non-ambisonics audio data 314 to an ambisonics sound field (e.g., FOA, HOA, mixed-order ambisonics) to generate ambisonics data 318. As used herein, "ambisonics data" includes a set of one or more ambisonics coefficients that represent a sound field.

The streaming device 302 is configured to perform an ambisonics audio encoding or transcoding operation 320 to compress ambisonics coefficients of the ambisonics data 312, the ambisonics data 318, or a combination thereof, to generate compressed coefficients 322 and to transmit the compressed coefficients 322 wirelessly to the wearable device 304 via a wireless transmission 350 (e.g., via Bluetooth®, 5G, or WiFi, as illustrative, non-limiting examples). In an example, the ambisonics audio encoding or transcoding operation 320 is performed using a low-delay codec, such as based on Audio Processing Technology-X (AptX), low-delay Advanced Audio Coding (AAC-LD), or Enhanced Voice Services (EVS), as illustrative, non-limiting examples.

In some implementations, the streaming device 302 corresponds to the first device 102 of FIG. 2, the audio source 310 corresponds to the audio source 122, the rendering/conversion to ambisonics operation 316 is performed at the sound field representation generator 124, the ambisonics audio encoding or transcoding operation 320 is performed at the encoder 128, and the compressed coefficients 322 correspond to the encoded audio data 129.

The wearable device 304 (e.g., a headphone device) is configured to receive the compressed coefficients 322 and to perform an ambisonics audio decoding operation 360 to generate ambisonics data 362. The wearable device 304 is also configured to generate head-tracker data 372 based on detection by one or more sensors 344 of a rotation 366 and a translation 368 of the wearable device 304. A diagram 390 illustrates an example representation of the wearable device 304 implemented as a headphone device 370 to demonstrate examples of the rotation 366 and the translation 368.

An ambisonics sound field 3DOF/3DOF+rotation and binauralization operation 364 at the wearable device 304 performs compensation for head-rotation via sound field rotation based on the head-tracker data 372 measured on the wearable device 304 (and optionally also processing a low-latency 3DOF+effect with limited translation). For example, the 3DOF+effect may be limited to translations forward, back, left, and right (relative to a forward-facing direction of the headphone device 370). The ambisonics sound field 3DOF/3DOF+rotation and binauralization operation 364 at the wearable device 304 also performs binauralization of the compensated ambisonics sound field using HRTFs or BRIRs with or without headphone compensation filters associated with the wearable device 304 to output pose-adjusted binaural audio via a first output signal 374 to a first loudspeaker 340 and a second output signal 376 to a second loudspeaker 342. In some implementations, the ambisonics audio decoding operation 360 and ambisonics sound field 3DOF/3DOF+rotation and binauralization operation 364 can be combined into a single operation to reduce computation resource usage at the wearable device 304.

In some implementations, the wearable device 304 corresponds to the second device 202 of FIG. 2, the ambisonics audio decoding operation 360 is performed at the decoder 228, the ambisonics sound field 3DOF/3DOF+rotation and binauralization operation 364 is performed at the sound field adjuster 224 and the renderer 222, the one or more sensors 344 correspond to the one or more sensors 244, and the head-tracker data 372 corresponds to the sensor data 246.

The system 300 therefore enables low rendering latency wireless immersive audio with 3DOF or 3DOF+rendering post transmission.

Figure 3B:
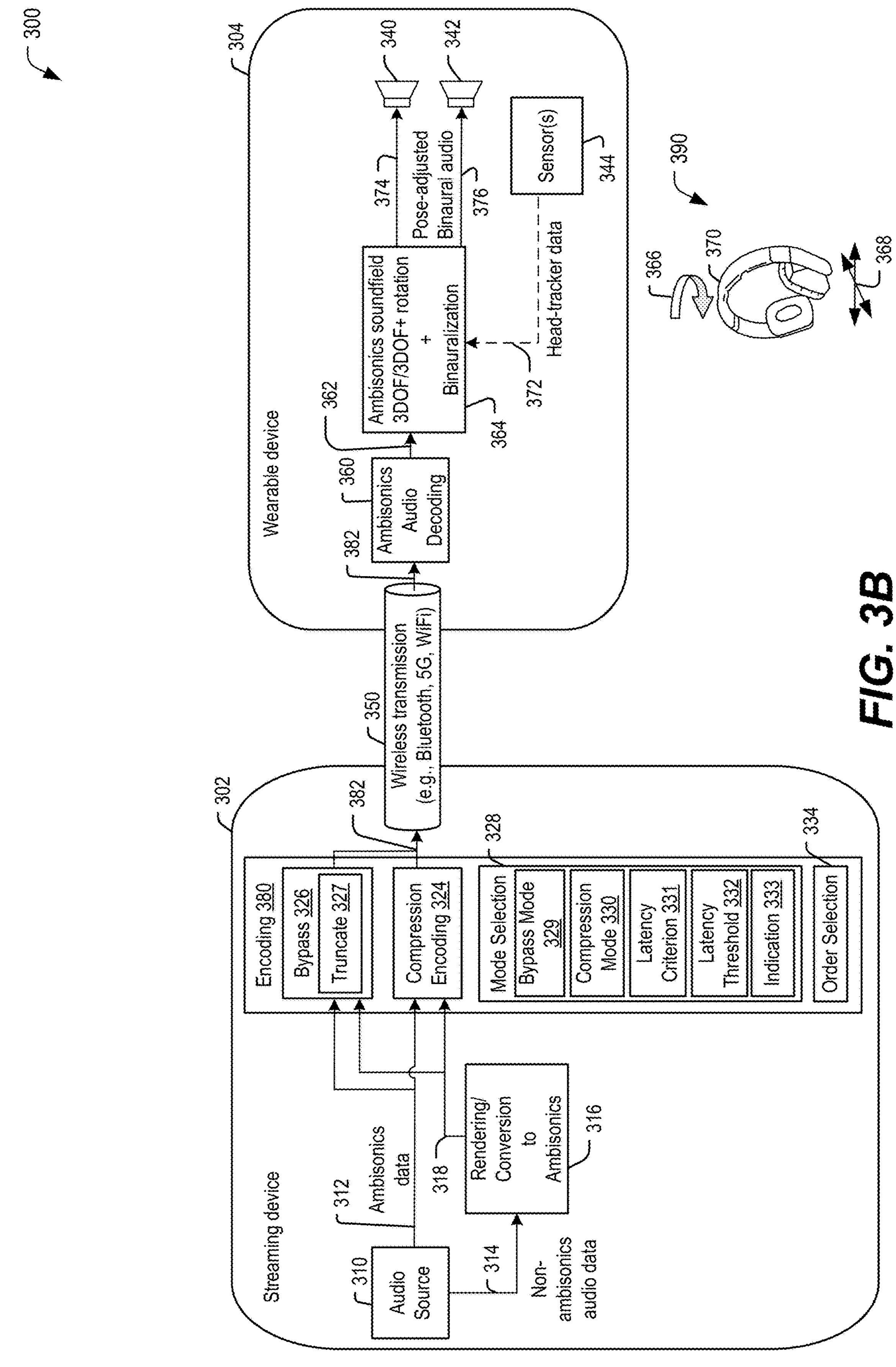
FIG. 3B is a block diagram illustrating a second implementation of components and operations of a system for adjusting a sound field.

FIG. 3B depicts an implementation of the system 300 in which the streaming device 302 is configured to selectively perform a bypass operation 326 to circumvent performing compression encoding 324 of the ambisonics data 312, the ambisonics data 318, or both. To illustrate, the streaming device 302 is configured to perform an encoding operation 380 that can include the compression encoding 324 (e.g., psychoacoustic compression encoding to compress ambisonics coefficients) or the bypass operation 326. In a particular implementation, audio data 382 output from the encoding operation 380 can include compressed ambisonics coefficients from the compression encoding 324 or non-compressed ambisonics coefficients from the bypass operation 326. The audio data 382 is wirelessly transmitted to the wearable device 304 (also referred to as playback device 304) via the wireless transmission 350.

In a particular implementation, the streaming device 302 can include one or more processors, such as the one or more processors 120 of FIG. 2, that are configured to obtain sound information from the audio source 310 and to perform a mode selection 328. The mode selection 328 includes selecting, based on a latency criterion 331 associated with the playback device 304, a compression mode 330 in which a representation of the sound information (e.g., a set of ambisonics coefficients) is compressed prior to transmission to the playback device 304, or a bypass mode 329 in which the representation of the sound information is not compressed prior to transmission to the playback device 304. The resulting audio data 382 includes, based on the selected one of the compression mode 330 or the bypass mode 329, a compressed representation of the sound information or an uncompressed representation of the sound information. To illustrate, in response to selection of the compression mode 330, one or more switches or other data flow control devices can be set to cause incoming ambisonics coefficients to be processed by the compression encoding 324 to generate compressed ambisonics coefficients as the audio data 382. If the bypass mode 329 is selected, the one or more switches or data flow control devices can be set to cause incoming ambisonics coefficients to be processed using the bypass operation 326, which may output at least a portion of the incoming (uncompressed) ambisonics coefficients as the output audio data 382. The ambisonics audio decoding 360 at the playback device 304 is configured to receive the audio data 382, determine if the audio data 382 includes compressed or uncompressed ambisonics coefficients, and selectively decompress compressed ambisonics coefficients to generate ambisonics data 362. In implementations in which some ambisonics coefficients have been discarded at the streaming device 302, such as via operation of a truncation operation 327 in the bypass mode 329 as explained further below, the ambisonics data 362 may contain fewer ambisonics coefficients than the ambisonics data 312 or 318.

In some implementations, the latency criterion 331 is based on whether a playback latency associated with the streaming data exceeds a latency threshold 332. For example, some applications, such as an extended reality application, a phone call, a teleconference, or a video telephone, may have one or more low-latency criteria for audio playback to provide a positive user experience. Delay associated with the compression encoding 324 at the streaming device 302 and delay associated with decompression of compressed audio data during the ambisonics audio decoding 360 at the playback device 304 may cause the latency associated with playback of the audio data 382 at the playback device 304 to exceed the latency threshold 332. In response to a determination that the playback latency exceeds the latency threshold 332, the bypass mode 329 is selected, causing the transmitted audio data 382 to include uncompressed ambisonics coefficients and reducing latency. In some cases, the streaming device 302 receives, from the playback device 304, an indication 333 that the playback latency associated with the streaming data exceeds the latency threshold 332, and the streaming device 302 selects the bypass mode 329 based on receiving the indication 333.

In some implementations the latency criterion 331 is at least partially based on a bandwidth of a wireless link from the streaming device 302 to the playback device 304. When an amount of the audio data 382 to be transmitted exceeds the available bandwidth for the wireless transmission 350, transmission delays can occur that interfere with timely playback of the audio data 382 at the playback device 304. In some implementations, the streaming device 302 determines whether a wireless link to the playback device 304 corresponds to a "higher-bandwidth" wireless link or to a "lower-bandwidth" wireless link and selects the bypass mode 329 based on the wireless link corresponding to the "higher-bandwidth" wireless link.

For example, in response to the wireless transmission occurring over a fifth generation (5G) cellular digital network or a WiFi-type network, the streaming device 302 may determine that the wireless transmission 350 uses a "higher-bandwidth" wireless link that provides sufficient bandwidth to transmit uncompressed ambisonics coefficients. As another example, in response to the wireless transmission occurring over a Bluetooth-type wireless network, the streaming device 302 may determine that the wireless transmission 350 uses a "lower-bandwidth" wireless link that does not provide sufficient bandwidth to transmit uncompressed ambisonics coefficients. The streaming device 302 may select the compression mode 330 based on the wireless link corresponding to the "lower-bandwidth" wireless link.

In the above examples, "higher-bandwidth" and "lower-bandwidth" are relative terms to categorize wireless links based on the type of wireless network. Although 5G, WiFi, and Bluetooth® are given as illustrative, non-limiting examples, it should be understood that categorization of 5G, WiFi, and Bluetooth® as "lower-bandwidth" or "higher-bandwidth" may be adjusted as capacities of such technologies evolve over time. In addition to categorizing wireless links based on network type, or alternatively, the streaming device 302 may estimate the ability of the wireless link to convey uncompressed ambisonics coefficients, such as based on measured link parameters (transmit power levels, received power levels, etc.), and select the compression mode 330 or the bypass mode 329 based on the estimated ability of the wireless link to convey the audio data 382 in an uncompressed format.

In some implementations, the streaming device 302 receives, from the playback device 304, a request for compressed audio data or for uncompressed audio data, and selects either the bypass mode 329 or the compression mode 330 based on the request. For example, the playback device 304 may request to receive uncompressed audio data to reduce delays associated with decompressing audio data, to reduce power consumption associated with decompressing audio data, for one or more other reasons, or any combination thereof. As another example, the playback device 304 may request to receive compressed audio data in response to network conditions causing delays or packet loss during transmission over the wireless transmission 350, to reduce an amount of memory used to store the audio data 382 locally at the playback device 304, for one or more other reasons, or any combination thereof.

In some cases, such as when the audio data 382 for a low-latency audio application is transferred over a wireless link that has insufficient bandwidth to support transmission of a full set of uncompressed ambisonics coefficients, but the latency criterion 331 prevents use of compressed ambisonics coefficients, the streaming device 302 can perform a truncation operation 327 in the bypass operation 326. The truncation operation 327 truncates higher-resolution audio data (e.g., discards some ambisonics coefficients corresponding to one or more upper ambisonics orders of the full order uncompressed representation for a frame of audio data) to reduce a size of the audio data 382 without performing compression. For example, in the bypass mode 329, the streaming device 302 may discard a high-resolution portion of the uncompressed ambisonics coefficients based on a bandwidth of a wireless link from the streaming device 302 to the playback device 304. To illustrate, the high-resolution portion of the uncompressed representation may correspond to a subset of the ambisonic coefficients. As an illustrative, non-limiting example, the streaming device 302 may select ambisonics coefficients to truncate by starting with a highest order of ambisonics coefficients of the full order uncompressed representation and selecting progressively lower orders of ambisonics coefficients to truncate until the combined size of the remaining ambisonics coefficients is sufficiently small to enable transmission to the playback device 304. In other non-limiting examples, the truncation operation 327 discards all ambisonics coefficients other than a zeroth order coefficient, discards all ambisonics coefficients other than zeroth order and first order coefficients, or discards all ambisonics coefficients other than zeroth order, first order, and second order coefficients.

In some implementations, an order selection 334 is used during the encoding operation 380 to determine which ambisonics orders (e.g., zeroth order, first order, second order, etc.) to transmit and which ambisonics orders (e.g., first order, second order, third order, etc.) to discard. For example, the order selection 334 may be generated by the streaming device 302 to determine which ambisonics coefficients to truncate to deliver the audio data 382 for a low-latency application over a lower-bandwidth wireless link, as described above. As another example, the order selection 334 can be determined by the streaming device 302, determined by the playback device 304, or both, to reduce or enhance the resolution of the audio data 382 based on an actual or predicted amount of motion of the wearable device 304, such as described further with reference to FIG. 10. The order selection 334 may be used to control the truncation operation 327 when operating in the bypass mode 329. Alternatively, or in addition, the order selection 334 may be used in conjunction with the compression encoding 324 when operating in the compression mode 330. For example, ambisonics coefficients associated with one or more unselected ambisonics orders may be discarded prior to performing the compression encoding 324, during performance of the compression encoding 324, or after the compression encoding 324 has been performed.

Figure 4A:
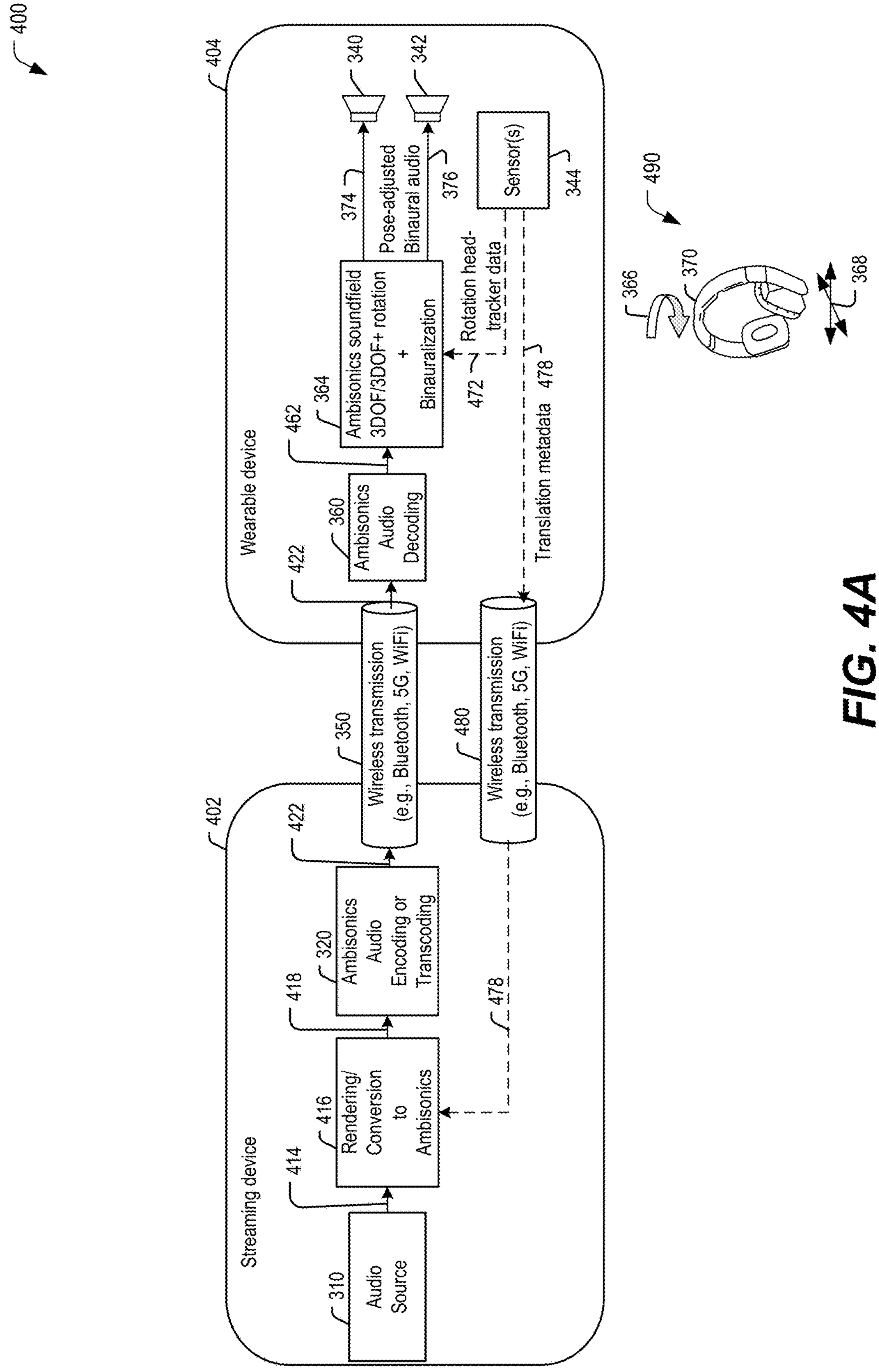
FIG. 4A is a block diagram illustrating a third implementation of components and operations of a system for adjusting a sound field.

FIG. 4A is a block diagram illustrating another implementation of components and operations of a system for adjusting a sound field. A system 400 includes a streaming device 402 coupled to a wearable device 404, also referred to as a playback device 404.

The streaming device 402 includes the audio source 310 and receives translation metadata 478, including location information, from the wearable device 404 via a wireless transmission 480 (e.g., via Bluetooth®, 5G, or WiFi, as illustrative, non-limiting examples). The streaming device 402 performs a rendering/conversion to ambisonics operation 416 of streamed audio content 414 to render the streamed audio content 414 to an ambisonics sound field (e.g., FOA, HOA, mixed-order ambisonics) and using the received motion information of the translation metadata 478 to account for a location change of a user of the wearable device 404.

The rendering/conversion to ambisonics operation 416 generates ambisonics data 418 that includes ambisonics coefficients. The streaming device 402 is configured to perform the ambisonics audio encoding or transcoding operation 320 to compress ambisonics coefficients of the ambisonics data 418 to generate compressed coefficients 422 and to transmit the compressed coefficients 422 wirelessly to the wearable device 404 via the wireless transmission 350.

In some implementations, the streaming device 402 corresponds to the first device 102 of FIG. 2, the audio source 310 corresponds to the audio source 122, the rendering/conversion to ambisonics operation 416 is performed at the sound field representation generator 124, the ambisonics audio encoding or transcoding operation 320 is performed at the encoder 128, and the translation metadata 478 corresponds to the data 166.

The wearable device 404 (e.g., a headphone device) is configured to receive the compressed coefficients 422 and to perform the ambisonics audio decoding operation 360 to generate ambisonics data 462. The wearable device 404 is also configured to generate rotation head-tracker data 472 based on a rotation 366 of the wearable device 404 and to generate the translation metadata 478 based on a translation 368 of the wearable device 404. A diagram 490 illustrates an example representation of the wearable device 404 implemented as a headphone device 370 to demonstrate examples of the rotation 366 and the translation 368.

The ambisonics sound field 3DOF/3DOF+rotation and binauralization operation 364 at the wearable device 404 performs compensation for head-rotation via sound field rotation based on the rotation head-tracker data 472 measured on the wearable device 404 (and optionally also processing a low-latency 3DOF+effect with limited translation based on the translation 368). For example, the 3DOF+ effect may be limited to translations forward, back, left, and right (relative to a forward-facing direction of the headphone device 370). The ambisonics sound field 3DOF/3DOF+ rotation and binauralization operation 364 at the wearable device 404 also performs binauralization of the compensated ambisonics sound field using HRTFs or BRIRs with or without headphone compensation filters associated with the wearable device 404 to output pose-adjusted binaural audio via a first output signal 374 to a first loudspeaker 340 and a second output signal 376 to a second loudspeaker 342. In some implementations, the ambisonics audio decoding operation 360 and the ambisonics sound field 3DOF/3DOF+ rotation and binauralization operation 364 can be combined into a single operation to reduce computation resource usage at the wearable device 404.

In some implementations, the wearable device 404 corresponds to the second device 202 of FIG. 2, the ambisonics audio decoding operation 360 is performed at the decoder 228, the ambisonics sound field 3DOF/3DOF+rotation and binauralization operation 364 is performed at the sound field adjuster 224 and the renderer 222, the one or more sensors 344 correspond to the one or more sensors 244, and the rotation head-tracker data 472 and the translation metadata 478 collectively correspond to the sensor data 246.

The wearable device 404 is therefore configured to send translation data (e.g., the translation metadata 478) to the streaming device 402, the translation data associated with the movement of the wearable device 404. Responsive to sending the translation data, the wearable device 404 is also configured to receive, from the streaming device 402, compressed updated audio data (e.g., the compressed coefficients 422) representing the sound field translated based on the translation data. The wearable device 404 is configured to decompress the compressed updated audio data to generate updated audio data (e.g., the ambisonics data 462) and to adjust the updated audio data to rotate the sound field based on the orientation associated with the wearable device 404 (e.g., the rotation head-tracker data 472). In some implementations, the wearable device 404 is also configured to adjust the updated audio data to translate the sound field based on a change of the translation of the wearable device 404 (e.g., via 3DOF+effects).

The system 400 thus enables low rendering latency wireless immersive audio with translation processing prior to transmission and with 3DOF or 3DOF+rendering post transmission. To illustrate, a first latency associated with sending the translation metadata 478 to the streaming device 402 and receiving the compressed updated audio data (e.g., the compressed coefficients 422) from the streaming device 402 is larger than a second latency associated with adjusting the updated audio data at the ambisonics sound field 3DOF/3DOF+rotation and binauralization operation 364 to rotate the sound field based on the orientation associated with movement of the wearable device 404. Thus, adjusting the sound field responsive to the user's head rotation is performed more quickly at the wearable device 404 after detecting the head rotation as compared to adjusting the sound field at the streaming device 402 after detecting the translation 368.

Figure 4B:
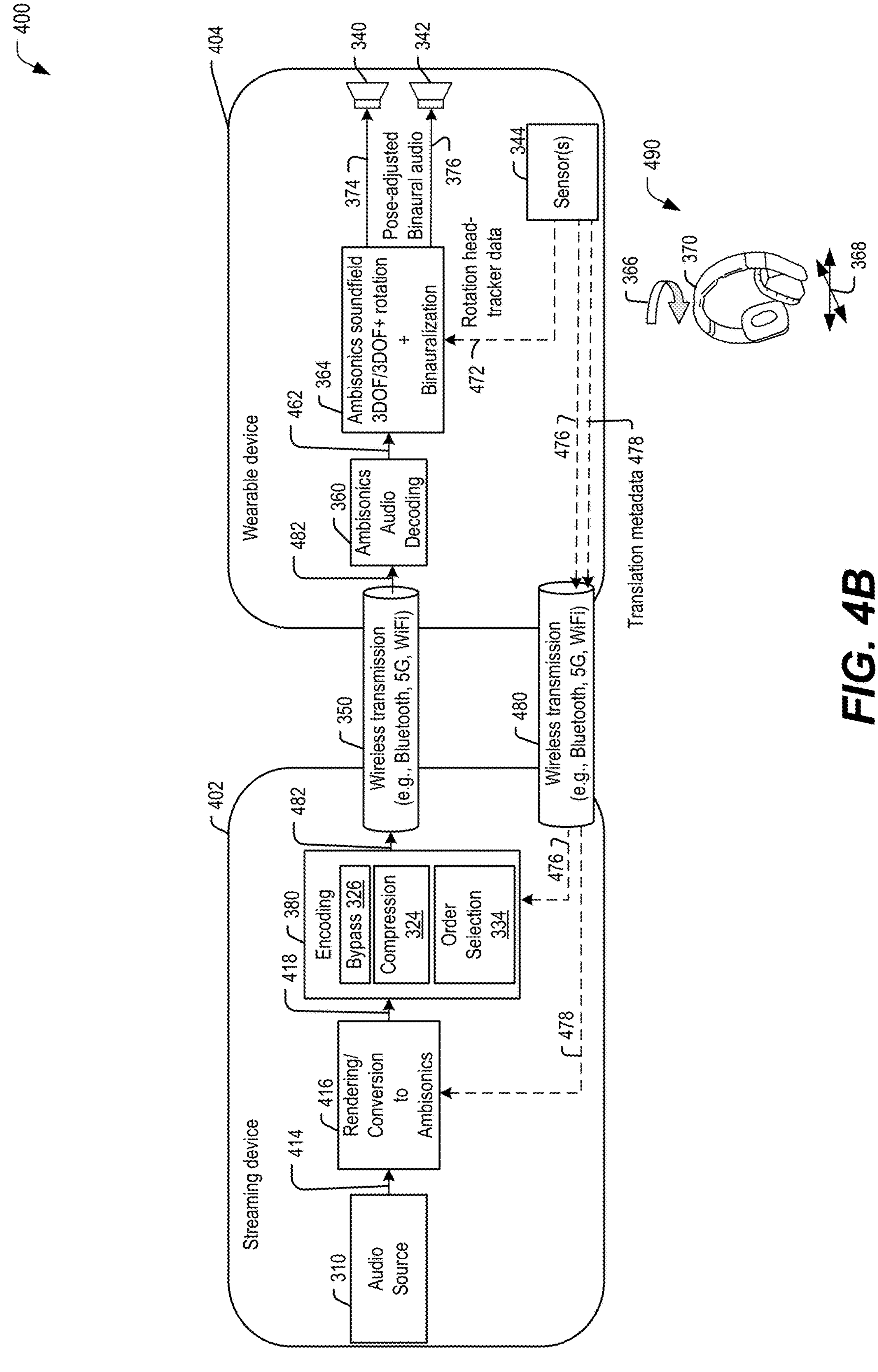
FIG. 4B is a block diagram illustrating a fourth implementation of components and operations of a system for adjusting a sound field.

FIG. 4B is a block diagram illustrating another implementation of the system 400 in which the ambisonics data 418 is processed by the encoding operation 380 of FIG. 3B (e.g., the bypass operation 326 or the compression encoding 324). Audio data 482 output from the encoding operation 380 can include compressed ambisonics coefficients from the compression encoding 324 or non-compressed ambisonics coefficients from the bypass operation 326. In addition, the audio data 482 can include a subset (e.g., fewer than all) of the ambisonics coefficients of the ambisonics data 418, such as due to operation of the order selection 334, the truncation operation 327, or a combination thereof.

In some implementations, the playback device 404 sends movement data 476 to the streaming device 402 via the wireless transmission 480. For example, the movement data 476 may include the rotation head-tracker data 472, the translation metadata 478, or a combination thereof. In some implementations, the movement data 476 is used in conjunction with the encoding operation 380 to determine an actual or predicted amount of motion of the playback device 404, which may be used to determine the order selection 334 at the playback device 404. In some implementations, the streaming device 402 processes the movement data 476 to determine an amount of motion of the playback device 404 or to predict an amount of motion of the playback device 404. Alternatively or in addition, the movement data 476 includes an indication of an amount of motion, or an indication of a predicted amount of motion, that is generated by the playback device 404 and transmitted to the streaming device 402. Alternatively, or in addition, the movement data 476 can include an indication of the order selection 334 from the playback device 404.

The order selection 334 may be used to control the truncation operation 327 when operating in the bypass mode 329. Alternatively, or in addition, the order selection 334 may be used in conjunction with the compression encoding 324 when operating in the compression mode 330. For example, ambisonics coefficients associated with one or more unselected ambisonics orders may be discarded prior to performing the compression encoding 324, during performance of the compression encoding 324, or after the compression encoding 324 has been performed.

Figure 5A:
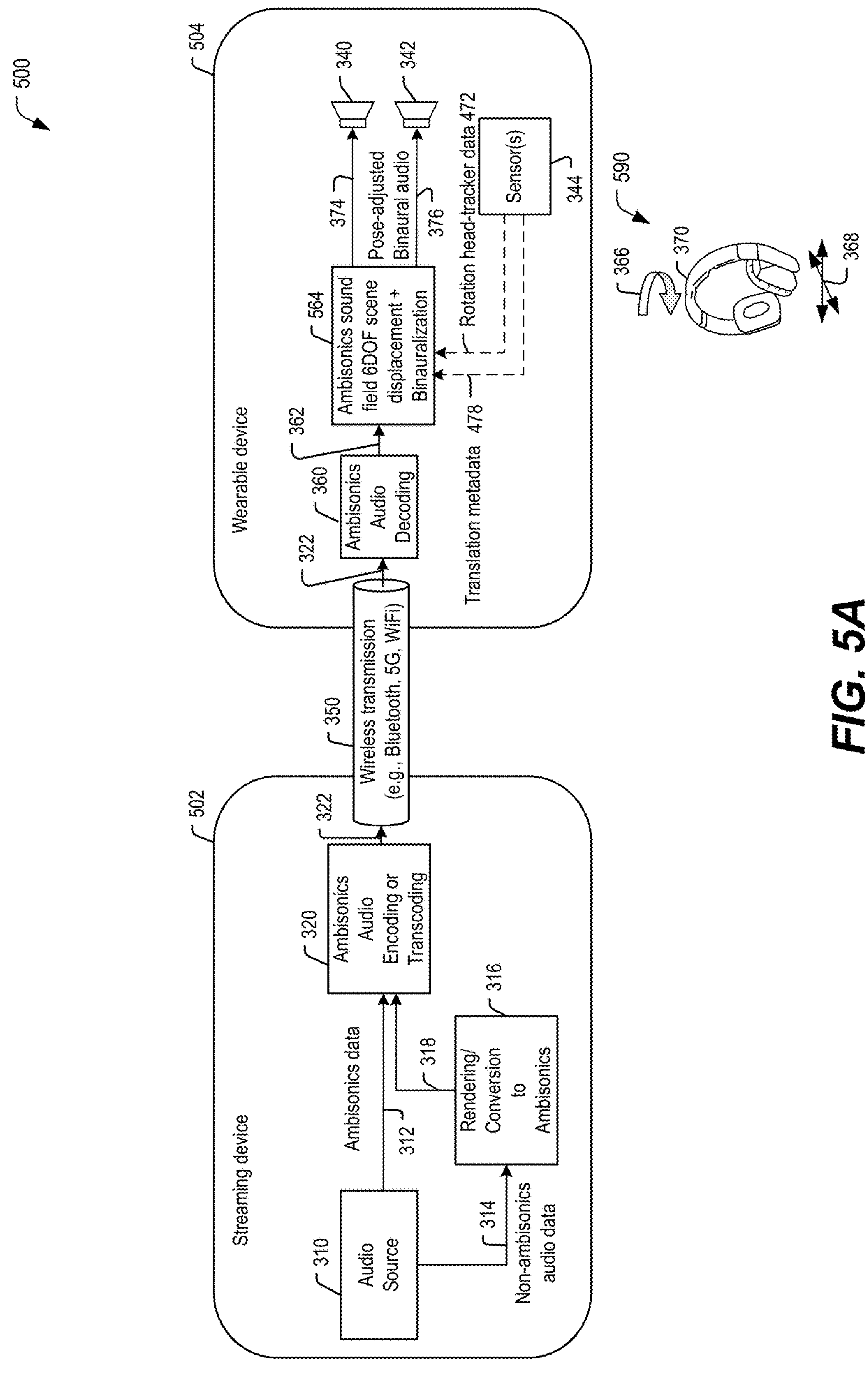
FIG. 5A is a block diagram illustrating a fifth implementation of components and operations of a system for adjusting a sound field.

FIG. 5A is a block diagram illustrating another implementation of components and operations of a system for adjusting a sound field. A system 500 includes a streaming device 502 coupled to a wearable device 504, also referred to as a playback device 504. The streaming device 502 includes the audio source 310 and performs one or more operations as described with reference to the streaming device 302 of FIG. 3A to provide the compressed coefficients 322 to the wearable device 504 via the wireless transmission 350.

The wearable device 504 (e.g., a headphone device) is configured to receive the compressed coefficients 322 and to perform the ambisonics audio decoding operation 360 to generate the ambisonics data 362. The wearable device 504 is also configured to generate the rotation head-tracker data 472 based on a rotation 366 of the wearable device 504 and to generate the translation metadata 478 based on a translation 368 of the wearable device 504, as described with reference to the wearable device 404 of FIG. 4A. A diagram 590 illustrates an example representation of the wearable device 504 implemented as a headphone device 370 to demonstrate examples of the rotation 366 and the translation 368.

An ambisonics sound field 6DOF scene displacement and binauralization operation 564 at the wearable device 504 performs compensation for head-rotation via sound field rotation based on the rotation head-tracker data 472 measured on the wearable device 504 and also modifies the sound field based on the user's location changes based on the translation metadata 478 (e.g., a 6DOF effect). In an illustrative example, audio processing for sound field rotation is relatively straightforward and can be performed with negligible latency (e.g., effectively instantaneously) in the time domain as compared to the update rate of the one or more sensors 344 (e.g., 100 updates per second); however, in some implementations updating of an ambisonics rotation matrix is performed with each new audio frame. Audio processing for translation for 6DOF at the wearable device 504 may include processing in a different domain, such as a short-time Fourier transform (STFT) domain, which may result in increased processing delay as compared to sound field rotation. However, the delay associated with translation processing at the wearable device 504 may be comparable to, or smaller than, the delay associated with transmitting translation data to the streaming device 502 and receiving updated audio data from the streaming device 502 based on the translation.

The ambisonics sound field 6DOF scene displacement and binauralization operation 564 at the wearable device 504 also performs binauralization of the compensated ambisonics sound field using HRTFs or BRIRs with or without headphone compensation filters associated with the wearable device 504 to output pose-adjusted binaural audio via a first output signal 374 to a first loudspeaker 340 and a second output signal 376 to a second loudspeaker 342. In some implementations, the ambisonics audio decoding operation 360 and the ambisonics sound field 6DOF scene displacement and binauralization operation 564 can be combined into a single operation to reduce computation resource usage at the wearable device 504.

In some implementations, the wearable device 504 corresponds to the second device 202 of FIG. 2, the ambisonics audio decoding operation 360 is performed at the decoder 228, the ambisonics sound field 6DOF scene displacement and binauralization operation 564 is performed at the sound field adjuster 224 and the renderer 222, and the rotation head-tracker data 472 and the translation metadata 478 collectively correspond to the sensor data 246.

The system 500 therefore enables low rendering latency wireless immersive audio with rotation and translation processing post transmission.

Figure 5B:
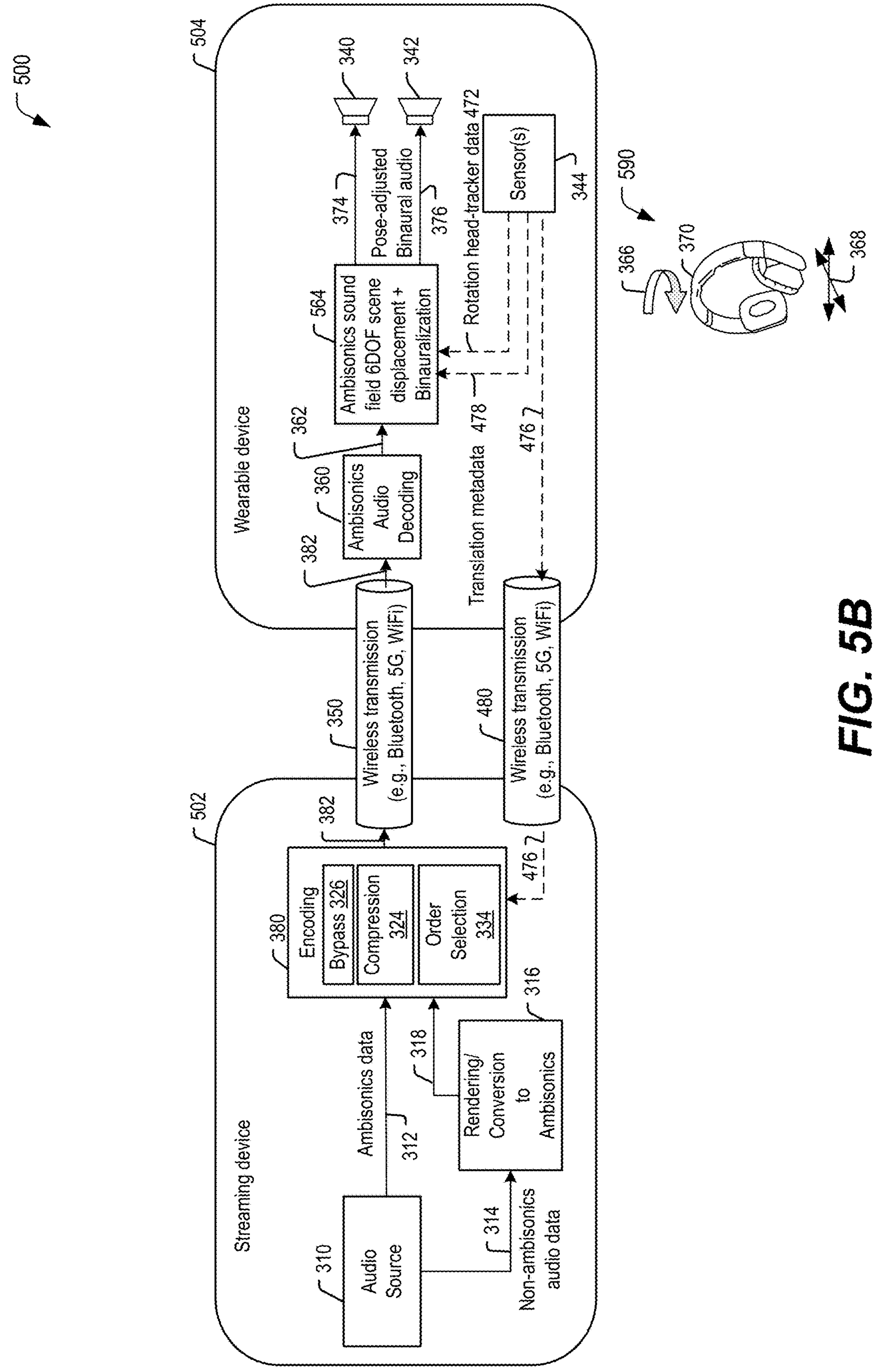
FIG. 5B is a block diagram illustrating a sixth implementation of components and operations of a system for adjusting a sound field.

FIG. 5B is a block diagram illustrating another implementation of the system 500 in which the ambisonics data 312 or 318 is processed by the encoding operation 380 of FIG. 3B (e.g., the bypass operation 326 or the compression encoding 324). The audio data 382 output from the encoding operation 380 can include compressed ambisonics coefficients from the compression encoding 324 or non-compressed ambisonics coefficients from the bypass operation 326. In addition, the audio data 382 can include a subset (e.g., fewer than all) of the ambisonics coefficients of the ambisonics data 312 or 318, such as due to operation of the order selection 334, the truncation operation 327, or a combination thereof.

In some implementations, the playback device 504 sends the movement data 476 to the streaming device 502 via the wireless transmission 480 described with reference to FIG. 4B. In some implementations, the movement data 476 is used in conjunction with the encoding operation 380 to obtain the order selection 334 and to reduce the number of ambisonics coefficients (either uncompressed or compressed) to send to the playback device 504.

Figure 6:
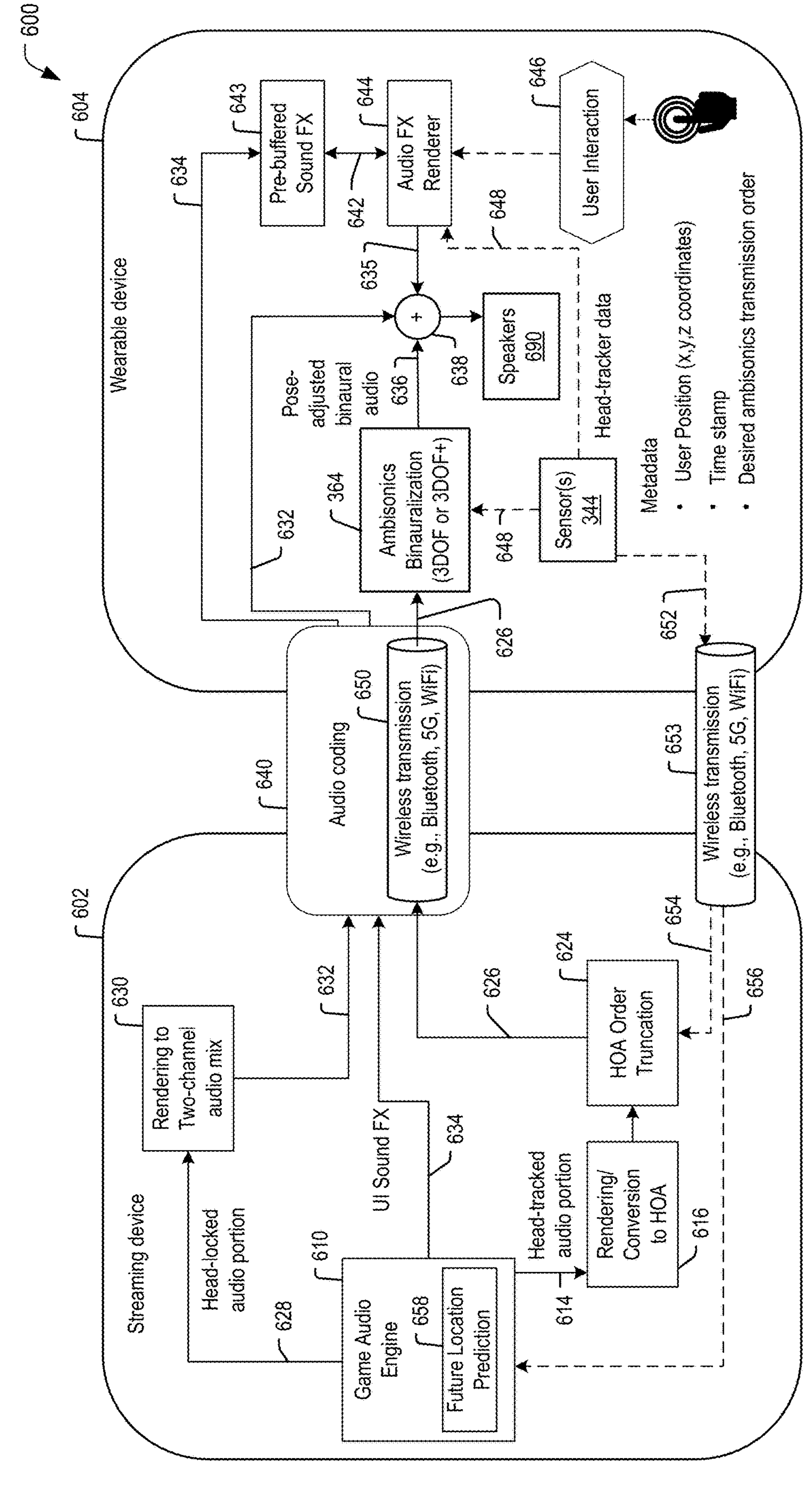
FIG. 6 is a block diagram illustrating a seventh implementation of components and operations of a system for adjusting a sound field.

FIG. 6 is a block diagram illustrating another implementation of components and operations of a system 600 for adjusting a sound field. The system 600 includes a streaming device 602 and a wearable device 604.

The streaming device 602 includes a game audio engine 610 that may correspond to the audio source 122. The game audio engine 610 outputs audio data including a head-tracked audio portion 614, a head-locked audio portion 628, and user interaction (UI) sound effects (FX) 634 (also referred to as "user interaction sound data 634"). To illustrate, the head-tracked audio portion 614 is updated to react to which way a person's head is turned when hearing sounds coming from the audio scene, while the head-locked audio portion 628 is not updated to react to which way the person's head is turned.

The streaming device 602 is configured to receive time-stamped location information 656 from the wearable device 604 via a wireless transmission 653. The streaming device 602 is configured to render the streamed audio content (e.g., the head-tracked audio portion 614) to an ambisonics sound field (e.g., FOA, HOA, or mixed-order ambisonics) and to use the received time-stamped location information 656 to account for a location change of a user of the wearable device 604. The time stamps enable prediction of future user movements, illustrated as a future location 658, that allows the system 600 to reduce the latency of the translation processing as perceived at the wearable device 604.

The streaming device 602 is also configured to selectively reduce an ambisonic order of output ambisonic data via a HOA order truncation operation 624 that is based on a request for a particular ambisonics order 654 received from the wearable device 604. For example, the request for a particular ambisonics order 654 may request to receive FOA data (e.g., to reduce a processing load at the wearable device 604 or to accommodate reduced available network bandwidth for a wireless transmission 650), and the HOA order truncation operation 624 may remove second order and higher order ambisonics data generated by a rendering/conversion to HOA operation 616 (e.g., may remove the data corresponding to n>1 in FIG. 1) to generate output ambisonics data 626. In another example, the HOA order truncation operation 624 is based on an actual or predicted amount of motion of the wearable device 604, such as described with reference to FIG. 4B.

The streaming device 602 is also configured to render a head-locked two-channel headphone audio stream 632 based on the head-locked audio portion 628 via a rendering to two-channel audio mix operation 630. The streaming device 602 is further configured to send the user interaction sound data 634 to the wearable device 604 to enable the wearable device 604 to pre-buffer the user interaction sound data 634 to reduce latency in playing out the user interaction sound data 634, as described further below.

The streaming device 602 performs an encoding portion of an audio coding operation 640. In some implementations, the audio coding operation 640 includes compressing the ambisonics coefficients (e.g., the output ambisonics data 626) and the head-locked two-channel headphone audio stream 632, such as with a low-delay codec (e.g., based on AptX, AAC-LD, or EVS), and the streaming device 602 transmits the compressed audio data wirelessly to the wearable device 604 along with the user interaction sound data 634 within a configuration payload. In other implementations, the audio coding operation 640 does not include compressing the ambisonics coefficients, such as described with reference to the bypass operation 326 of FIG. 3B.

In some implementations, the streaming device 602 corresponds to the first device 102 of FIG. 2, the game audio engine 610 corresponds to the audio source 122, the rendering/conversion to HOA operation 616 is performed at the sound field representation generator 124, the HOA order truncation operation 624 and the rendering to two-channel audio mix operation 630 are performed by the one or more processors 120, and an encoding portion of the audio coding operation 640 is performed at the encoder 128.

The wearable device 604 decodes the ambisonics coefficients (e.g., the output ambisonics data 626) and the head-locked audio (e.g., the head-locked two-channel headphone audio stream 632) via a decoding portion of the audio coding operation 640. The wearable device 604 also decodes the user interaction sound data 634 and buffers the decoded user interaction sound data 634 in memory as pre-buffered user interaction sound data 643.

The wearable device 604 compensates for head-rotation via sound field rotation based on head-tracker data 648 measured via the one or more sensors 344 on the wearable device 604 (and optionally also processes a low-latency 3DOF+effect with limited translation), via operation of the ambisonics sound field 3DOF/3DOF+rotation and binauralization operation 364, to generate pose-adjusted binaural audio data 636. The wearable device 604 also generates metadata 652 for transmission to the streaming device 602. The metadata 652 includes the request for a particular ambisonics order 654 and the time-stamped location information 656 (e.g., indicating user positions (e.g., using (x,y,z) coordinates) and time stamps associated with the user positions).

The pose-adjusted binaural audio data 636 and the head-locked two-channel headphone audio stream 632 are combined at a combiner 638 (e.g., a mixer) and output to speakers 690 (e.g., the loudspeakers 340, 342) of the wearable device 604. In addition, a user interaction sound 635 may be triggered by a user interaction 646 detected at the wearable device 604 and the user interaction sound 635 may be provided to the combiner 638 to be played out at the loudspeakers. For example, in response to detecting the user interaction 646 (e.g., by detecting that translation data indicates that the user of the wearable device 604 is at a location of a virtual object within the game environment, is oriented to face the virtual object, or a combination thereof), audio data 642 corresponding to a particular user interaction is retrieved from the pre-buffered user interaction sound data 643 stored in the memory on the wearable device 604. The audio data 642 is rendered at an audio effects renderer 644, which may also take the head-tracker data 648 into account, to generate the user interaction sound 635. The pre-buffered user interaction sounds are thus triggered and rendered in low latency at the wearable device 604.

To reduce memory usage on the wearable device 604, in some implementations one or more initial audio frames of each of the user interaction sounds represented in the user interaction sound data 634 are decoded and the decoded frames are pre-buffered at the wearable device 604 and the remaining encoded frames are stored at the memory on the wearable device 604. Once the sound effect is triggered, the previously decoded and pre-buffered initial one or more frames are played out with low latency while the remaining frames are decoded so that the remaining frames are available for playout following the playout of the initial one or more frames.

In some implementations, the wearable device 604 corresponds to the second device 202 of FIG. 2, the decoding portion of the audio coding operation 640 is performed at the decoder 228, the ambisonics sound field 3DOF/3DOF+ rotation and binauralization operation 364 is performed at the sound field adjuster 224 and the renderer 222, and the head-tracker data 648 corresponds to the sensor data 246.

Although the system 600 illustrates processing head-locked audio, pre-buffering user interaction sounds, and HOA order truncation, in other implementations the functionality associated with the head-locked audio processing, the user interaction sounds, the HOA order reduction, or any combination thereof, may be omitted.

The system 600 therefore enables low rendering latency wireless immersive audio by further incorporating pose prediction and interactive sound rendering.

Figure 7:
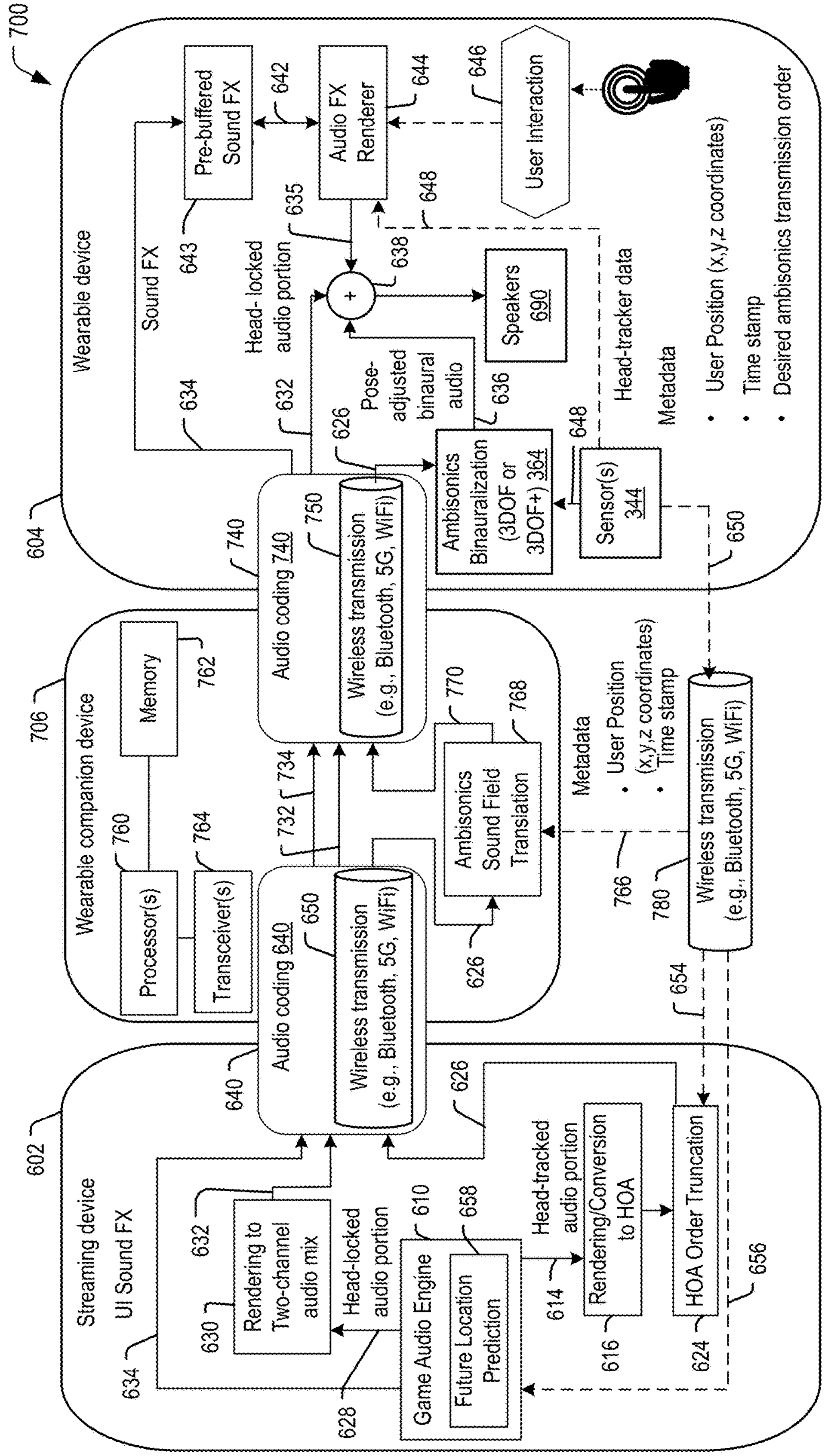
FIG. 7 is a block diagram illustrating an eighth implementation of components and operations of a system for adjusting a sound field.

FIG. 7 is a block diagram illustrating another implementation of components and operations of a system 700 for adjusting a sound field. The system 700 includes a wearable companion device 706 coupled to the streaming device 602 and to the wearable device 604. The streaming device 602 and the wearable device 604 operate in a similar manner as described with reference to FIG. 6.

The wearable companion device 706 is associated with the wearable device 604 and receives the ambisonics coefficients (e.g., the output ambisonics data 626) from the streaming device 602, performs a low-latency ambisonics sound field translation operation 768 based on location information (e.g., user position and time stamp data 766) received from the wearable device 604 via a wireless transmission 780, and transmits the translated sound field wirelessly to the wearable device 604. For example, the ambisonics sound field translation operation 768 outputs adjusted audio data 770 to be encoded via an encoding portion of an audio coding operation 740 and transmitted to the wearable device 604 via a wireless transmission 750. The user interaction sound data 634 may remain encoded at the wearable companion device 706 (as encoded sound data 734) and may be re-transmitted to the wearable device 604 via the wireless transmission 750. The head-locked two-channel headphone audio stream 632 may remain encoded at the wearable companion device 706 (as encoded head-locked two-channel headphone audio stream 732) and may be re-transmitted to the wearable device 604 via the wireless transmission 750.

The ambisonics sound field translation operation 768 may adjust the sound field based on the actual detected user position or based on a future location prediction of the wearable device 604 for the time at which the currently-adjusted audio will be played out at the wearable device 604. For example, future location prediction can be performed by estimating a direction and speed of movement of the wearable device 604 as indicated by changes between two or more most recent locations of the wearable device 604 and extrapolating, based on the direction and speed, a location that the wearable device 604 will be at a specific future time. The future time can be at least partially based on a transmission latency associated with a transmission path to the wearable device 604, so that the longer it takes for the audio data to reach the wearable device 604, the farther into the future the future location prediction is made. In some implementations, future location prediction is performed at the streaming device 602, at the wearable companion device 706, or at both. In some implementations, a latency associated with generating the adjusted audio data 770 at the wearable companion device 706 and transmitting the adjusted audio data 770 to the wearable device 604 is sufficiently small to enable use of the actual user position (i.e., not future prediction) to shift the sound field without causing a user-perceptible delay between the user's movement and a corresponding shift in the sound field during playback.

The wearable companion device 706 includes one or more processors 760 coupled to one or more transceivers 764 and to a memory 762. The memory 762 stores instructions that are executable by the one or more processors 760. The one or more processors 760 are configured to receive, from the streaming device 602, compressed audio data (e.g., a compressed version of the output ambisonics data 626 generated during an encoding portion of the audio coding operation 640) that represents a sound field. The one or more processors 760 are configured to receive, from a playback device (e.g., the wearable device 604), data corresponding to locations associated with the playback device at a plurality of time instances (e.g., the user position and time stamp data 766). In some implementations, the one or more processors 760 are configured to generate a predicted location of the device based on the data corresponding to the locations associated with the playback device. The predicted location indicates a prediction of where the playback device will be when the audio data is played out at the playback device.

The one or more processors 760 are configured to decompress the compressed audio data, such as via a decoding portion of the audio coding operation 640, and to adjust the decompressed audio data to translate the sound field based on the predicted location, such as via the ambisonics sound field translation operation 768. The one or more processors 760 are configured to compress the adjusted audio data 770 (e.g., at an encoding portion of the audio coding operation 740) and send the compressed adjusted audio data as streaming data, via wireless transmission, to the playback device.

The wearable companion device 706 enables offloading of computationally expensive operations, such as sound field translation, to a device that is closer to the wearable device 604 than the streaming device 602 and that can have increased computation and power resources as compared to the wearable device 604, such as a smart phone, smart watch, or one or more other electronic devices. Sound field translation (either based on actual or predicted user location) performed at the wearable companion device 706 can be more accurate as compared to sound field translation (either based on actual or predicted user location) performed by the streaming device 602 due to the reduced distance, and therefore reduced transmission latency, to and from the wearable device 604. As a result, a user experience may be improved.

The systems illustrated in FIGS. 6 and 7 thus illustrate several operations that may be performed by the streaming device 602, the wearable device 604, and optionally the wearable companion device 706. In some implementations, the streaming device 602 includes one or more processors (e.g., the one or more processors 120) configured to receive sound information from an audio source (e.g., the game audio engine 610). The one or more processors of the streaming device 602 are also configured to receive, from a playback device (e.g., the wearable device 604), data corresponding to locations associated with the playback device at a plurality of time instances (e.g., the time stamped location data 656).

The one or more processors of the streaming device 602 are also configured to convert the sound information to audio data that represents a sound field based on the data corresponding to the locations associated with the playback device (e.g., via the rendering/conversion to HOA operation 616). The one or more processors of the streaming device 602 are also configured to send the audio data as streaming data, via wireless transmission, to one or both of the playback device (e.g., the wearable device 604) or a second device (e.g., the wearable companion device 706) that is coupled to the playback device.

In some implementations, the one or more processors of the streaming device 602 are configured to generate a predicted location (e.g., the predicted future location 658) of the playback device based on the data corresponding to the locations associated with the playback device. The predicted location indicates a prediction of where the playback device (e.g., the wearable device 604) will be when the audio data is played out at the playback device. The one or more processors of the streaming device 602 are configured to convert the sound information to the audio data (e.g., the head-tracked audio portion 614) that represents the sound field based on the predicted location.

In some implementations, the one or more processors of the streaming device 602 are configured to send, to one or both of the playback device (e.g., the wearable device 604) or the second device (e.g., the wearable companion device 706), sound effects data (e.g., the user interaction sound data 634) from the audio source to be buffered and accessible to the playback device for future playout, and at least a portion of the sound effects data is sent independently of any scheduled playout of the portion of the sound effects data.

In some implementations, the one or more processors of the streaming device 602 are configured to receive, from the audio source, a head-locked audio portion (e.g., the head-locked audio portion 628), and generate, based on the head-locked audio portion, head-locked audio data corresponding to pose-independent binaural audio (e.g., the head-locked two-channel headphone audio stream 632).

In some implementations, the one or more processors of the streaming device 602 are configured to send the head-locked audio data, via wireless transmission, to one or both of the playback device or the second device to be played out at the playback device.

In some implementations, the audio data corresponds to ambisonics data, and the one or more processors of the streaming device 602 are further configured to receive an indication of an ambisonics order from the playback device (e.g., the request for a particular ambisonics order 654) and to adjust the audio data to have the ambisonic order (e.g., via the HOA order truncation operation 624).

In some implementations, the one or more processors of the streaming device 602 are configured to, after receiving the data corresponding to the locations associated with the playback device, receive additional data corresponding to locations associated with the playback device, generate updated audio data based on the additional data, and send the updated audio data to the playback device.

The wearable device 604 of FIGS. 6 and 7, in some implementations, includes one or more processors (e.g., the one or more processors 220) configured to receive sound information from an audio source (e.g., the game audio engine 610).

The one or more processors of the wearable device 604 are configured to obtain data, at a plurality of time instances, associated with tracking location and an orientation associated with movement of the wearable device 604, such as the head-tracker data 648, the metadata 652, the time stamped location data 656, the user position and time stamp data 766, or any combination thereof. The one or more processors of the wearable device 604 are also configured to send the data to a remote device (e.g., the streaming device 602 or the wearable companion device 706) via wireless transmission.

The one or more processors of the wearable device 604 are also configured to receive, via wireless transmission from the remote device, compressed (or uncompressed) audio data representing a sound field, to decompress the compressed audio data representing the sound field, to adjust the decompressed audio data (e.g., the output ambisonics data 626) to alter the sound field based on the orientation associated with the wearable device 604, and to output the adjusted decompressed audio data (e.g., the pose-adjusted binaural audio data 636), to two or more loudspeakers (e.g., via the combiner 638).

In some implementations, the wearable device 604 includes a memory configured to store the decompressed audio data, such as the memory 210 of FIG. 2. The one or more processors of the wearable device 604 may be configured to adjust the decompressed audio data based on applying the data associated with tracking the location and the orientation associated with the movement of the wearable device 604, such as via the ambisonics sound field 3DOF/3DOF+rotation and binauralization operation 364. The decompressed audio data can include ambisonic data that corresponds to at least one of two-dimensional (2D) data that represents a 2D sound field or three-dimensional (3D) data that represents a 3D sound field.

In some implementations, the one or more processors of the wearable device 604 are configured to further adjust the decompressed audio data to translate the sound field based on a difference between a location of the wearable device 604 and a location associated with the sound field, where adjustment of the decompressed audio data based on the difference is restricted to translation of the sound field forward, backward, left, or right. For example, the adjustment of the decompressed audio data based on the difference can be performed as a 3DOF+effect during performance of the ambisonics sound field 3DOF/3DOF+rotation and binauralization operation 364.

In some implementations, the one or more processors of the wearable device 604 are also configured to receive head-locked audio data via wireless transmission, such as the head-locked two-channel headphone audio stream 632, and to combine the head-locked audio data with the adjusted decompressed audio data, such as at the combiner 638, for output to the two or more loudspeakers. In an example, the adjusted decompressed audio data (e.g., the pose-adjusted binaural audio data 636) corresponds to pose-adjusted binaural audio, and the head-locked audio data (e.g., the head-locked two-channel headphone audio stream 632) corresponds to pose-independent binaural audio.

In some implementations, the wearable device 604 includes a buffer accessible to the one or more processors, such as the memory 210, a dedicated portion of the memory 210, one or more other storage devices or buffers, or a combination thereof. The one or more processors of the wearable device 604 may be further configured to receive sound effect data ahead of time via wireless transmission and to pre-buffer the sound effect data in the buffer, such as the pre-buffered user interaction sound data 643.

In some implementations, the one or more processors of the wearable device 604 are also configured to, responsive to receiving an indication of user interaction with a virtual object associated with the sound effect data, retrieve, from the buffer, a portion of the pre-buffered sound effect data corresponding to the virtual object and combine the portion of the pre-buffered sound effect data (e.g., rendered as the user interaction sound 635) with the adjusted decompressed audio data (e.g., the pose-adjusted binaural audio data 636) for output to the two or more loudspeakers.

In some implementations, the one or more processors of the wearable device 604 are configured to send an indication of an ambisonic order to the remote device, such as the request for a particular ambisonics order 654, and responsive to sending the indication, receive updated audio data having the ambisonic order via wireless transmission.

Figure 8A:
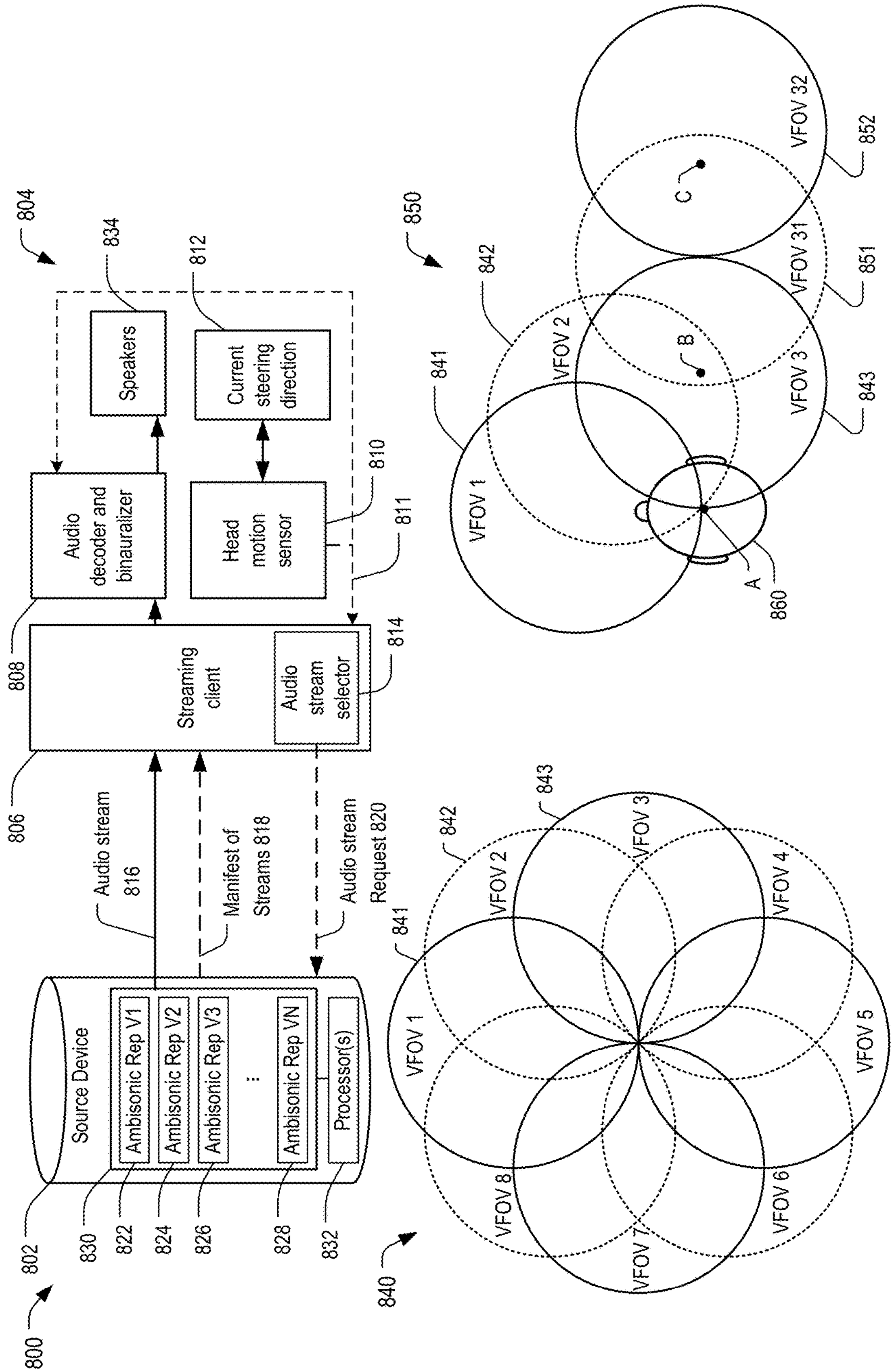
FIG. 8A is a block diagram illustrating a ninth implementation of components and operations of a system for adjusting a sound field.

FIG. 8A is a block diagram illustrating another implementation of components and operations of a system 800 for adjusting a sound field. The system 800 includes a source device 802 coupled to a device 804, also referred to as a playback device 804. The source device 802 is configured to provide, to the device 804, an audio stream 816 based on an ambisonics representation that is selected from multiple ambisonics representations of a sound scene. The source device 802 may correspond to a portable electronic device (e.g., a phone), a vehicle (e.g., a car), or a server (e.g., a cloud server), as illustrative, non-limiting examples.

The source device 802 includes one or more processors 832 and a memory 830. The memory 830 is coupled to the one or more processors 832 and is configured to store a plurality of representations of the sound field. As illustrated, the memory 830 includes multiple ambisonics representations 822-828 of the sound field corresponding to different viewport fields of view of the device 804. In some implementations, the Nth ambisonics representation VN 828 (where N is a positive integer) corresponds to an ambisonics representation of the sound field that is not specific to any particular viewport field of view. In some implementations, the source device 802 corresponds to the first device 102, the one or more processors 832 correspond to the one or more processors 120, and the memory 830 corresponds to the memory 110. In some implementations, the source device 802 corresponds to one or more of the streaming devices of FIGS. 3A-7.

The one or more processors 832 are configured to provide, to the device 804, a manifest of streams 818 that indicates the ambisonics representations 822-828 available at the memory 830. The one or more processors 832 are also configured to receive an audio stream request 820 from the device 804 indicating a selected one of the ambisonics representations 822-828 and, in response to the audio stream request, update the audio stream 816 based on the selected ambisonics representation.

The device 804 includes a streaming client 806, an audio decoder and binauralizer 808, a head motion sensor 810, and multiple speakers 834. The streaming client 806 and the audio decoder and binauralizer 808 may be implemented at the device 804 via one or more processors executing instructions from a memory, such as the one or more processors 220 of the second device 202 of FIG. 2 executing the instructions 212 stored at the memory 210. In some implementations, the device 804 corresponds to the second device 202, the audio decoder and binauralizer 808 corresponds to the decoder 228, the sound field adjuster 224, and the renderer 222, the head motion sensor 810 corresponds to the one or more sensors 244, and the speakers 834 correspond to the loudspeakers 240, 242. In some implementations, the device 804 corresponds to one or more of the wearable devices of FIGS. 3A-7.

The streaming client 806 is configured to receive the audio stream 816 and provide the audio stream 816 to the audio decoder and binauralizer 808, which outputs pose-adjusted binaural audio signals to the speakers 834. The head motion sensor 810 determines a pose of the device 804 via detection of a location and orientation of the device 804. To illustrate, the head motion sensor 810 detects a current steering direction 812 of the device 804, which may correspond to a viewport field of view of the device 804, and outputs head tracker data 811 (e.g., the sensor data 246). The head tracker data 811 is provided to the audio decoder and binauralizer 808 for sound field rotation (e.g., 3DOF), rotation and limited translation (e.g., 3DOF+), or rotation and translation (e.g., 6DOF). The head tracker data 811 is also provided to an audio stream selector 814 of the streaming client 806.

The audio stream selector 814 selects one of the ambisonics representations 822-828 based on the location of the device 804, the current steering direction 812 or other rotation information, or a combination thereof. The audio stream selector 814 issues the audio stream request 820 upon determining that the selected ambisonics representation is different than the previously selected ambisonics representation corresponding to the audio stream 816.

A diagram 840 illustrates eight overlapping viewport fields of view VFOV 1 VFOV 8, in which the viewport fields of view are shown using alternating dashed lines and solid lines for clarity of illustration. Each of the viewport fields of view corresponds to a 45-degree rotation of the head of a wearer of the device 804 when the wearer is located at the center of the diagram 840. In an example, the diagram 840 may correspond to eight possible viewports in a VR device in a 2D plane. Alternatively, the diagram 840 may correspond to a 2D cross-section of eight overlapping spherical viewports in a VR device in a 3D space.

Each of the overlapping viewport fields of view corresponds to a respective ambisonics representation in the memory 830. For example, a first viewport field of view 841 corresponds to a first ambisonics representation 822, a second viewport field of view 842 corresponds to a second ambisonics representation 824, a third viewport field of view 843 corresponds to a third ambisonics representation 826. Although eight viewport fields of view are illustrated in a rotationally symmetric arrangement, in other implementations fewer than eight or more than eight viewport fields of view may be used, may be arranged in different arrangements, or a combination thereof.

During operation, the wearer of the device 804 (e.g., a headphone device) may face toward the first viewport field of view 841 (e.g., a first pose of the device 804). The device 804 transmits data associated with the first pose of the device 804, such as an audio stream request 820 for the first ambisonics representation 822, or orientation information, translation information, or both in implementations in which the source device 802 is configured to select the ambisonics representation for the device 804 based on the pose of the device 804.

The source device 802 receives, via wireless transmission from the device 804 (e.g., a playback device), the data associated with the first pose of the playback device 804. The source device 802 selects, based on the data, a particular representation of the sound field (e.g., the first ambisonics representation 822) from the plurality of representations 822-828 of the sound field stored at the memory 830. The source device 802 generates audio data corresponding to the selected first ambisonics representation 822 and sends, via wireless transmission, the audio data as streaming data (e.g., the audio stream 816) to the device 804. The audio data may be sent as compressed ambisonics coefficients or as uncompressed ambisonics coefficients, such as based on a latency criterion, an available bandwidth, or both, as described with reference to FIG. 3B.

The device 804 receives, via wireless transmission from the source device 802, the audio data corresponding to the first ambisonics representation 822 of the sound field corresponding to the first viewport field of view 841 associated with the first pose of the device 804. If the audio data is compressed, the device 804 decompresses the compressed audio data, and the device 804 outputs the resulting audio to the speakers 834 (e.g., two or more loudspeakers).

In response to the wearer of the device 804 rotating the user's head toward the second viewport field of view 842 (e.g., a second pose of the device 804), the device 804 sends, to the source device 802, data associated with the second pose (e.g., an audio stream request 820 for the second ambisonics representation 824, or orientation information, translation information, or both).

The source device 802 receives the second data associated with the second pose and selects, based on the second data, the second ambisonics representation 824 of the sound field from the plurality of representations of the sound field as corresponding to the second viewport field. The source device 802 generates second audio data corresponding to the second representation of the sound field and sends, via wireless transmission, the second audio data as streaming data (e.g., the audio stream 816) to the device 804.

The device 804 receives the updated audio data from the source device 802 that corresponds to the second ambisonics representation 824 of the sound field, which corresponds to the second viewport field of view 842 that partially overlaps the first viewport field of view 841 and that is associated with the second pose. The device 804 outputs the updated audio data to the speakers 834.

In some implementations, such as when the ambisonics representations 822-828 correspond to using mixed order ambisonics, the first ambisonics representation 822 provides higher resolution for audio sources in the first viewport field of view 841 than for audio sources outside the first viewport field of view 841, and the second ambisonics representation 824 provides higher resolution for audio sources in the second viewport field of view 842 than for audio sources outside the second viewport field of view 842. By changing sound fields as the steering direction of the device 804 changes, higher resolution may be provided for sounds of interest to the wearer, while bandwidth and processing resources may be conserved by reducing resolution for sounds that are likely of lesser interest to the wearer.

Although in some implementations the ambisonics representations 822-828 correspond to using mixed order ambisonics, in other implementations the ambisonics representations 822-828 correspond to using the full ambisonics order. In other examples, the source device 802 may provide one or more of object-based representations of the sound field, higher order ambisonics representations of the sound field, mixed order ambisonics representations of the sound field, a combination of object-based representations of the sound field with higher order ambisonics representations of the sound field, a combination of object-based representations of the sound field with mixed order ambisonics representations of the sound field, or a combination of mixed order representations of the sound field with higher order ambisonics representations of the sound field. By changing between representations corresponding to overlapping viewport fields of view, abrupt transitions in the immersive audio due to switching between non-overlapping representations may be reduced or avoided, improving the user experience.

In addition to changing ambisonics representations of the audio field based on rotation, in some implementations the ambisonics representations of the audio field are selected based on translation of the device 804, such as due to a wearer of the device 804 walking from the wearer's position at the center of the diagram 840.

A second diagram 850 illustrates a portion of a set of viewport fields of view that may include, in addition to VFOV 1-8 of the first diagram 840, a fourth viewport field of view 851 (VFOV 31) and a fifth viewport field of view 852 (VFOV 32). A wearer 860 of the device 804 is illustrated having a first pose at a location "A" and facing the first viewport field of view 841. The wearer 860 may move to a second pose in which the device 804 is translated to a location "B" within the third field of view 843 and rotated to face the fourth viewport field of view 851. During the transition between the first pose and the second pose, the device 804 may receive streaming audio that transitions from being encoded based on the first ambisonics representation 822 (corresponding to VFOV 1) to being encoded based on the second ambisonics representation 824 (corresponding to VFOV 2) to being encoded based on the third ambisonics representation 826 (corresponding to VFOV 3). Upon attaining the second pose at location B, the device 804 receives streaming audio based on a representation of the sound field corresponding to the fourth viewport field of view 851.

Further movement of the device 804 from the second pose at location B to a third pose, in which the wearer of the device 804 is at location "C" and faces toward the fifth viewport field of view 852, results in the device 804 receiving streaming audio based on a representation of the sound field corresponding to the fifth viewport field of view 852. Thus, the representations of the sound field selected from the memory 830 can be selected based on rotation (e.g., as described for the diagram 840), based on translation (e.g., moving from the second pose at location B to the third pose at location C), or based on both the rotation and translation (e.g., moving from the first pose at location A to the second pose at location C).

In some implementations, the device 804, the source device 802, or both, are configured to select a representation of the sound field corresponding to a translation of the sound field, and the translation of the sound field exceeds a translation of the device 804 between a first pose and a second pose. For example, the device 804 can select the representation of the sound field associated with the fifth viewport field of view 852 even though the wearer 860 has not moved from location A. For example, the wearer 860 may be in a game that allows the wearer 860 to "jump" to a distant location (e.g., to location C), or the device 804 may include a camera that is able to associate audio with a distant source, the device 804 can transition directly from one representation of the sound field (e.g., corresponding to third viewport field of view 843) to a second representation of the sound field (e.g., corresponding to fifth viewport field of view 852) without transitioning through representations of the sound field corresponding to intervening viewport fields of view (e.g., without using the representation of the sound field corresponding to fourth viewport field of view 851).

Thus, the ambisonics representations may be streamed based on rotation, translation, or both and the appropriate ambisonics representation of a sound field may be sent to the device 804.

Figure 8B:
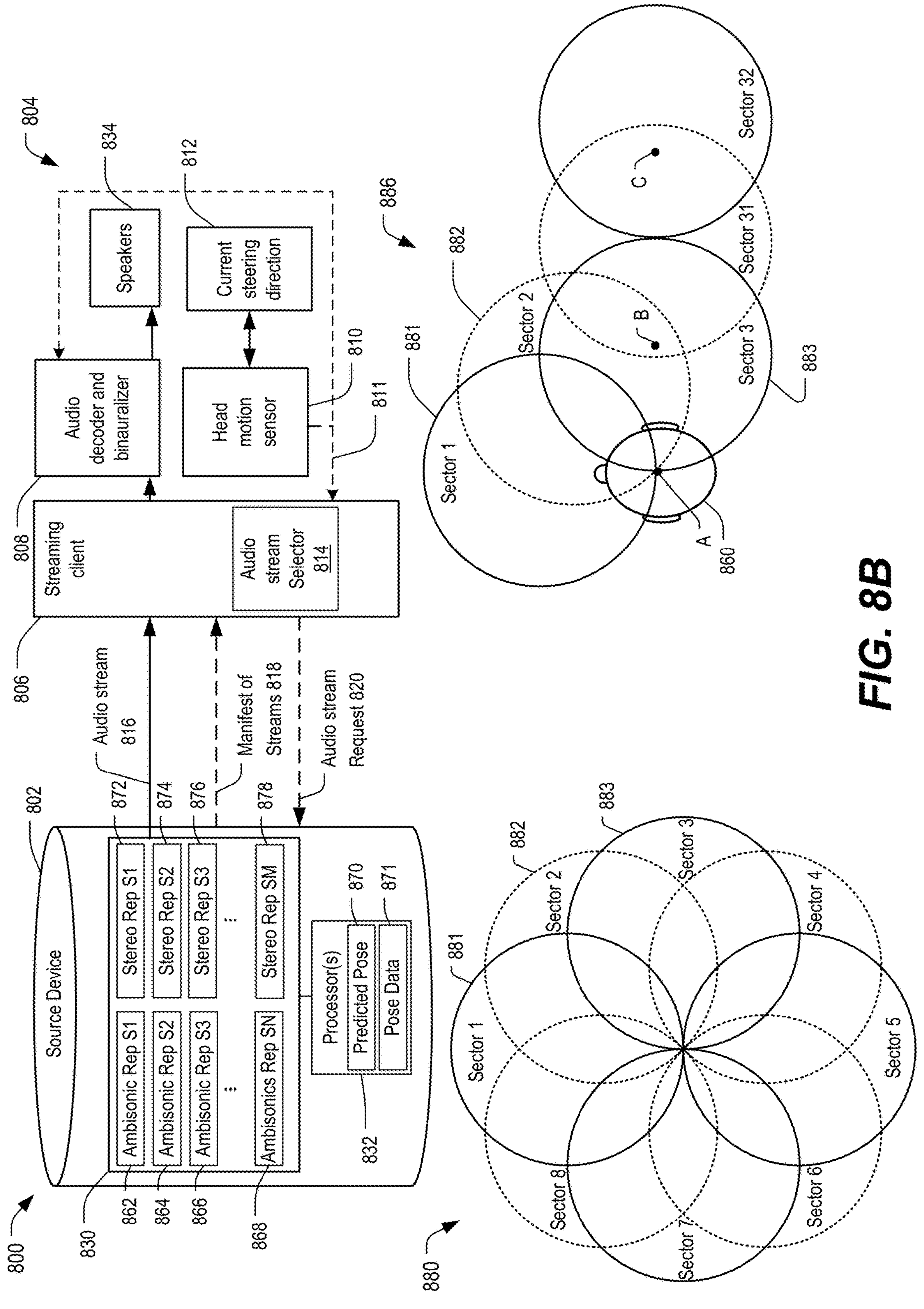
FIG. 8B is a block diagram illustrating a tenth implementation of components and operations of a system for adjusting a sound field.

FIG. 8B includes a block diagram of another implementation of the system 800 in which the source device 802 stores representations of multiple sectors of a sound scene.

The representations of the sectors of the sound scene are stored in multiple formats, illustrated as ambisonics representations 862-868 of a sound field corresponding to sectors 1-N respectively and pre-rendered stereo representations 872-878 corresponding to sectors 1-M, respectively, where M is a positive integer. Although in some implementations the sectors of the sound scene may be analogous to, and/or may coincide with, the viewport fields of view illustrated in FIG. 8A, the system 800 of FIG. 8B can be used independently of any visual references, such as in audio-only implementations, extended reality (XR) implementations, or augmented reality (AR) implementations that are devoid of any viewport fields of view, as illustrative, non-limiting examples.

In some implementations, each respective ambisonics representation 862-868 of the sound field corresponds to a different sector of a set of sectors, such as a first sector 881, a second sector 882, and a third sector 883 illustrated in a diagram 880. Each of the sectors represents a range of values associated with movement of the playback device 804. Each of the ambisonics representations 862-868 includes ambisonics data (e.g., ambisonics coefficients corresponding to zeroth order ambisonics, first order ambisonics, higher order ambisonics, mixed order ambisonics, or a combination thereof). In some implementations, the ambisonics representations 862-868 include or correspond to pre-rotated sound fields. To illustrate, the ambisonics representations 862-868 may correspond to regular increments of rotation around an axis, such as one-degree increments, and the memory 830 may store at least 360 ambisonics representations (e.g., N=360). As other examples, the ambisonics representations 862-868 may correspond to pre-rotated sound fields at five-degree increments (e.g., N=72), or any other increment size. Similarly, in some implementations, each respective stereo representation also includes pre-rendered stereo data corresponding to pre-rotated sound fields, such as at 45-degree increments (e.g., M=8), or at any other increment size. Although in some implementations uniform increments are used (e.g., 45-degree increments), in other implementations non-uniform increment sizes may be used.

The one or more processors 832 of the source device 802 are configured to receive, via wireless transmission from a playback device 804, pose data 871 associated with a pose of the playback device 804. For example, the pose data 871 may be included in the audio stream request 820 and may include orientation information, translation information, or both. The orientation information may indicate a detected orientation, a detected rotation (e.g., a change in orientation), or both, of the playback device 804. The translation information may indicate a detected location, a detected translation (e.g., a change in location), or both, of the playback device 804.

The one or more processors 832 are configured to select, based on the pose data 871, a particular representation of a sound field from a plurality of representations of the sound field, such as from the ambisonics representations 862-868 or from the stereo representations 872-878. The one or more processors 832 are configured to generate audio data corresponding to the selected representation of the sound field and to send, via wireless transmission, the audio data as streaming data (e.g., the audio stream 816) to the playback device 804.

In some implementations, the source device 802 selects the particular representation based on a predicted pose 870 of the playback device 804. In an example, the one or more processors 832 are configured to determine the predicted pose 870 based on a time series of the pose data 871 received from the playback device 804, such as via a Kalman filter or another prediction technique, and select a representation based on a prediction of what the pose of the playback device 804 will be when the audio data corresponding to the selected representation is played out. In another example, the source device 802 receives the predicted pose 870 from the playback device 804.

In some implementations, the source device 802 is configured to select a particular representation of the sound field further based on a reference pose of the playback device 804. For example, the playback device 804 may correspond to a headset device, and upon initialization of the headset, an orientation and location of the headset may be used as the reference pose (e.g., may be used by the source device 802 as a coordinate origin from which changes in orientation or translation are calculated). The source device 802 may be operable to update the reference pose based on the pose of the playback device and responsive to one or more events, such as receipt of a user instruction to update the reference pose. In an illustrative example, the source device 802 may update the reference pose based on receiving a reference reset instruction, such as via a wireless transmission from the playback device 804 responsive to user input received at a user interface of the playback device 804.

In some implementations, the source device 802 is configured to select a particular representation of the sound field to have a different audio format than an audio format of a prior representation of the sound field based on a change of an orientation of the playback device 804 exceeding a threshold. To illustrate, when an amount of movement of the playback device 804 (e.g., a speed at which the user's head turns) exceeds, or is predicted to exceed, the threshold, the movement may impair the user's ability to perceive fine resolution of the sound field, and the source device 802 may transition from streaming audio data in an ambisonics format to streaming the audio data in a pre-rendered stereo format. When the amount of movement falls below (or is predicted to fall below) the threshold, the source device 802 may resume transmitting the audio data using the ambisonics format.

Examples of sectors corresponding to a range of values associated with rotation, and both rotation and translation, of the playback device 804 are graphically depicted in diagrams 880 and 886, respectively. In such examples, the source device 802 may select an appropriate representation of the sound field based on movement of the playback device 804 in an analogous manner as described with reference to diagrams 840 and 850, respectively, of FIG. 8A.

Although two audio formats are illustrated (ambisonics and stereo), it should be understood that in other implementations the source device 802 can operate using a single audio format or more than two audio formats to provide the audio stream 816 to the device 804. Although ambisonics and stereo formats are illustrated, in other implementations one or more other audio formats can be used in place of, or in addition to, the ambisonics format, the stereo format, or both.

Figure 8C:
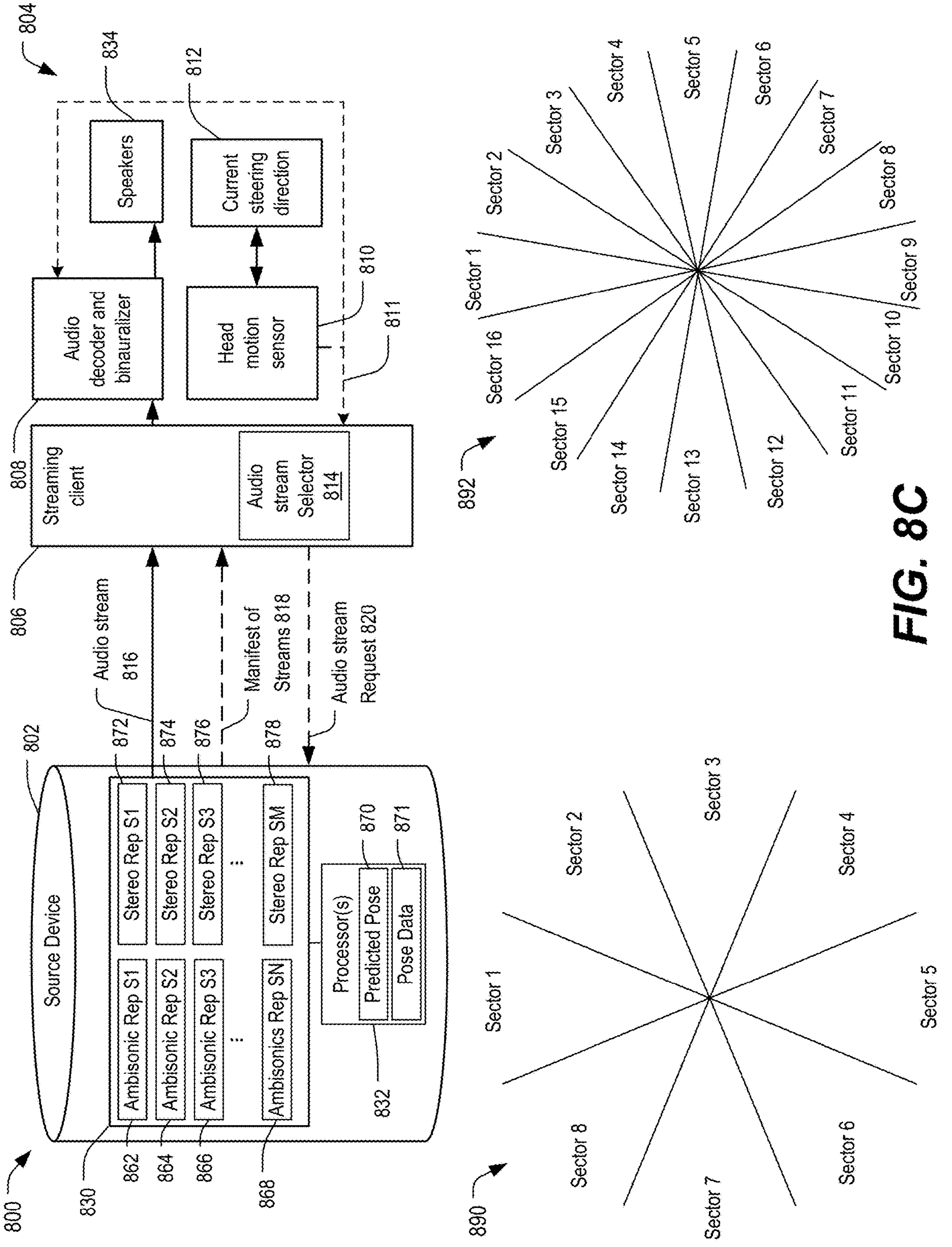
FIG. 8C is a block diagram illustrating an eleventh implementation of components and operations of a system for adjusting a sound field.

Although FIG. 8B depicts examples in which the sectors are overlapping, in other implementations the source device 802 selects representations of the sound field based on non-overlapping sectors that represent ranges of values associated with movement of the playback device 804. To illustrate, FIG. 8C depicts an example of the system 800 in which the source device 802 selects a representation of the sound field based on non-overlapping sectors associated with movement of the playback device 804. In FIG. 8C, a diagram 890 illustrates eight non-overlapping sectors that may be used to select a stereo representation of the sound field based on a coarser estimate of the pose of the playback device 804 (e.g., based on 45 degree increments of rotation), and a diagram 892 illustrates sixteen non-overlapping sectors that may be used to select an ambisonics representations of the sound field based on a finer estimate of the pose of the playback device 804 (e.g., based on 22.5 degree increments of rotation). Although the diagrams 890 and 892 illustrate eight and sixteen sectors, respectively, for simplicity of illustration, it should be understood that any other numbers of sectors may be used, and the sectors may be uniformly sized or non-uniformly sized.

Figure 9:
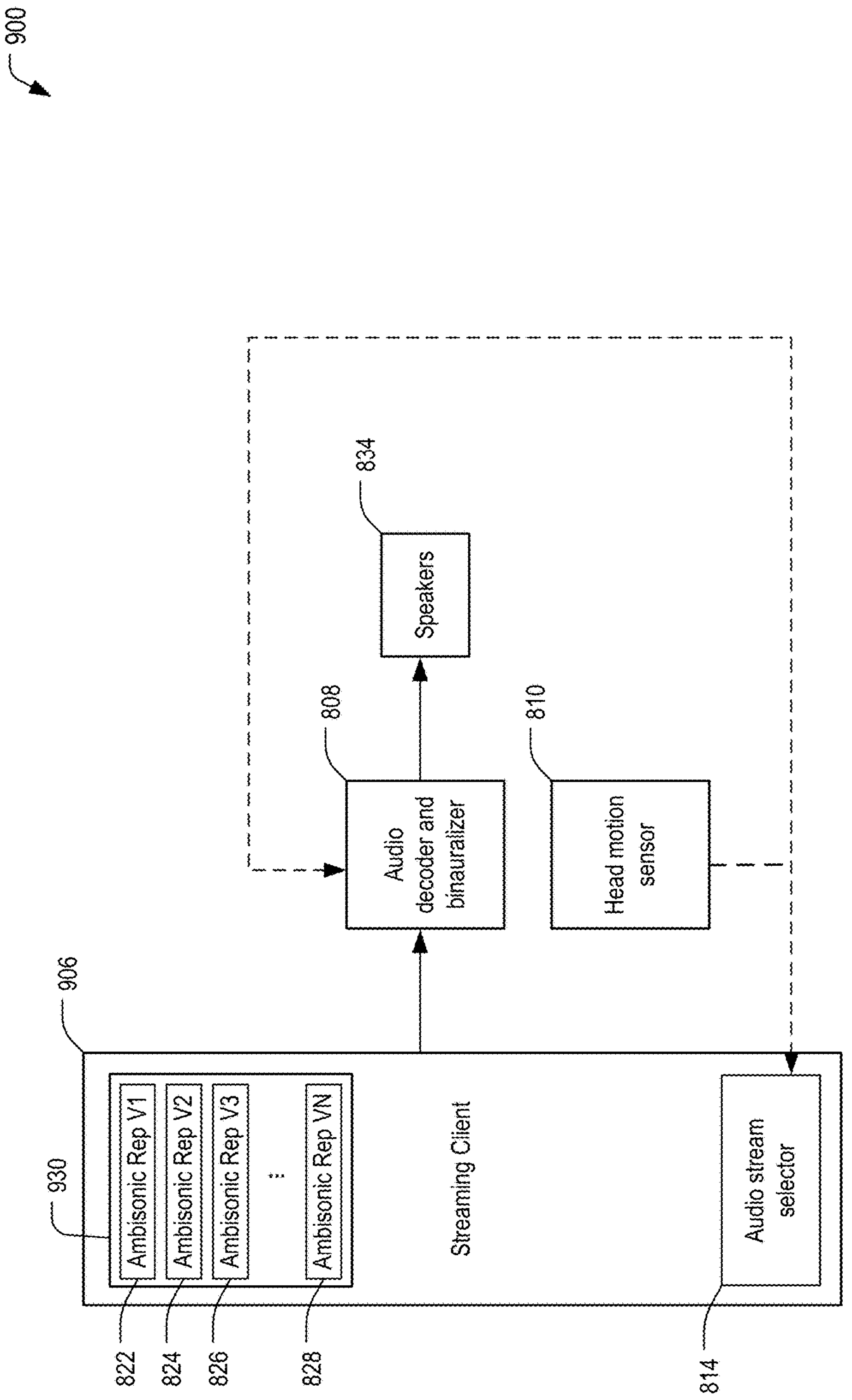
FIG. 9 is a block diagram illustrating a twelfth implementation of components and operations of a system for adjusting a sound field.

FIG. 9 is a block diagram illustrating an implementation of a system 900 that corresponds to the device 804 in which one or more of the ambisonics representations 822-828 are stored in a memory 930 at a streaming client 906 (e.g., a local streaming client). In one example, the streaming client 906 may use a manifest of the locally-available audio representations to determine the viability of one or more of the locally-available representations 822-828, and then select the appropriate sound field representation using the information provided in the manifest.

As a result, the streaming client 906 may transition between the ambisonics representations 822-828 based on changes in orientation, translation, or both, that are detected by the head motion sensor 810 and with reduced latency as compared to requesting the ambisonics representations 822-828 from a remote streaming server. Although the streaming client 906 is illustrated as including the ambisonics representations 822-828, in other implementations the streaming client may use any other set of representations of the sound field in place of, or in addition to, the ambisonics representations 822-828. For example, in some implementations, the streaming client 906 stores the ambisonics representations 822-828 (or the ambisonics representations 862-868) in addition to one or more, or all, of the stereo representations 872-878 of FIG. 8B.

Figure 10A:
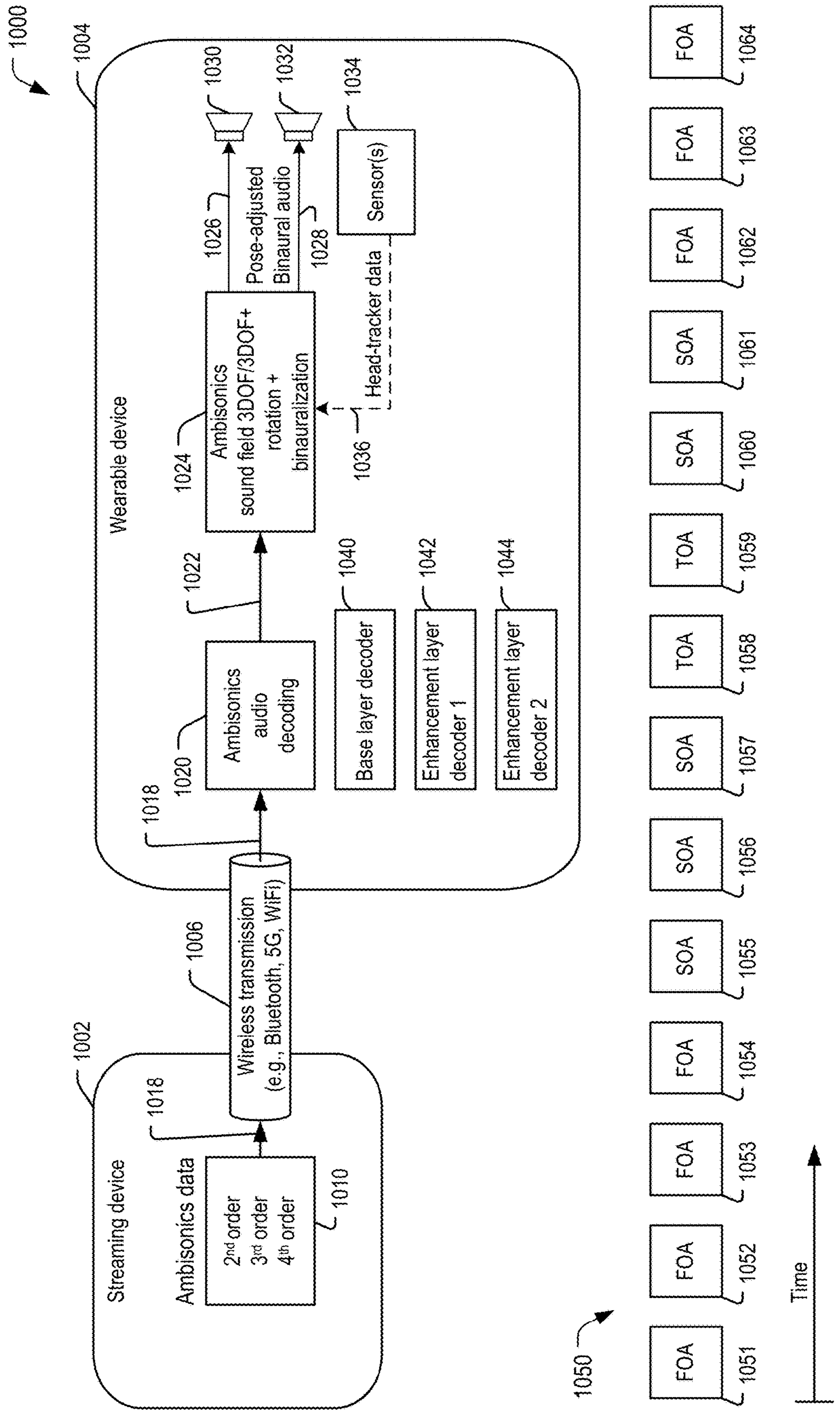
FIG. 10A is a block diagram illustrating a thirteenth implementation of components and operations of a system for adjusting a sound field.

FIG. 10A is a block diagram illustrating another implementation of components and operations of a system for adjusting a sound field. The system 1000 includes a streaming device 1002 configured to send at least a portion of ambisonics data 1010 to a wearable device 1004 using scalable audio coding to generate encoded ambisonics audio data 1018 (e.g., compressed ambisonics coefficients or uncompressed ambisonics coefficients, such as described with reference to the encoding operation 380 of FIG. 3B) representing a sound field. The wearable device 1004 includes a scalable audio decoder configured to decode the encoded ambisonics audio data 1018.

The encoded ambisonics audio data 1018 is illustrated in a diagram 1050 as being transmitted by the streaming device 1002 to the wearable device 1004 as a sequence of frames 1051-1064 using scalable audio encoding. The scalable audio encoding includes a base layer of audio data that provides coarse audio information and one or more higher layers of audio data, referred to as "enhancement layers," that provide finer resolution audio information. As illustrated, the first four frames 1051-1054 are encoded using first order ambisonics (FOA), the next three frames 1055-1057 are encoded using second order ambisonics (SOA) which provides higher resolution than FOA. The next two frames 1058, 1059 are encoded using third order ambisonics (TOA) which provides higher resolution than SOA. Frames 1060 and 1061 are encoded using SOA, and frames 1062-1064 are encoded using FOA.

In an illustrative example, the frames 1051-1064 correspond to an orchestral performance of a song that begins with a relatively small number of instruments (e.g., a single instrument) playing, which is encoded using FOA. As more instruments begin playing, providing more different types of sounds in the sound scene, the encoding transitions to SOA and then to TOA to provide increasingly enhanced resolution of the sound scene. As the number of instruments playing begins to reduce, the encoding reverts from TOA to SOA, and from SOA back to FOA. In this example, each frame encodes approximately one second of the sound scene, although in other implementations each frame may correspond to a longer time span or a shorter time span.

In another illustrative example, one or more of the transitions between the encoding types of the frames 1051-1064 are based on movement of the wearable device 1004. For example, the wearable device 1004 can obtain the head-tracker data 1036 data, at a plurality of time instances, associated with tracking location and an orientation associated with the movement of the wearable device 1004 and send at least a portion of the head-tracker data 1036 to the streaming device 1002 via wireless transmission, such as the data 166, 168 of FIG. 2. The streaming device 1002 can include one or more processors (e.g., the processor(s) 120 of FIG. 1) configured to receive, via wireless transmission from a playback device, the head-tracker data as first data associated with a first pose of the wearable device 1004 (e.g., a playback device). The first pose may be associated with a first number of sound sources in a sound scene, as described farther below. The streaming device 1002 can generate a first frame (e.g., frame 1054) of encoded ambisonics audio data that corresponds to a base layer encoding of the sound scene and send the first frame to the wearable device 1004.

A transition, in the ambisonics audio data, from a frame encoded according to the base layer (e.g., frame 1054) to a subsequent frame encoded according to the enhancement layer (e.g., frame 1055) corresponds to the movement of the wearable device 1004. For example, the transition from the base layer encoding of frame 1054 to the enhancement layer encoding of frame 1055 corresponds to a transition from a first orientation of the wearable device 1004 associated with a first number of sound sources to a second orientation of the wearable device 1004 associated with a second number of sound sources, the second number larger than the first number. To illustrate, the frames 1051-1054 can correspond to the wearable device 1004 on a user's head and oriented toward the first viewport field of view 841 of FIG. 8A or the first sector 881 of FIG. 8B having a relatively small number of sound sources.

In response to the user's head movement changing the orientation of the wearable device 1004 to another viewport field of view (e.g., the second viewport field of view 842), or toward another sector, that includes a greater number of audio sources than the first viewport field of view 841 or the first sector 881, the subsequent frame 1055 is encoded using the enhancement layer for higher resolution to accommodate the larger number of sound sources. For example, the wearable device 1004 sends updated head-tracker data indicating the user's head movement, which is received at the streaming device 1002 as second data associated with a second pose of the wearable device 1004 that is associated with the second number of sound sources. The streaming device 102 is configured to generate a second frame (e.g., the frame 1055) of encoded ambisonics audio data that corresponds to an enhancement layer encoding of the sound scene and send the second frame to the wearable device 1004.

The wearable device 1004 is configured to perform an ambisonics audio decoding operation 1020 to generate decoded ambisonics audio data 1022. The decoded ambisonics audio data 1022 is processed via an ambisonics sound field 3DOF/DOF+rotation and binauralization operation 1024 to provide pose-adjusted binaural audio signals 1026, 1028 to loudspeakers 1030, 1032 based on head-tracker data 1036 from one or more sensors 1034. In an illustrative implementation, the wearable device 1004 corresponds to the second device 202, the ambisonics audio decoding operation 1020 is performed at the decoder 228, the ambisonics sound field 3DOF/DOF+rotation and binauralization operation 1024 is performed at the sound field adjuster 224 and the renderer 222, the one or more sensors 1034 correspond to the one or more sensors 244, and the loudspeakers 1030, 1032 correspond to the loudspeakers 240, 242.

The wearable device 1004 performs the ambisonics audio decoding operation 1020 using a scalable decoder that includes a base layer decoder 1040, a first enhancement layer decoder 1042, and a second enhancement layer decoder 1044. Although two enhancement layer decoders 1042, 1044 are depicted, in other implementations the wearable device 1004 includes a single enhancement layer decoder or three or more enhancement layer decoders.

The base layer decoder 1040 is configured to decode FOA encoded frames, the first enhancement layer decoder 1042 is configured to decode SOA encoded frames, and the second enhancement layer decoder 1044 is configured to decode TOA encoded frames. The ambisonics audio decoding operation 1020 can adjust, on a frame-by-frame basis, which of the decoders 1040, 1042, 1044 are used to decode each of the frames 1051-1064. In an illustrative example, the base layer decoder 1040 is activated to decode the FOA frames 1051-1054, the first enhancement layer decoder 1042 is activated to decode the SOA frames 1055-1057, and the second enhancement layer decoder 1044 is activated to decode the TOA frames 1058, 1059. The second enhancement layer decoder 1044 is deactivated after decoding the TOA frame 1059, and the first enhancement layer decoder 1042 is deactivated after decoding the SOA frame 1061.

Although FIG. 10A depicts that each of the base layer decoder 1040 and the enhancement layer decoders 1042, 1044 corresponds to a single respective ambisonics order, in other implementations each of the layers (and associated decoders) can correspond to multiple ambisonics orders or resolutions, as depicted in the illustrative examples of FIGS. 11A, 11B, 12, and 13.

Figures 10B, 10C:
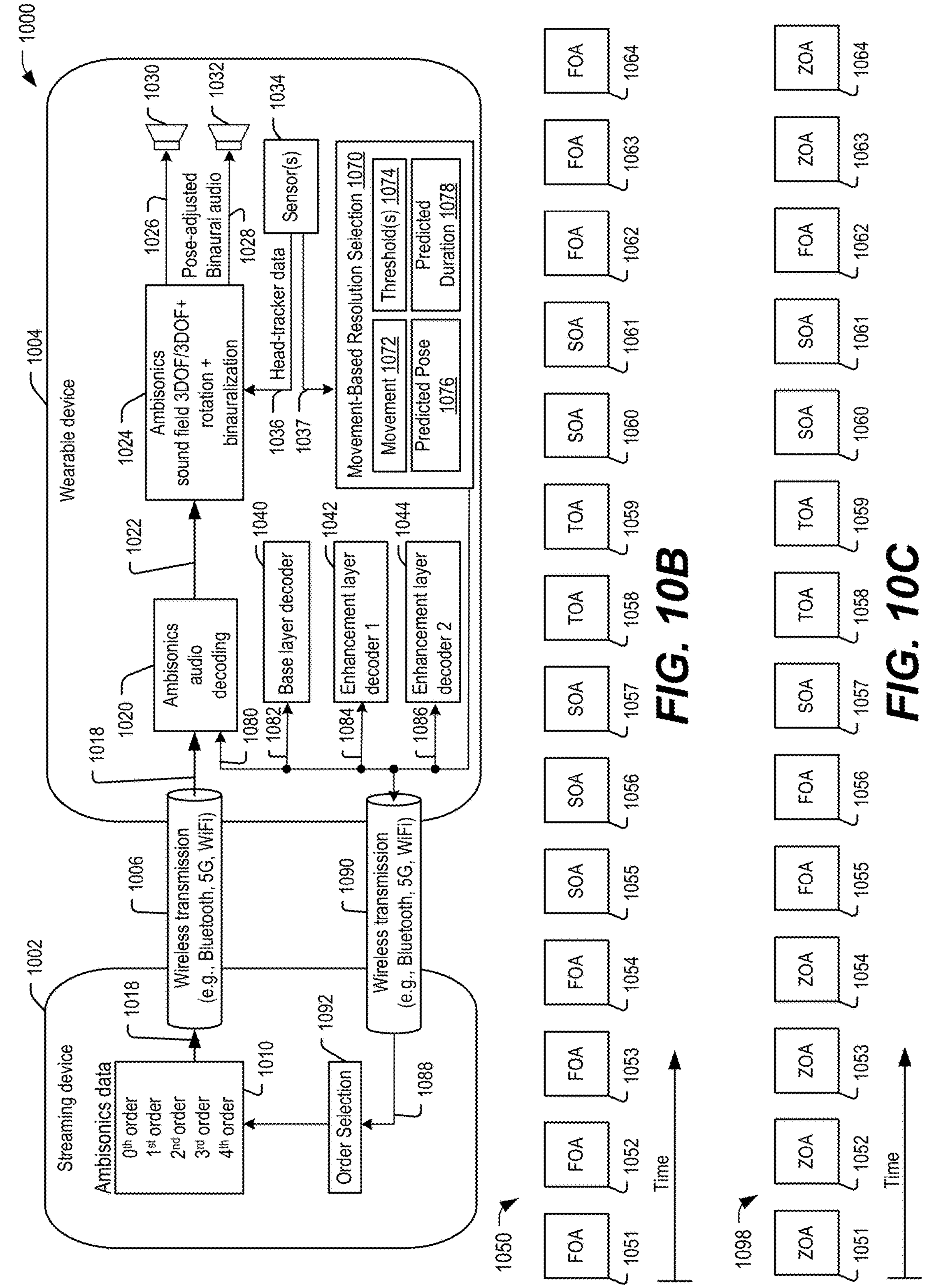
FIG. 10B is a block diagram illustrating a fourteenth implementation of components and operations of a system for adjusting a sound field.
FIG. 10C is a diagram illustrating an example of frames of audio data that may be generated by the system of FIG. 10A or FIG. 10B.

FIG. 10B depicts an implementation of the system 1000 in which the order of the ambisonics audio data 1018 that is transmitted to the device 1004, decoded by the device 1004, or both, is based on an amount of movement of the device 1004. For example, when the device 1004 corresponds to a head-mounted wearable device and the wearer's head moves (e.g., translation, change in orientation, or both) with an amount of movement that exceeds a certain threshold, the wearer may not be able to perceptually distinguish the resulting audio at the level of resolution provided by the full order ambisonics data 1010 representing the sound field. However, when the amount of movement of the device 1004 is equal to or less than the threshold, a higher-resolution or full-resolution representation of the audio scene can be provided. Thus, an amount of latency, computational resource usage, power consumption, or any combination thereof, can be controlled based on the amount of movement, or predicted movement, of the device 1004.

As illustrated, the device 1004 is configured to perform a movement-based resolution selection 1070 based on data 1037 from the one or more sensors 1034 that indicates an amount of movement 1072 of the device 1004. In some implementations, the device 1004 compares the movement 1072 to one or more threshold(s) 1074 to determine an amount of audio resolution to be provided for playback at the loudspeakers 1030, 1032. For example, the threshold(s) 1074 may indicate threshold amounts of movement associated with encoding layers, such as a first threshold amount of movement above which only base layer decoding is to be performed and a second threshold amount of movement above which only base layer and first enhancement layer decoding are to be performed. As another example, the threshold(s) may indicate threshold amounts of movement associated with individual ambisonics orders, such as a first threshold amount of movement above which only zeroth order ambisonics coefficient decoding is to be performed, a second threshold amount of movement above which only zeroth order and first order ambisonics coefficient decoding is to be performed, etc.

The movement-based resolution selection 1070 generates a set of one or more signals to control decoding of the received ambisonics audio data 1018. For example, a first signal 1080 may indicate to the ambisonics audio decoding operation 1020 which orders of the ambisonics audio data 1018 are to be decoded, a second signal 1082 may control operation of the base layer decoder 1040, a third signal 1084 may control operation of the first enhancement layer decoder 1042, and a fourth signal 1086 may control operation of the second enhancement layer decoder 1044.

To illustrate, the second signal 1082 may configure the base layer decoder 1040 to decode only ambisonics coefficients corresponding to zeroth order ambisonics (e.g., to generate a non-directional audio signal), to decode ambisonics coefficients corresponding to first order ambisonics, or both. The third signal 1084 may configure the first enhancement layer decoder 1042 to not decode any ambisonics coefficients, to decode only second order ambisonics coefficients, or to decode second and third order ambisonics coefficients. The fourth signal 1086 may configure the second enhancement layer decoder 1044 to not decode any ambisonics coefficients, to decode only fourth order ambisonics coefficients, or to decode fourth order ambisonics coefficients and ambisonics coefficients corresponding to ambisonics orders higher than fourth order (not illustrated).

The movement 1072 may represent measured movement of the device 1004 based on the data 1037, predicted movement of the device 1004 (e.g., using a Kalman filter or another prediction technique), or a combination thereof. To illustrate, the movement-based resolution selection 1070 may include determining a future predicted pose 1076 of the device 1004, a predicted amount of movement of the device 1004, or both. In some implementations, the movement-based resolution selection 1070 includes determining a predicted duration 1078 during which the amount of movement of the device 1004 will exceed one or more threshold 1074 (and therefore an amount of ambisonics data decoding can be reduced), a predicted duration 1078 during which the amount of movement of the device 1004 will remain less than or equal to the one or more threshold 1074 (and therefore an amount of ambisonics data decoding can be increased), or a combination thereof.

During operation, the device 1004 may receive, via the wireless transmission 1006 from the streaming device 1002, the encoded ambisonics audio data 1018 representing a sound field. The device 1004 may perform decoding of the ambisonics audio data 1018 to the generate decoded ambisonics audio data 1022. The decoding of the ambisonics audio data 1022 can include base layer decoding of a base layer of the encoded ambisonics audio data 1022 and can selectively include enhancement layer decoding in response to an amount of the movement 1072 of the device 1004. In some implementations, the device 1004 adjusts the decoded ambisonics audio data 1022 to alter the sound field based on the head-tracker data 1036 associated with at least one of a translation or an orientation associated with the movement 1072 of the device 1004 and outputs the adjusted decoded ambisonics audio data to two or more loudspeakers for playback.

In some implementations, the device 1004 is configured to perform the enhancement layer decoding based on the amount of the movement 1072 being less than a threshold amount (e.g., not exceeding one or more threshold 1074) and to refrain from performing the enhancement layer decoding based on the amount of movement not being less than the threshold amount. The device 1004 may select whether to perform enhancement layer decoding in response to the amount of movement of the device 1004 by determining a threshold ambisonics order based on the amount of movement, such as selecting second order in response to a relatively large amount of movement or selecting a higher order (e.g., fourth order) in response to a relatively small amount of movement. The device 1004 may decode enhancement layers that correspond to an ambisonics order less than the selected threshold ambisonics order and may refrain from decoding enhancement layer that corresponds to an ambisonics order greater than or equal to the selected threshold ambisonics order.

In some implementations, the device 1004 is configured to send, to the streaming device 1002 and based on the amount of the movement 1072, a message to refrain from sending enhancement layer audio data. For example, the movement-based resolution selection 1070 may generate a signal 1088 that is sent to the streaming device 1002 via a wireless transmission 1090. The signal 1088 may include an indication of a highest order of ambisonics data to send, an indication of one or more orders of the ambisonics data 1010 to send, an indication of one or more enhancement layers to send, or a combination thereof. In an illustrative example, the signal 1088 indicates an order selection 1092 that may be used to adjust an order of the encoded ambisonics audio data 1018 during encoding at the streaming device 1002, such as described with reference to encoding based on the order selection 334 of FIG. 3B, 4B, or 5B, the request for a particular ambisonics order 654 as described with reference to FIGS. 6-7, or a combination thereof.

In some implementations, the signal 1088 includes a message for the streaming device 1002 to refrain from sending enhancement layer audio data for a particular duration. For example, the movement-based resolution selection 1070 may determine that the amount of the movement 1072 exceeds a threshold amount (e.g., exceeds one or more threshold 1074) and determine the predicted duration 1078 based on a prediction of when the amount of movement of the device 1004 will be less than the threshold amount. The device 1004 may send the signal 1088 to the streaming device 1002 to refrain to sending enhancement layer audio data (e.g., only send ambisonics coefficients corresponding to the base layer, such as zeroth order coefficients and first order coefficients) until a future time that is based on (e.g., coincides with) when the amount of the movement 1072 of the device 1004 is predicted to be sufficiently reduced for perception of a higher-resolution representation of the audio scene.

In some implementations, the streaming device 1002 computes the actual or predicted amount of movement 1072 of the device 1004 and determines the amount of enhancement layer audio data to transmit to the wearable device 1004 based on the computed amount of movement 1072. For example, the device 1004 may obtain the data 1037, at a plurality of time instances, associated with a tracking location and an orientation associated with the movement 1072 of the device 1004 and may send the data 1037 to the streaming device 1002 via the wireless transmission 1090. To illustrate, the data 1037 may correspond to or be included in the signal 1088. In such implementations, functionality described for the movement-based resolution selection 1070 may be performed at the streaming device 1002 instead of, or in addition to, being performed at the device 1004. In such implementations, an amount of enhancement layer audio data received by the device 1004 in the encoded ambisonics audio data 1018 from the streaming device 1002 is based on the amount of movement of the device 1004, such as in a similar manner as described for the encoding operation 380 performed in conjunction with the movement data 476 of FIG. 4B.

FIG. 10C illustrates a diagram 1098 corresponding to an implementation in which the encoded ambisonics audio data 1018 is transmitted by the streaming device 1002 to the device 1004 as the sequence of frames 1051-1064 in which the base layer includes zeroth order ambisonics (ZOA) data and is devoid of any ambisonics data of higher order than zeroth order, the first enhancement layer includes FOA data and SOA data, and the second enhancement layer includes TOA data. As illustrated, the first four frames 1051-1054 correspond to the base layer and include ZOA data, and the next three frames 1055-1057 correspond to the first enhancement layer and include FOA data (frames 1055, 1056) and SOA data (frame 1057). The next two frames 1058, 1059 correspond to the second enhancement layer and include TOA data. Frames 1060-1062 correspond to the first enhancement layer and include SOA data (frames 1060, 1061) and FOA data (frame 1062), and frames 1063-1064 correspond to the base layer and include ZOA data. For example, the varying orders of ambisonics data in the sequence of frames 1051-1064 may be transmitted, decoded, or both, based on determining or predicting that the device 1004 undergoes a relatively large motion (e.g., ZOA data in frames 1051-1054) that gradually reduces to the device 1004 becoming stationary (e.g., TOA data in frames 1059-1059), followed by an increase to a relatively large motion of the device 1004 (e.g., ZOA data in frames 1063-1064).

Figure 11A:
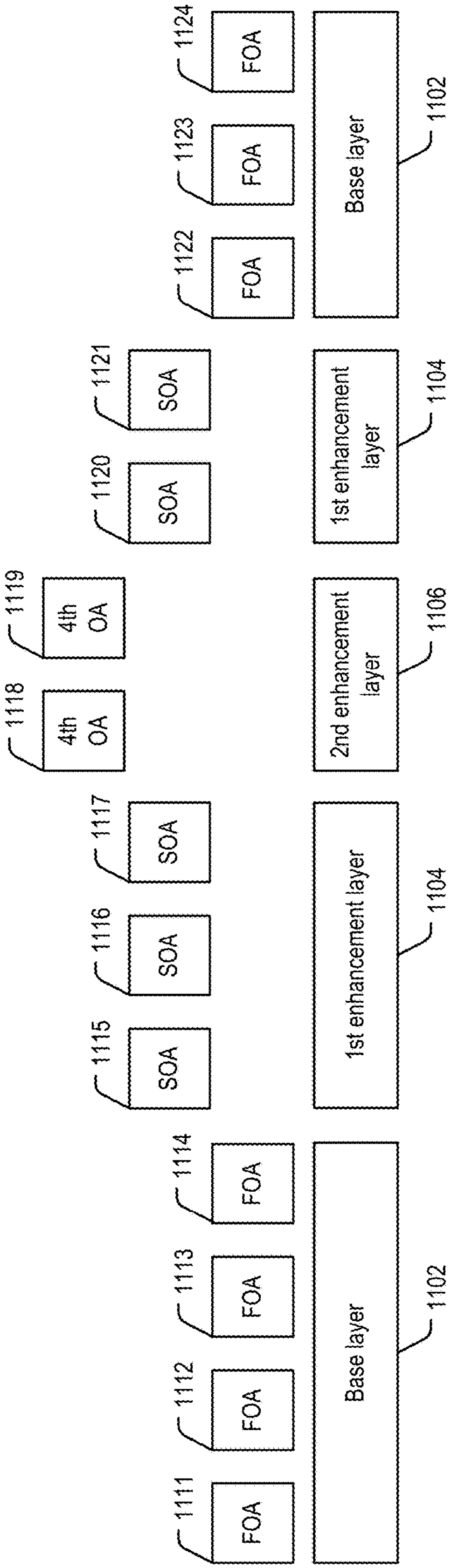
FIG. 11A is a diagram illustrating a first implementation of streaming audio data and decoder layers for decoding the streaming audio.
Figure 11B:
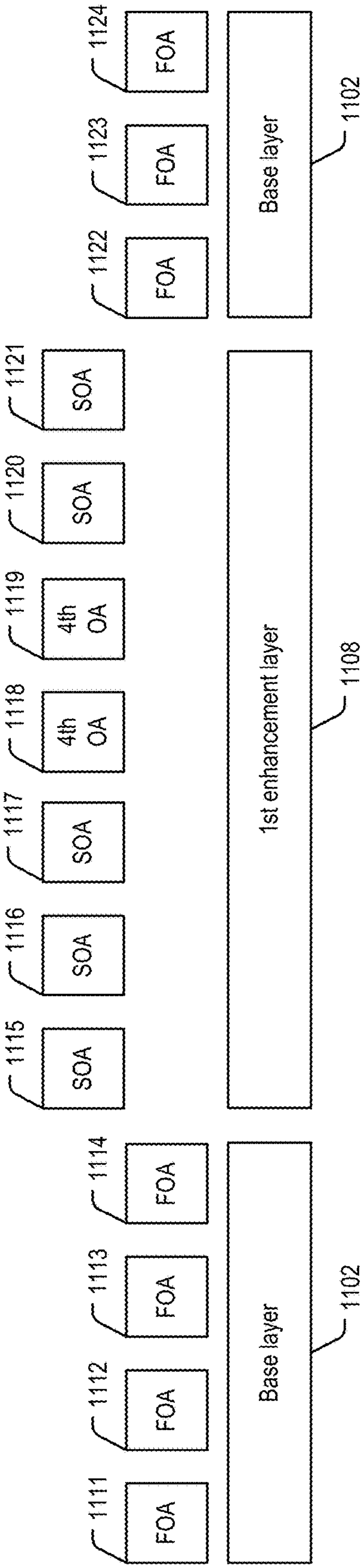
FIG. 11B is a diagram illustrating a second implementation of streaming audio data and decoder layers for decoding the streaming audio.

In FIGS. 11A and 11B, a sequence of ambisonics audio frames 1111-1124 is illustrated and includes frames 1111-1114 corresponding to FOA, frames 1115-1117 corresponding to SOA, frames 1118, 1119 corresponding to fourth order ambisonics (4th OA), frames 1120, 1121 corresponding to SOA, and frames 1122-1124 corresponding to FOA.

In FIG. 11A, a base layer 1102 corresponds to FOA, a first enhancement layer 1104 corresponds to SOA and TOA, and a second enhancement layer 1106 corresponds to 4th OA and higher order ambisonics. Thus, the FOA frames 1111-1114 and 1122-1124 correspond to the base layer 1102 and may be decoded by the base layer decoder 1040. The SOA frames 1115-1117, 1120, and 1121 correspond to the first enhancement layer 1104 and may be decoded using the first enhancement layer decoder 1042. The 4th OA frames 1118, 1119 correspond to the second enhancement layer 1106 and may be decoded using the second enhancement layer decoder 1044.

In FIG. 11B, a base layer 1102 corresponds to FOA, and a first enhancement layer 1108 corresponds to SOA, TOA, and 4th OA. Thus, the FOA frames 1111-1114 and 1122-1124 correspond to the base layer 1102 and may be decoded by the base layer decoder 1040. The SOA frames 1115-1117, 1120, and 1121 and the 4th OA frames 1118, 1119 correspond to the first enhancement layer 1108 and may be decoded using the first enhancement layer decoder 1042.

Figure 12:
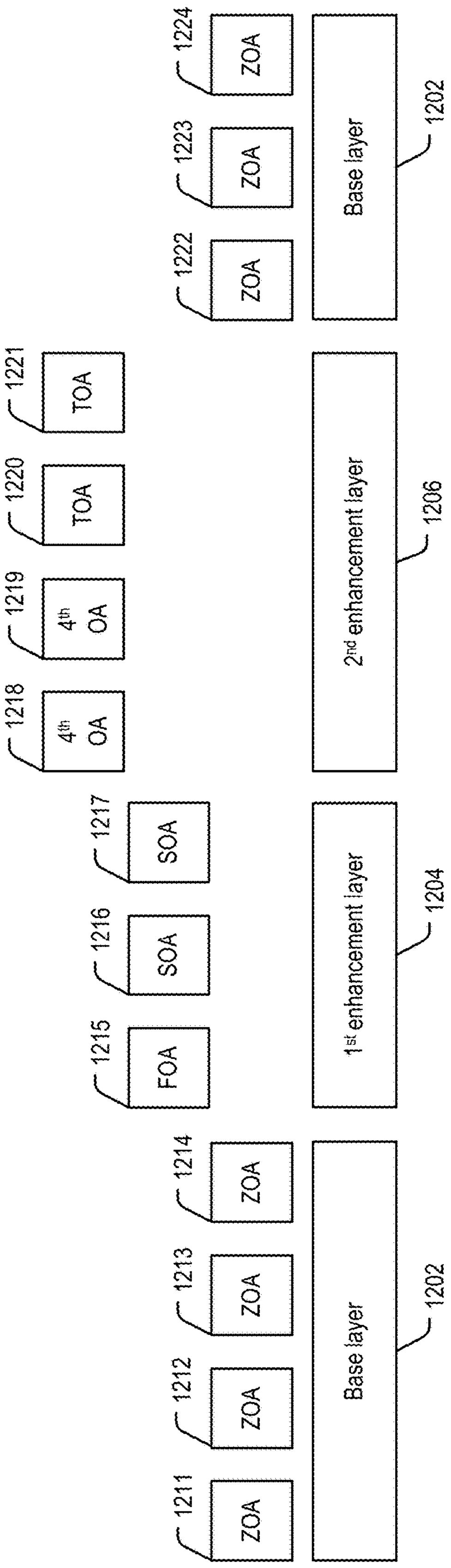
FIG. 12 is a diagram illustrating a third implementation of streaming audio data and decoder layers for decoding the streaming audio.

In FIG. 12, a sequence of ambisonics audio frames 1211-1224 is illustrated and includes frames 1211-1214 corresponding to ZOA, frame 1215 corresponding to FOA, frames 1216-1217 corresponding to SOA, frames 1218, 1219 corresponding to 4th OA, frames 1220, 1221 corresponding to TOA, and frames 1222-1224 corresponding to ZOA. A base layer 1202 corresponds to ZOA, a first enhancement layer 1204 corresponds to FOA and SOA, and a second enhancement layer 1206 corresponds to TOA, 4th OA, and higher order ambisonics. Thus, the ZOA frames 1211-1214 and 1222-1224 correspond to the base layer 1202 and may be decoded by the base layer decoder 1040. The FOA and SOA frames 1215-1217 correspond to the first enhancement layer 1204 and may be decoded using the first enhancement layer decoder 1042. The 4th OA frames 1218, 1219 and the TOA frames 1220, 1221 correspond to the second enhancement layer 1206 and may be decoded using the second enhancement layer decoder 1044.

Figure 13:
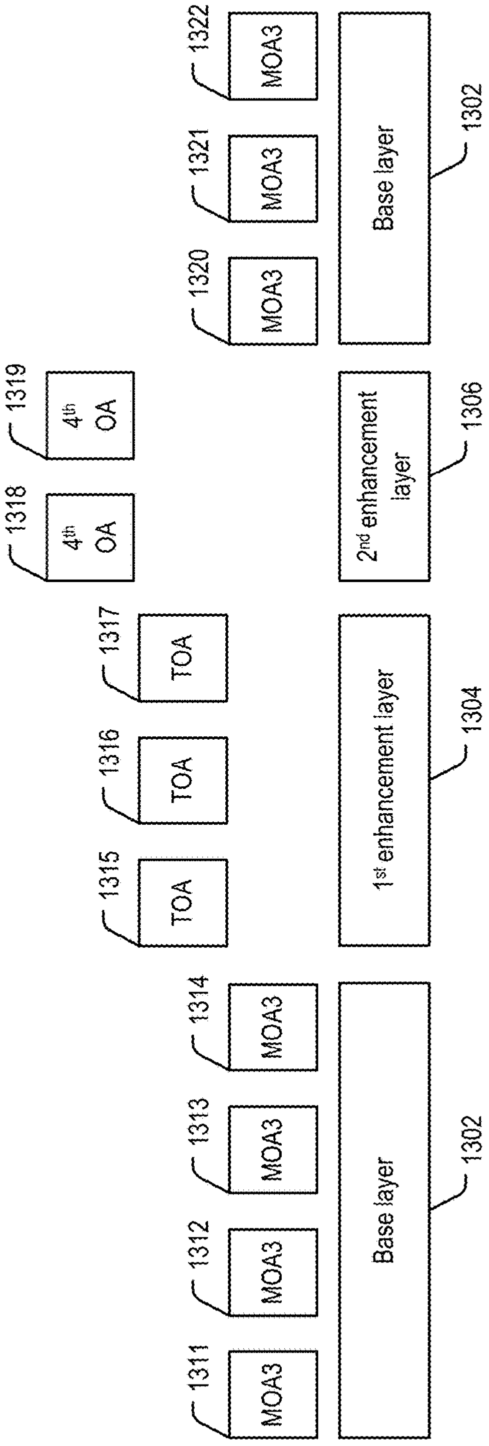
FIG. 13 is a block diagram illustrating a fourth implementation of streaming audio data and decoder layers for decoding the streaming audio.

In FIG. 13, a sequence of ambisonics audio frames 1311-1322 is illustrated and includes frames 1311-1314 corresponding to mixed order ambisonics MOA, frames 1315-1317 corresponding to TOA, frames 1318, 1319 corresponding to 4th OA, and frames 1320-1322 corresponding to MOA. For example, the MOA representation may provide precision with respect to some areas of the sound field, but less precision in other areas. In one example, the MOA representation of the sound field may include eight coefficients (e.g., one coefficient for n=0, three coefficients for n=1, two coefficients for n=2 (the outermost two depicted in FIG. 1), and two coefficients for n=3 (the outermost two depicted in FIG. 1)). In contrast, the TOA representation of the same sound field may include sixteen coefficients. As such, the MOA representation of the sound field may be less storage-intensive and less bandwidth-intensive, and may provide a lower resolution representation of the sound field, than the corresponding TOA representation of the same sound field.

A base layer 1302 corresponds to MOA, a first enhancement layer 1304 corresponds to TOA, and a second enhancement layer 1306 corresponds to 4th OA and higher order ambisonics. Thus, the MOA frames 1311-1314 and 1320-1322 correspond to the base layer 1302 and may be decoded by the base layer decoder 1040. The TOA frames 1315-1317 correspond to the first enhancement layer 1304 and may be decoded using the first enhancement layer decoder 1042. The 4th OA frames 1318, 1319 correspond to the second enhancement layer 1306 and may be decoded using the second enhancement layer decoder 1044.

Thus, wearable device 1004 may be implemented including one or more processors, such as the one or more processors 220, that are configured to receive, via wireless transmission from the streaming device 1002, the encoded ambisonics audio data 1018 representing a sound field. For example, the wearable device 1004 receives the encoded ambisonics audio data 1018 via a wireless transmission 1006 from the streaming device 1002.

The one or more processors of the wearable device 1004 may be configured to perform decoding of the encoded ambisonics audio data 1018 to generate the decoded ambisonics audio data 1022. The decoding of the encoded ambisonics audio data 1018 includes base layer decoding of a base layer of the encoded ambisonics audio data 1018 (e.g., FOA) and selectively includes enhancement layer decoding in response to detecting that the encoded ambisonics audio data 1018 includes at least one encoded enhancement layer (e.g., SOA). As an example, the base layer decoding is performed using the base layer decoder 1040 and the enhancement layer decoding using at least the first enhancement layer decoder 1042 corresponding to a first enhancement layer of the encoded ambisonics audio data 1018.

The one or more processors of the wearable device 1004 may be configured to adjust the decoded ambisonics audio data to alter the sound field based on data associated with at least one of a translation or an orientation associated with movement of the device, such as via the ambisonics sound field 3DOF/3DOF+rotation and binauralization operation 1024.

The one or more processors of the wearable device 1004 may be configured to output the adjusted decoded ambisonics audio data to two or more loudspeakers for playback, such as the pose-adjusted binaural audio signals 1026, 1028 provided to the loudspeakers 1030, 1032, respectively.

In some implementations, the encoded ambisonics audio data 1018 includes first order ambisonics data in the base layer and higher order ambisonics data in the first enhancement layer, such as depicted in FIGS. 11A and 11B, and the first enhancement layer decoder 1042 is configured to decode the higher order ambisonics data.

In some implementations, the encoded ambisonics audio data 1018 includes first order ambisonics data in the base layer, higher order ambisonics data of one or more higher orders in the first enhancement layer, and additional higher order ambisonics data of one or more additional higher orders in a second enhancement layer, such as depicted in FIG. 11A. In such implementations, the one or more processors of the wearable device 1004 are further configured to perform enhancement layer decoding using the second enhancement layer decoder 1044 configured to decode the additional higher order ambisonics data.

In some implementations, the encoded ambisonics audio data 1018 includes mixed order ambisonics data including a partial set of coefficients of an ambisonics order in the base layer and includes additional ambisonics data in the enhancement layer, the additional ambisonics data including one or more coefficients of the ambisonics order that are omitted from the base layer, such as depicted in FIG. 13. In such implementations, the mixed order ambisonics may be decoded by the base layer decoder 1040, additional ambisonics data (e.g., TOA) may be decoded using the first enhancement layer decoder 1042, and additional higher order ambisonics data (e.g., 4th OA) may be decoded using the second enhancement layer decoder 1044.

In conjunction with the above-described devices and systems, streaming audio data may be adjusted based on one or more criteria, such a latency requirement, bandwidth, or motion of the playback device, as non-limiting examples. Although examples in which audio formats are switched between ambisonics and pre-rendered stereo are described with reference to FIGS. 8B and 8C, in other implementations one or more other formats may be used in addition to, or in place of, ambisonics or pre-rendered stereo, such as pulse-code modulation (PCM) audio or object audio formats.

In one example, if a playback device is stationary or has relatively little motion, a streaming source (e.g., the source device 802 or the streaming device 1002) may generate pre-rendered stereo that is binauralized from full-order ambisonics and may transmit the pre-rendered stereo to the playback device. However, in response to detecting or predicting motion of the playback device, the streaming source may transition from sending pre-rendered stereo to sending low order ambisonics data (e.g. FOA or SOA) to be locally rotated at the playback device. In response to detecting or predicting that the playback device stops moving, the streaming source may transition back to sending pre-rendered stereo.

In some implementations, the streaming source may switch between formats in conjunction with transitioning between enhancement layers. For example, the streaming device 1002 may transition between sending a representation of the audio scene using base layer ambisonics encoding and sending a stream of pre-rendered base layer and enhancement layer encoding, which may provide enhanced resolution for the audio scene with reduced bandwidth as compared to sending enhancement layer ambisonics coefficients.

In some implementations, a source device can transition between formats and/or layers of encoding (e.g., mono. stereo, base layer, base layer and enhancement layer, etc.) based on one or more other circumstances. For example, streamed audio can be adjusted in response to detecting or predicting an event in which either a richer audio experience or a reduced audio resolution would be appropriate. For example, in an application in which a user wearing a playback device is moving in a virtual reality or mixed reality setting or immersive audio scene, and an event such as a voice call or initiation of local or streamed audio playback that is separate from the immersive audio scene is detected or predicted, the source device may mix the audio down to mono or stereo PCM, based on which sound source the user is predicted to focus on. Using a voice call as an example, the scene's audio resolution can be reduced to mono at a reduced level to better enable the user to focus on the voice call. Similarly with concurrent stereo audio playback, the immersive audio scene can be reduced to a base layer rendered in stereo, as an illustrative, non-limiting example.

In some implementations, the split rendering may be via Virtual Assistant (e.g. running on a handset, a cloud server, other electronic device, or a combination thereof), and the wearer of a headset may operate the headset in a passthrough mode in which audio received via one or more external microphones of the headset is played out to the wearer via an earpiece of the headset. To illustrate, in an example in which a wearer of the headset is in a coffee shop listening to music transmitted to the headset as audio data encoded using a base layer and optionally one or more enhancement layers, sounds captured by an external microphone of the headset, such as the voice of a barista, may be mixed with the base layer of the music to be played out to the wearer.

Figure 14:
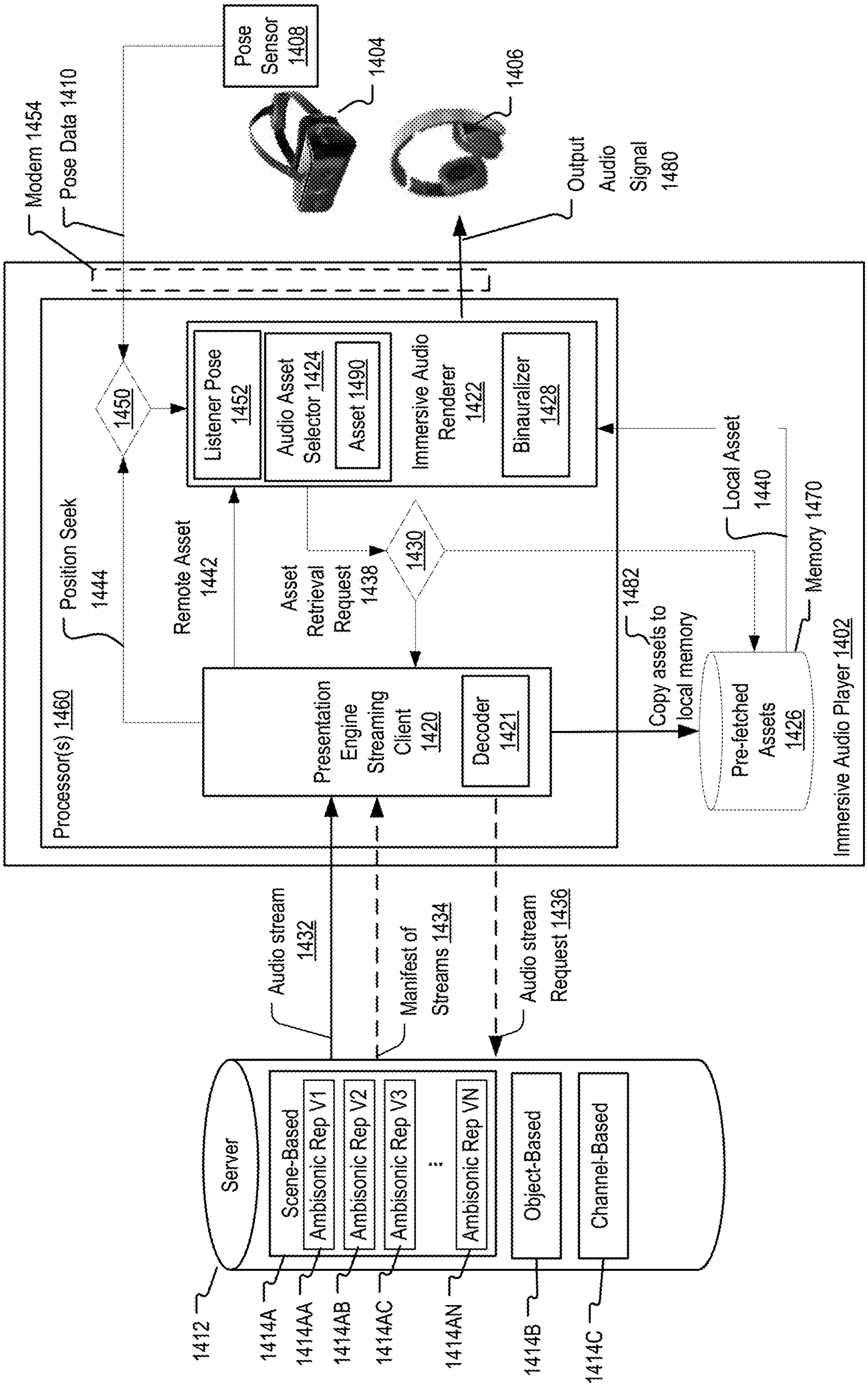
FIG. 14 is a block diagram illustrating an implementation of components and operations of a system for adjusting a sound field, in accordance with one more examples of the present disclosure.

FIG. 14 is a block diagram illustrating an implementation of components and operations associated with generating audio output for a listener in an immersive audio scene. The system includes an immersive audio player 1402 coupled to a remote device 1412, such as a server (e.g., a streaming server).

The remote device 1412 stores multiple assets that correspond to representations of audio content associated with the immersive audio scene. For example, the remote device 1412 can include one or more scene-based representations 1414A, one or more object-based representations 1414B, one or more channel-based representations 1414C, or a combination thereof. The remote device 1412 is configured to provide, to the immersive audio player 1402, a manifest of assets that are available at the remote device 1412, such as a manifest of streams 1434. The remote device 1412 is configured to receive a request for one or more particular assets, such as an audio stream request 1436 from the immersive audio player 1402, and to provide the requested asset, such as an audio stream 1432, to the immersive audio player 1402 in response to the request. In a particular implementation, the remote device 1412 corresponds to the first device 102 of FIG. 1, one or more of the streaming devices of FIGS. 3A-7 or FIGS. 10A-10B, or the source device 802 of any of FIGS. 8A-8C, as illustrative, non-limiting examples.

As illustrated, the scene-based representations 1414A include a first ambisonics representation 1414AA, a second ambisonics representation 1414AB, a third ambisonics representation 1414AC, and one or more additional ambisonics representations including an Nth ambisonics representation 1414AN. One or more of the ambisonics representations 1414AA-1414AN can correspond to a full set of ambisonics coefficients corresponding to a particular ambisonics order, such as first order ambisonics, second order ambisonics, third order ambisonics, etc. Alternatively, or in addition, one or more of the ambisonics representations 1414AA-1414AN can correspond to a set of mixed order ambisonics coefficients that provides an enhanced resolution for particular listener orientations (e.g., for higher resolution in the listener's viewing direction as compared to away from the listener's viewing direction) while using less bandwidth than a full set of ambisonics coefficients corresponding to the enhanced resolution. In a particular implementation, the ambisonics representations 1414AA-1414AN correspond to the ambisonics representations 822-828 of FIG. 8.

The immersive audio player 1402 includes one or more processors 1460 coupled to a memory 1470. The immersive audio player 1402 may also be referred to as a playback device. The immersive audio player 1402 is coupled, such as via a modem, to an audio output device, illustrated as a headset 1406. The immersive audio player 1402 is also coupled to a pose sensor 1408 that is configured to generate pose data 1410 based on a listener's orientation, position, or both, such as an inertial measurement unit (IMU) of an XR headset 1404 that may be worn by the listener. For example, the pose sensor 1408 can correspond to the one or more sensors 244 of FIG. 2, and the pose data 1410 can correspond to the sensor data 246 of FIG. 2. The immersive audio player 1402 is configured to provide an output audio signal 1480 for playout at speakers of the audio output device, such as the loudspeakers 240, 242 of FIG. 2, based on a listener pose 1452 in the immersive audio scene. In some implementations the XR headset 1404 and the headset 1406 are incorporated in a single device, such as a head-mounted unit that includes the speakers and the pose sensor 1408.

The memory 1470 is configured to store audio data, illustrated as pre-fetched assets 1426, associated with an immersive audio environment. The pre-fetched assets 1426 can include one or more of the scene-based representations 1414A, the object-based representations 1414B, the channel-based representations 1414C, or a combination thereof, that have been received from the remote device 1412 and copied to the memory 1470 via a copy operation 1482.

The processor 1460 is configured to obtain a listener pose 1452 in the immersive audio environment and to determine whether an asset 1490 associated with the listener pose 1452 is stored locally at the memory 1470. According to an aspect, the asset 1490 is a representation of audio content of one or more audio sources and corresponds to one or more audio streams associated with the immersive audio environment. In some examples, the asset 1490 corresponds to one or more audio streams associated with the immersive audio environment. Based on the determination, the processor 1460 is configured to select whether to retrieve the asset 1490 from the memory 1470 or to obtain the asset 1490 from a remote device 1412, and generate an output audio signal 1480 based on the asset 1490.

The processor 1460 includes a presentation engine streaming client 1420, an immersive audio renderer 1422, a pose selector 1450, and an asset location selector 1430. The presentation engine streaming client 1420 is configured to receive requested assets from the remote device 1412, such as the audio stream 1432 from the remote device 1412, decode the requested assets at a decoder 1421, and provide the decoded output to the immersive audio renderer 1422. For example, the presentation engine streaming client 1420 may send the audio stream request 1436 for a particular one of the scene-based representations 1414A and receive the requested audio stream 1432 from the remote device 1412. In some examples, the presentation engine streaming client 1420 decodes the audio stream 1432 at the decoder 1421 to generate decoded data (e.g., PCM data), which is provided to the immersive audio renderer 1422. Because the requested asset 1490 (e.g., the particular one of the scene-based representations 1414A) was retrieved from the remote device 1412, the asset 1490 may be referred to as a remote asset 1442. Alternatively, the presentation engine streaming client 1420 can store the audio stream 1432 (e.g., audio data corresponding to the audio stream 1432, in encoded or decoded format) at the memory 1470 as a pre-fetched asset that can be later provided as a local asset 1440 to the immersive audio renderer 1422.

The immersive audio renderer 1422 is configured to process audio data corresponding to one or more assets to generate the output audio signal 1480. For example, the immersive audio renderer 1422 is configured to perform a rendering operation on the asset 1490 (e.g., the remote asset 1442, the local asset 1440, or both) during generation of the output audio signal 1480. The immersive audio renderer 1422 includes a binauralizer 1428 that is configured to binauralize an output of the rendering operation to generate an output binaural signal. According to an aspect, the output audio signal 1480 includes the output binaural signal that is provided to the speakers for playout. The rendering operation and binauralization can include sound field rotation (e.g., 3DOF), rotation and limited translation (e.g., 3DOF+), or rotation and translation (e.g., 6DOF) based on the listener pose 1452, such as described with reference to the audio decoder and binauralizer 808 of FIGS. 8A-8C.

The immersive audio renderer 1422 also includes an audio asset selector 1424 that is configured to select one or more assets based on the listener pose 1452 (e.g., the listener's position, the listener's head orientation, or both). According to an aspect, the immersive audio renderer 1422 issues an asset retrieval request 1438 upon determining that a selected asset 1490 is different than the previously rendered asset(s) corresponding to the current audio stream 1432. In a particular implementation, the audio asset selector 1424 corresponds to the audio stream selector 814 of FIGS. 8A-8C.

The asset location selector 1430 is configured to receive the asset retrieval request 1438 for the asset 1490 and determine whether the asset 1490 is stored locally at the memory 1470. Based on a determination that the asset 1490 is not stored locally at the memory 1470, the asset location selector 1430 selects to obtain the asset 1490 from the remote device 1412. For example, the asset location selector 1430 may send the asset retrieval request 1438 to the presentation engine streaming client 1420, and the presentation engine streaming client 1420 may initiate retrieval of the asset 1490 from the remote device 1412 via the audio stream request 1436. Otherwise, based on a determination that the asset 1490 is stored locally at the memory 1470, the asset location selector 1430 selects to obtain the asset 1490 from the memory 1470. For example, the asset location selector 1430 may send the asset retrieval request 1438 to the memory 1470 to initiate retrieval (e.g., streaming) of the asset 1490 to the immersive audio renderer 1422 as the local asset 1440.

When the requested asset 1490 is one of the pre-fetched assets 1426 and is retrieved from the memory 1470 as the local asset 1440, the processor 1460 is configured to selectively decode the asset 1490 at an audio stream decoder based on a determination of whether the asset 1490 has been decoded. To illustrate, the asset 1490 may have been received from the remote device 1412 and stored to the memory 1470 via a copy operation 1482 without first decoding the asset 1490. In such cases, the asset 1490 retrieved from the memory 1470 may be decoded at the decoder 1421 (or at another decoder) before being rendered at the immersive audio renderer 1422. The decoded asset 1490 is then provided to the immersive audio renderer 1422. Alternatively, when the asset 1490 has been decoded prior to being stored in the memory 1470, the asset 1490 may be provided to the immersive audio renderer 1422 without additional decoding.

The processor 1460 is configured to perform a seek operation to determine a playout start point of the asset 1490 that has been retrieved from the memory 1470. For example, the asset 1490 may include a time sequence of frames of audio data corresponding to audio content over a time span, and the seek operation may correspond to a temporal seek operation that determines the playout start point based on at least one of a timestamp or an audio frame identifier. Thus, in cases where generation of the output audio signal 1480 is ongoing and the asset retrieval request 1438 is generated in response to a change of the listener pose 1452 in the immersive audio environment, the immersive audio renderer 1422 can generate the output audio signal 1480 based on the playout start point to maintain synchronization with the ongoing generation of the output audio signal 1480, reducing or preventing user-perceivable artifacts, interruption, or delay associated with updating the immersive audio environment.

Alternatively, the seek operation can correspond to a position seek operation that determines the playout start point based on a listener pose that may be specified as a parameter of the seek operation. For example, the presentation engine streaming client 1420 may initiate a position seek 1444 in response to a user input, event detection, etc., such as a user instruction to advance to a specified waypoint of a virtual reality game that is associated with the immersive audio environment. The specified waypoint can be associated with a particular position and/or orientation of the listener, which is provided as an updated listener pose 1452.

The pose selector 1450 is configured to obtain listener pose information from various sources and to select the listener pose 1452 to be used by the immersive audio renderer 1422. For example, the pose selector 1450 is configured to receive the pose data 1410 from the pose sensor 1408 and to update the listener pose 1452 based on changes in position and/or orientation indicated by the pose data 1410. However, in response to the position seek 1444, the pose selector 1450 is configured to select the listener pose 1452 based on the listener pose information that is specified by the position seek 1444. Thus, application of the position seek 1444 may result in a pose discontinuity as the listener pose 1452 is updated to the new pose associated with the position seek 1444. After updating the listener pose 1452 to the new pose, the pose selector 1450 may return to updating the listener pose 1452 based on changes in position and/or orientation indicated by the pose data 1410, and may apply such changes relative to the new pose associated with the position seek 1444.

In some implementations, the asset 1490 corresponds to a pre-rendered representation of an audio scene, and generation of the output audio signal 1480 includes binauralizing the asset 1490, such as described further with reference to FIGS. 16-19.

In some implementations, the XR headset 1404 and the headset 1406 (e.g., the pose sensor 1408 and the speakers) are included in a single device that is distinct from and coupled to the immersive audio player 1402. In some such implementations, the immersive audio renderer 1422 and the binauralizer 1428 may be on separate devices, such as the wearable companion device 706 and the wearable device 604, respectively, of FIG. 7. In other implementations, the pose sensor 1408, the speakers, and the immersive audio player 1402 are included in a single device, such as, for example, the second device 202 of FIG. 2 or the wearable device of any of FIGS. 3-7 or FIGS. 10A-10B, as illustrative, non-limiting examples.

By selecting to retrieve the requested asset 1490 from the memory 1470 when the asset 1490 is stored as a pre-fetched asset 1426, the immersive audio player 1402 reduces latency that would otherwise be incurred due to retrieving the requested asset 1490 from the remote device 1412. Such reduction in latency results in higher spatial accuracy and reduced lag in the adaptation of the immersive sound field responsive to changes in the listener pose 1452, enhancing the listener's experience. In addition, the use of a seek operation to select a starting point for decoding further reduces latency in updating the immersive sound field responsive to changes in the listener's pose as compared to decoding the entire asset 1490, as described further with reference to FIG. 15. Reducing the latency associated with updating the immersive sound field responsive to changes in the listener pose 1452 can reduce or eliminate user-perceivable artifacts, interruption, or delay associated with updating the immersive audio environment and can enhance the listener's immersive audio experience.

Figure 15:
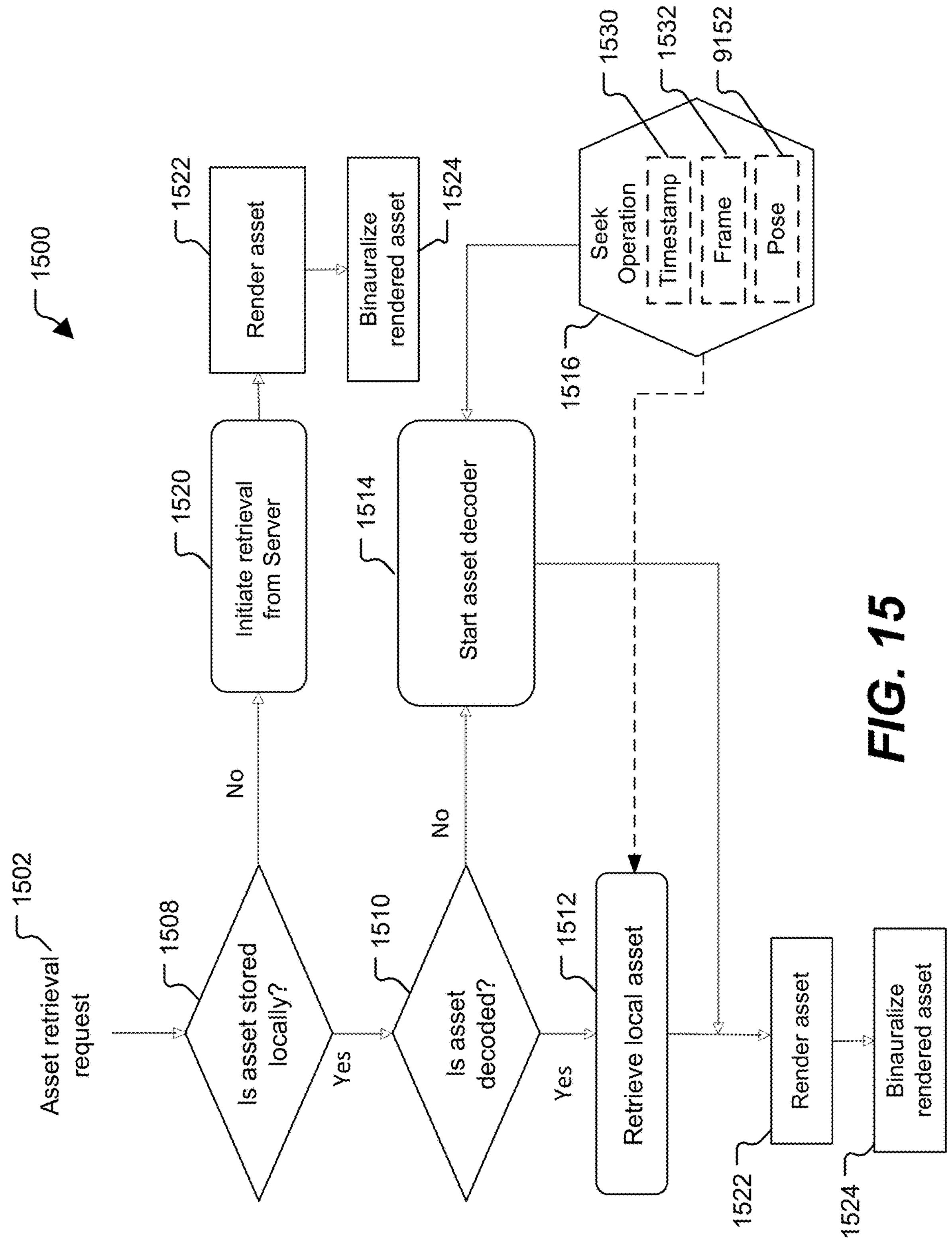
FIG. 15 is a block diagram illustrating an implementation of operations of a system for adjusting a sound field, in accordance with one more examples of the present disclosure.

FIG. 15 depicts an example of operations 1500 associated with an asset retrieval request 1502. For example, the operations 1500 may correspond to operations performed by the immersive audio player 1402 in response to the asset retrieval request 1438.

The operations 1500 include determining whether the asset identified by the asset retrieval request 1502 is stored locally, at operation 1508. For example, the asset location selector 1430 may determine whether the asset 1490 corresponding to the asset retrieval request 1438 is stored in the memory 1470, such as by searching a listing or manifest of the pre-fetched assets 1426.

In response to the asset not being stored locally, the operations 1500 include initiating retrieval of the asset from a server, at operation 1520. For example, based on a determination that the asset 1490 is not stored locally at the memory 1470, the asset location selector 1430 selects to obtain the asset 1490 from the remote device 1412 and initiates retrieval of the asset 1490 from the remote device 1412 by causing the presentation engine streaming client 1420 to send the asset retrieval request 1438 for the asset 1490.

The asset is then rendered, at operation 1522, and the rendered asset is binauralized, at operation 1524. For example, the asset 1490 may be received via the audio stream 1432 and decoded at the decoder 1421, and the output of the decoder 1421 is sent to the immersive audio renderer 1422 as the remote asset 1442. The immersive audio renderer 1422 performs a rendering operation and binauralization, based on the listener pose 1452, to generate a pose-adjusted binaural signal, which is provided as the output audio signal 1480.

In response to the asset being stored locally, the operations 1500 include determining whether the asset is decoded, at operation 1510. In response to a determination that the asset has not been decoded, the operations 1500 include starting an asset decoder to decode the asset, at operation 1514. For example, based on a determination that the asset 1490 is stored locally at the memory 1470, the immersive audio player 1402 may selectively decode the asset 1490 at the audio stream decoder 1421 based on a determination of whether the asset 1490 has been decoded. Otherwise, in response to a determination that the asset has been decoded, the local asset is retrieved, at operation 1512.

A seek operation 1516 is performed to determine a playout start point of the asset. In an example, the seek operation 1516 may correspond to a temporal seek operation that determines the playout start point based on at least one of a timestamp 1530 or an audio frame identifier 1532. In another example, the seek operation 1516 corresponds to a position seek operation that determines the playout start point based on the listener pose 1452. For example, an indication of the listener pose 1452 may be indicated as a parameter of the seek operation 1516.

If the asset has not yet been decoded, the seek operation 1516 may be used to identify a decoding start point for the decoding operation. For example, the asset decoder may be configured to parse metadata (e.g., timestamp, frame index, listener position, etc.) associated with frames, packets, or other portions of the encoded asset to identify a decoding start point corresponding to the timestamp 1530, the audio frame identifier 1532, or the listener pose 1452, respectively, of the seek operation 1516. Parsing the metadata to locate the decoding start point provides the technical benefit of being less computationally expensive and resulting in reduced latency as compared to decoding the entire asset.

The asset is then rendered, at operation 1522, and the rendered asset is binauralized, at operation 1524. For example, the portion of the decoded asset 1490 beginning at the playout start point is sent to the immersive audio renderer 1422 as the local asset 1440. The immersive audio renderer 1422 performs a rendering operation and binauralization to generate the output audio signal 1480 based on the playout start point.

Although the operations 1500 include rendering of the asset at operation 1522, in some implementations, the asset is a pre-rendered asset and the operation 1522 is bypassed. For example, when the asset 1490 corresponds to a pre-rendered representation of an audio scene, generation of the output audio signal 1480 may bypass rendering at operation 1522 and instead advance to binauralizing the asset 1490, at operation 1524, such as described further with reference to FIGS. 16-19.

Figure 16:
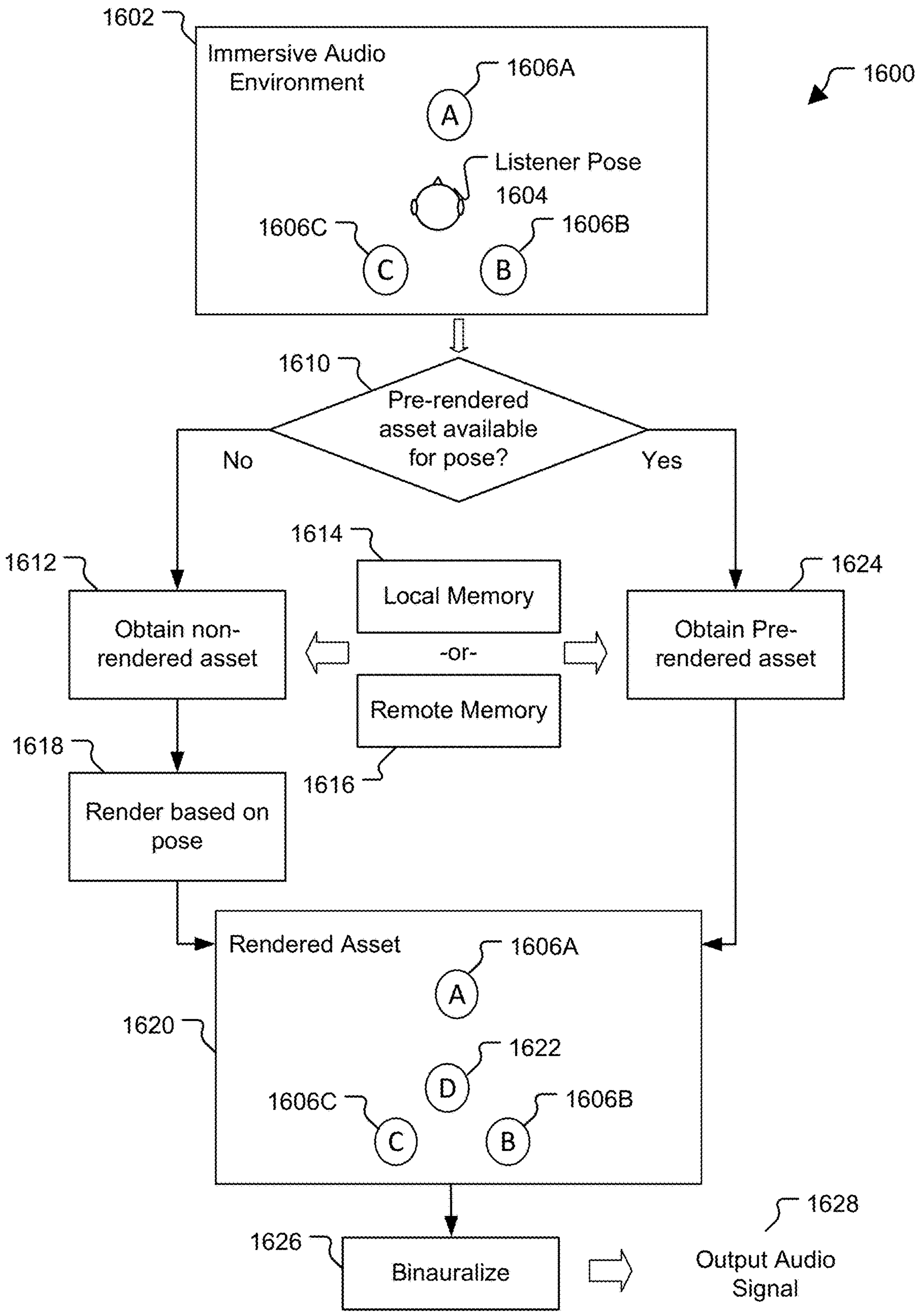
FIG. 16 is a diagram illustrating operations associated with adjusting a sound field, in accordance with one more examples of the present disclosure.

FIG. 16 illustrates an example of operations 1600 associated with generating output audio signals associated with an immersive audio environment. In FIG. 16, a schematic top view of a virtual environment representing an immersive audio environment 1602 is illustrated. The immersive audio environment 1602 in FIG. 16 includes a plurality of sound sources 1606, including an Ath sound source 1606A, a Bth sound source 1606B, and a Cth sound source 1606C. The immersive audio environment 1602 also includes a listener having a listener pose 1604. The listener pose indicates a position (e.g., a translational position) of the listener in the immersive audio environment 1602, an orientation of the listener in the immersive audio environment 1602, or both the position and the orientation of the listener.

Pose data indicating the listener pose 1604 can be obtained from several different sources. For example, the immersive audio environment 1602 can be constructed or controlled such that the listener pose 1604 is known in advance for some circumstances. To illustrate, when the immersive audio environment 1602 is associated with a game, the game may constrain user interaction such that the listener is guided (or virtually transported) toward a specific position (and optionally a specific orientation) in the immersive audio environment. As one example, a user's game avatar may be required to enter a room through a particular door or portal such that upon entry into the room, the listener pose 1604 associated with the game avatar is known in advance. Pose data can also be based on user interaction that causes movement (e.g., translation and/or rotation) of the listener in the immersive audio environment 1602. To illustrate, a user can interact with a pose sensor that generates the pose data. In this illustrative example, movement of the user (e.g., turning of the user's head) results in movement of the listener pose 1604.

The operations 1600 of FIG. 16 include, at block 1610, determining whether a pre-rendered asset associated with the listener pose 1604 is available. For example, the listener pose 1604 can be associated with an identifier (e.g., a name, a label, coordinates) and a list of pre-rendered assets can be checked for the identifier.

Based on a determination, at block 1610, that no pre-rendered asset associated with the listener pose 1604 is available, the operations 1600 include, at block 1612, obtaining a non-rendered asset associated with the immersive audio environment 1602. For example, the non-rendered asset can include audio data and metadata associated with the sound sources 1606. To illustrate, the non-rendered asset can include ambisonics data, such as first-order ambisonics data, mixed-order ambisonics data, or higher-order ambisonics data.

Optionally, in particular implementations, some assets associated with the immersive audio environment 1602 can be stored at a local memory 1614 (e.g., as pre-fetched assets). In such implementations, obtaining the non-rendered asset, at block 1612, can include determining whether the non-rendered asset is available from the local memory 1614. In such implementations, the non-rendered asset is obtained from the local memory 1614 if it is available there and is obtained from a remote memory 1616 (e.g., a memory of a server) if the non-rendered asset is not available from the local memory 1614.

The operations 1600 include, at block 1618, processing the non-rendered asset based on the listener pose 1604 to generate a rendered asset 1620. The rendered asset 1620 indicates sound field characteristics associated with a location 1622 of the listener in the immersive audio environment 1602. For example, the sound field characteristics associated with the location 1622 can include for each frame (f), sub-frame (k), and frequency bin (b) of the asset: an azimuth (θ) and an elevation (( ) of a direction of an average intensity vector associated with the sound sources 1606; a signal energy (e) associated with the sound sources 1606; a direct-to-total energy ratio (r) associated with the sound sources 1606; and an interpolated audio signal(s) for the sound sources 1606.

Returning to block 1610, based on a determination that a pre-rendered asset associated with the listener pose 1604 is available, the operations 1600 include, at block 1624, obtaining the pre-rendered asset associated with the listener pose 1604. Optionally, in particular implementations, some pre-rendered assets can be stored at the local memory 1614 (e.g., as pre-fetched assets). In such implementations, obtaining the pre-rendered asset, at block 1624, can include determining whether the pre-rendered asset is available from the local memory 1614. In such implementations, the pre-rendered asset is obtained from the local memory 1614 if it is available there and is obtained from the remote memory 1616 if the pre-rendered asset is not available from the local memory 1614.

The rendered asset 1620 (whether generated by rendering a non-rendered asset or retrieved from memory as a pre-rendered asset) is binauralized, at block 1626, to generate an output audio signal 1628. Binauralizing the rendered asset 1620 includes, for example, applying head-related transfer functions to the sound field characteristics representing the rendered asset 1620. The head-related transfer functions are based on an orientation of the listener in the immersive audio environment 1602. The output audio signal 1628 can include, for example, an output binaural signal, such as multiple output audio channels representing sound of the immersive audio environment 1602 as perceived by a listener having a position and orientation corresponding to the listener pose 1604.

The operations 1600 illustrate technical benefits of pre-rendering immersive audio assets for some listener poses. For example, as illustrated in FIG. 16, when an immersive audio player device has access to a pre-rendered asset for the listener pose 1604, the immersive audio player device does not have to perform the rendering operations of block 1618. As a result, the immersive audio player device conserves computing resources and power. Additional advantages can be obtained by pre-fetching certain assets (including pre-rendered assets, non-rendered assets, or both). For example, pre-fetching assets can reduce the impact of communication delays (e.g., network delays and/or lost packets).

Although three sound sources 1606 are illustrated in the immersive audio environment 1602 in FIG. 16, in other implementations, the immersive audio environment 1602 includes more or fewer sound sources 1606. The specific number and arrangement of the sound sources 1606 depends on the audio environment to be produced. To illustrate, in some audio scenes, the immersive audio environment 1602 can include a single audio source. In other audio scenes, the immersive audio environment 1602 can include more than three sound sources 1606, even many more than three sound sources 1606, such as dozens of sound sources 1606. In some implementations, when the immersive audio environment 1602 includes more than three sound sources 1606, a subset of the sound sources 1606 of the immersive audio environment 1602 is selected for processing (e.g., for rendering). For example, the sound sources 1606 of FIG. 16 can be selected from a larger set of sound sources associated with the immersive audio environment 1602 based on the relative positions of the sound sources 1606 and the listener position of the listener pose 1604.

In some implementations, the listener pose 1604 indicates a current listener pose based on pose data from a pose sensor. For example, at a first time, the pose sensor can send pose data indicating a current position and/or orientation associated with a user, and the pose data for the first time can be used as the listener pose 1604. In some implementations, the listener pose 1604 is a predicted pose. For example, at a first time, the pose sensor can send pose data indicating a current position and/or orientation associated with a user, and the pose data for the first time can be used (optionally with other data, such as historical pose data) to predict a position and/or an orientation associated with the user at a second time after the first time. In this example, the predicted position and/or orientation associated with the user at the second time can be used as the listener pose 1604.

In some implementations, the listener pose 1604 is indicated as a parameter of a seek operation. For example, the seek operation can be initiated based on user input or based on detection of an event associated with the immersive audio environment (e.g., a game event, expiration of a timer, an action performed by another user or a non-player character, etc.). To illustrate, in a game, an avatar associated with the user can be moved (e.g., advanced or teleported) to a particular position (and optionally a particular orientation) when an in-game event occurs or when the user provides input initiating the move. In the examples above, the seek operation can include or be associated with a parameter that indicates a specific location (and optionally a specific orientation) to which the listener is moved. In some cases, the listener pose 1604 associated with such moves can be known in advance, which may make them well suited for association with pre-rendered assets.

Figure 17:
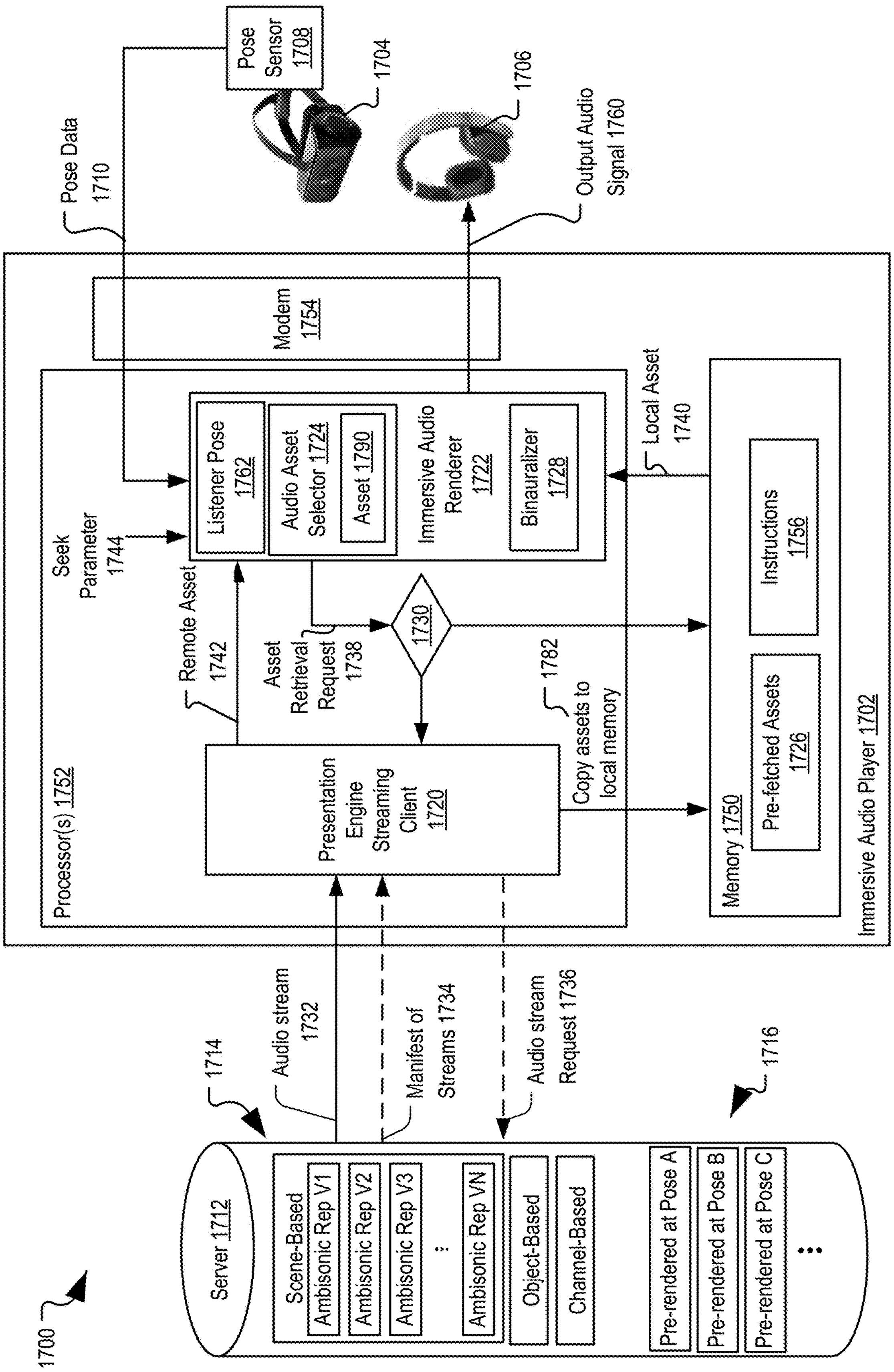
FIG. 17 is a block diagram illustrating an implementation of components and operations of a system for adjusting a sound field, in accordance with one more examples of the present disclosure.

FIG. 17 illustrates an example of a system 1700 for generating output audio signals associated with an immersive audio environment. The system 1700 includes an immersive audio player 1702, which includes one or more processors 1752 ("processor(s)" in FIG. 17) and memory 1750. In some implementations, the immersive audio player 1702 can include, correspond to, or be included within the immersive audio player 1402 of FIG. 14. The processor(s) 1752 are configured to execute instructions 1756 from the memory 1750 to cause the processor(s) 1752 to perform one or more of the operations 1600 of FIG. 16.

In the example illustrated in FIG. 17, the immersive audio player 1702 includes a modem 1754 to facilitate communication with one or more other devices. For example, in FIG. 17, the system 1700 includes an extended-reality (XR) headset 1704 and one or more audio output devices 1706 (illustrated in FIG. 17 as headphones). In this context, extended reality refers to virtual reality (VR), augmented reality (AR), mixed reality (MR), or any combination thereof. The modem 1754 can support communication of audio data to the audio output device(s) 1706, can support communication of XR data to the XR headset 1704, can support communication of pose data 1710 from the XR headset 1704 or the audio output device(s) 1706 to the immersive audio player 1702, or a combination thereof. As another example, in FIG. 17, the system 1700 includes a server 1712. In this example, the modem 1754 can support communication between the immersive audio player 1702 and the server 1712 (directly or via one or more networks).

In FIG. 17, the server 1712 stores data associated with one or more immersive audio environments (e.g., the immersive audio environment 1602 of FIG. 16). For example, in FIG. 17, audio data can include a set of non-rendered assets 1714 and one or more pre-rendered assets 1716. In some implementations, the non-rendered assets 1714 can represent an immersive audio environment using various techniques, such as via scene-based assets, object-based assets, or channel-based assets. Further, the server can store different versions of a particular asset (e.g., corresponding to different levels of complexity). To illustrate, multiple versions of a scene-based asset can be stored as different ambisonics representations (e.g., an Ambisonics Rep V1, an Ambisonics Rep V2, an Ambisonics Rep V3, an Ambisonics Rep V4, etc.) In this illustrative example, the Ambisonics Rep V1 can correspond to First-Order ambisonics (FOA) representation, the Ambisonics Rep V2 can correspond to a first Mixed-Order Ambisonics representation, the Ambisonics Rep V3 can correspond to a Full-Order ambisonics (FOA) representation. In a particular implementation, the server 1712 corresponds to the first device 102 of FIG. 1, one or more of the streaming devices of FIGS. 3A-7 or FIGS. 10A-10B, or the source device 802 of any of FIGS. 8A-8C, as illustrative, non-limiting examples. In a particular implementation, the ambisonics representations correspond to the ambisonics representations 822-828 of FIG. 8, the ambisonics representations 1414AA-1414AN of FIG. 14, or a combination thereof.

Each of the one or more pre-rendered assets 1716 is associated with a particular listener pose. For example, in FIG. 17, the pre-rendered asset(s) 1716 include a pre-rendered asset associated with a listener pose identified as "Pose A", a pre-rendered asset associated with a listener pose identified as "Pose B", a pre-rendered asset associated with a listener pose identified as "Pose C", and possibly one or more additional pre-rendered assets. To illustrate, Pose A can correspond to the listener pose 1604 of FIG. 16.

In the example illustrated in FIG. 17, the processor(s) 1752 of the immersive audio player 1702 include an immersive audio renderer 1722 and a presentation engine streaming client 1720. The immersive audio renderer 1722 is configured to perform rendering and binauralization operations to generate an output audio signal 1760 representing audio associated with the immersive audio environment for a particular listener pose 1762.

The immersive audio renderer 1722 of FIG. 17 includes an audio asset selector 1724. The audio asset selector 1724 is configured to select an asset 1790 for processing by the immersive audio renderer 1722. For example, the audio asset selector 1724 can select the asset 1790 to be processed based on the listener pose 1762. In various circumstances, the listener pose 1762 can be indicated by pose data 1710, can be predicted by the audio asset selector 1724 based on the pose data 1710, or can be indicated as a seek parameter 1744 of a seek operation. For example, the pose data 1710 can correspond to the sensor data 246 of FIG. 2, and a pose sensor 1708 can correspond to the one or more sensors 244 of FIG. 2. In a particular aspect, when the listener pose 1762 is obtained, the audio asset selector 1724 determines whether the listener pose 1762 is associated with a pre-rendered asset and selects the pre-rendered asset as the asset 1790 to be processed if the listener pose 1762 is associated with a pre-rendered asset. If the listener pose 1762 is not associated with a pre-rendered asset, the audio asset selector 1724 selects a non-rendered asset as the asset 1790 to be processed.

When the audio asset selector 1724 selects the asset 1790 (either a non-rendered or a pre-rendered asset) for processing, the audio asset selector 1724 generates an asset retrieval request 1738 identifying the asset 1790. A pre-fetch controller 1730 of the immersive audio player 1702 determines, based on the asset retrieval request 1738, whether the asset 1790 is among a set of pre-fetched assets 1726 stored in the memory 1750 of the immersive audio player 1702. If the asset 1790 is among the set of pre-fetched assets 1726, the asset 1790 is provided (as a local asset 1740) to the immersive audio renderer 1722. In a particular implementation, the pre-fetch controller 1730 corresponds to the audio asset selector 1424 of FIG. 14, the audio stream selector 814 of FIGS. 8A-8C, or a combination thereof.

If the asset 1790 is not among the set of pre-fetched assets 1726, the pre-fetch controller 1730 sends the asset retrieval request 1738 or data identifying the asset 1790 to the presentation engine streaming client 1720. The presentation engine streaming client 1720 generates an audio stream request 1736 to request the asset 1790 from the server 1712. The server 1712 returns the requested asset 1790 via an audio stream 1732, and the presentation engine streaming client 1720 provides the asset 1790 to the immersive audio renderer 1722 as a remote asset 1742.

Optionally, in some implementations, the immersive audio player 1702 can request assets for local storage. For example, the pre-fetch controller 1730, the presentation engine streaming client 1720, or the immersive audio renderer 1722 can determine that an asset identified in a manifest of streams 1734 from the server 1712 should be pre-fetched. In this example, the presentation engine streaming client 1720 generates an audio stream request 1736 to request the asset from the server 1712. The server 1712 returns the requested asset via an audio stream 1732, and the presentation engine streaming client 1720 copies, at 1782, the asset to local memory (e.g., the memory 1750) as one of the pre-fetched assets 1726. The asset retrieved from the server 1712 and stored as a pre-fetched asset can be one of the pre-rendered assets 1716 or one of the non-rendered assets 1714.

In some implementations, an asset retrieved from the server 1712 and stored as a pre-fetched asset can be compressed or otherwise encoded. In such implementations, the asset can be decoded or decompressed before the asset is stored to the memory 1750 as a pre-fetched asset 1726 or the asset can be stored to the memory 1750 as a pre-fetched asset 1726 in an encoded or compressed format. To illustrate, an asset to be pre-fetched can be assigned a likelihood of use indicating a confidence level that the asset will eventually be requested by the audio asset selector 1724. In this example, whether an encoded or compressed asset from the server 1712 is decoded or decompressed before being stored as a pre-fetched asset 1726 can depend on the likelihood of use. To illustrate, assets associated with a high likelihood of use (e.g., greater than or greater than or equal to a threshold value) can be decoded or decompressed before storage at the memory 1750 as a pre-fetched asset. In contrast, assets associated with a low likelihood of use (e.g., less than or less than or equal to a threshold value) can be stored at the memory 1750 as a pre-fetched asset in an encoded or compressed format (e.g., to conserve resources associated with decoding or decompressing an asset that may not be needed).

In some implementations, at least some of the pre-fetched assets 1726 can be retrieved independently of a user's interactions with the immersive audio environment. For example, assets associated with particular points of interest or waypoints of the immersive audio environment can be pre-fetched as part of an initial configuration of the immersive audio player 1702 for use with the immersive audio environment. To illustrate, when the immersive audio environment is associated with a game, downloading or setting up the game on the immersive audio player 1702 can include pre-fetching of particular assets associated with the immersive audio environment.

In the same or different implementations, at least some of the pre-fetched assets 1726 can be retrieved responsive to or based on a user's interactions with the immersive audio environment. For example, assets associated with a point of interest or waypoint near a user's current listener pose can be pre-fetched.

The specific number and/or type (e.g., compressed or uncompressed, non-rendered or pre-rendered) of assets stored among the pre-fetched assets 1726 can be determined based on user settings, resource availability at the immersive audio player 1702, or other criteria. For example, the immersive audio player 1702 may be configured to be operable in two or more modes, and the number and/or type of assets pre-fetched can depend on the operating mode of the immersive audio player 1702. For example, a first mode can include a high-performance mode in which high-quality user experience is preferred over conservation of resources, and a second mode can include a low-power mode in which conservation of resources (especially power) can be preferred over high-quality user experience. In this example, assets can be pre-fetched and possibly decompressed for storage at the memory 1750 even if they are associated with a relatively low likelihood of use when the immersive audio player 1702 is in the first mode, and fewer assets can be pre-fetched and decompressed for storage at the memory 1750 when the immersive audio player 1702 is in the first mode.

As another example, a first mode can allocate more of the memory 1750 for the pre-fetched assets 1726 than a second mode. In this example, fewer assets may be pre-fetched for storage at the memory 1750 when the immersive audio player 1702 is in the second mode than when the when the immersive audio player 1702 is in the first mode. Additionally, or alternatively, pre-fetched assets 1726 can be stored in a compressed format in the second mode and in an uncompressed format in the first mode.

In the examples of above, and in other examples in which the immersive audio player 1702 can operate in two or more modes, the specific mode in which the immersive audio player 1702 operates at a particular time can be determined based on user input or user configuration settings or based on resource availability. For example, the immersive audio player 1702 can automatically switch modes based on detecting low battery power or based on detecting that the immersive audio player 1702 is plugged in.

In an example, during use of the system 1700, the immersive audio player 1702 can obtain the listener pose 1762 associated with the immersive audio environment. For example, the listener pose 1762 can include or be determined based on the pose data 1710 generated by a pose sensor 1708. In this example, the pose sensor 1708 detects, for example, an orientation (e.g., head orientation) of a user of the XR headset 1704, the audio output device 1706, or both, a location of the user, movement of the user, or combinations thereof. As another example, the listener pose 1762 can include or be determined based on the seek parameter 1744. As another example, the listener pose 1762 can be automatically generated based on an event associated with the immersive audio environment, such as an in-game event or timer.

The audio asset selector 1724 selects the asset 1790 to be processed based on the listener pose 1762 and data that maps the listener pose 1762 to available assets. For example, the manifest of streams 1734 can map listener poses to assets. In some implementations, the manifest of streams 1734 can identify the type of each asset, such as whether the asset is pre-rendered, whether the asset represents FOA data, mixed-order ambisonics data, or full-order ambisonics data, etc. In some implementations, the audio asset selector 1724 favors pre-rendered assets over non-rendered assets when both are available for a particular listener pose 1762. The audio asset selector 1724 generates the asset retrieval request 1738 to identify the asset 1790 that is selected.

The pre-fetch controller 1730 determines whether the asset 1790 is among the pre-fetched assets 1726 in the memory 1750. If the asset 1790 is among the pre-fetched assets 1726, the asset 1790 is provided to the immersive audio renderer 1722 as the local asset 1740. If the asset 1790 is not among the pre-fetched assets 1726, the presentation engine streaming client 1720 sends an audio stream request 1736 for the asset 1790 to the server 1712. The server 1712 sends the asset 1790 to the immersive audio player 1702 via an audio stream 1732, and the asset 1790 is provided to the immersive audio renderer 1722 as a remote asset 1742.

The immersive audio renderer 1722 generates the output audio signal 1760 based on a rendered asset. For example, if a pre-rendered asset is received by the immersive audio renderer 1722 in response to an asset retrieval request 1738, the rendered asset corresponds to the pre-rendered asset. If a non-rendered asset is received by the immersive audio renderer 1722 in response to an asset retrieval request 1738, the immersive audio renderer 1722 processes the non-rendered asset to generate the rendered asset. The immersive audio renderer 1722 includes a binauralizer to generate the output audio signal 1760 based on the rendered asset. The output audio signal 1760 can include, for example, an output binaural signal or multiple output audio channels. The output audio signal 1760 is provided to the audio output device(s) 1706 to generate sound corresponding to the output audio signal 1760 for consumption by the user. According to an aspect, the output audio signal 1760 includes an output binaural signal that is provided to speakers for playout. The rendering operation and binauralization can include sound field rotation (e.g., 3DOF), rotation and limited translation (e.g., 3DOF+), or rotation and translation (e.g., 6DOF) based on the listener pose 1762, such as described with reference to the audio decoder and binauralizer 808 of FIGS. 8A-8C.

Although the system 1700 illustrates the XR headset 1704 and the audio output device(s) 1706 as separate devices, in some implementations, the XR headset 1704 and the audio output device(s) 1706 are combined in a single device. In other implementations, the XR headset 1704 is omitted, in which case the pose sensor 1708 can be integrated within the audio output device(s) 1706 or can be a separate device.

Although the system 1700 illustrates the XR headset 1704, the audio output device(s) 1706, and the immersive audio player 1702 as separate devices, in some implementations, the immersive audio player 1702 is integrated within the XR headset 1704. In other implementations, the immersive audio player 1702 is integrated within the audio output device(s) 1706. In other implementations, the XR headset 1704, the audio output device(s) 1706, and the immersive audio player 1702 are integrated within a single device. In some implementations, the pose sensor 1708, speakers, and the immersive audio player 1702 are included in a single device, such as, for example, the second device 202 of FIG. 2 or the wearable device of any of FIGS. 3-7 or FIGS. 10A-10B, as illustrative, non-limiting examples.

Although the system 1700 illustrates the pre-fetch controller 1730 is external to the immersive audio renderer 1722 and external to the presentation engine streaming client 1720, in some implementations, the pre-fetch controller 1730 is integrated within the immersive audio renderer 1722 or the presentation engine streaming client 1720. For example, the pre-fetch controller 1730 and the audio asset selector 1724 can be combined. Further, although the system 1700 illustrates the audio asset selector 1724 as a component of the immersive audio renderer 1722, in some implementations, the audio asset selector 1724 is external to the immersive audio renderer 1722.

Figure 18:
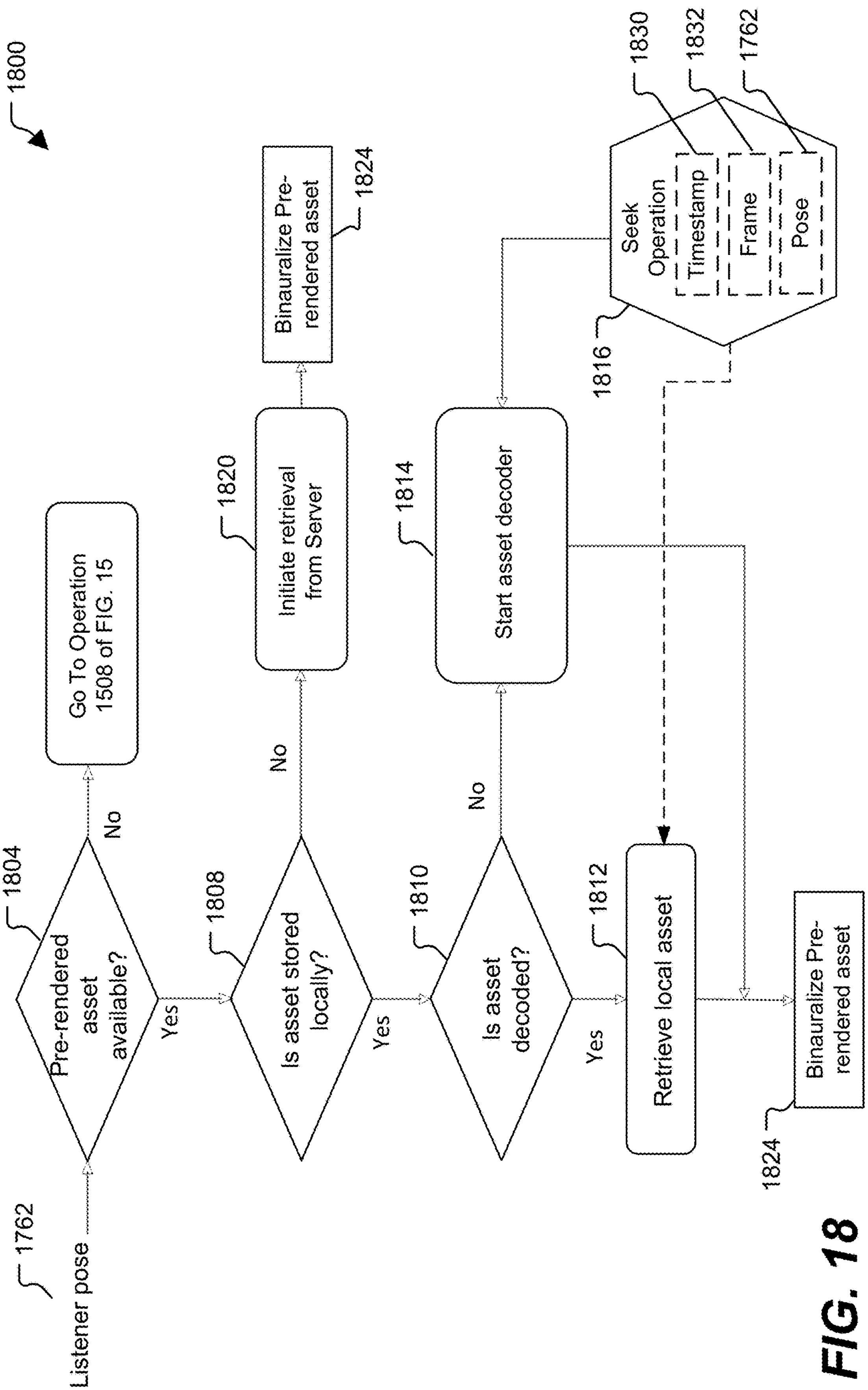
FIG. 18 is a block diagram illustrating an implementation of operations of a system for adjusting a sound field, in accordance with one more examples of the present disclosure.

FIG. 18 depicts an example of operations 1800 associated with retrieving and processing an asset. For example, the operations 1800 may correspond to operations performed by the immersive audio renderer 1722 based on the listener pose 1762.

The operations 1800 include determining whether a pre-rendered asset associated with the listener pose 1762 is available, at operation 1804. For example, the audio asset selector 1724 may determine whether a pre-rendered asset corresponding to the listener pose 1762 is available, such as by searching a listing or manifest of pre-rendered assets. If no pre-rendered asset corresponding to the listener pose 1762 is available, the operations 1800 proceed to operation 1508 of FIG. 15.

If a pre-rendered asset corresponding to the listener pose 1762 is available, the operations 1800 include determining whether the pre-rendered asset (e.g., the asset 1790) is stored locally, at operation 1808. For example, the audio asset selector 1724 or the pre-fetch controller 1730 may determine whether the asset 1790 is stored in the memory 1750, such as by searching a listing or manifest of the pre-fetched assets 1726.

In response to the asset not being stored locally, the operations 1800 include initiating retrieval of the asset from a server, at operation 1820. For example, based on a determination that the asset 1790 is not stored locally at the memory 1750, the presentation engine streaming client 1720 sends the audio stream request 1736 for the asset 1790 to the server 1712 to initiate retrieval of the asset 1790 from the server 1712.

The asset is then binauralized, at operation 1824. For example, the asset 1790 may be received via the audio stream 1732, optionally decoded at the presentation engine streaming client 1720, and sent to the immersive audio renderer 1722 as the remote asset 1742. The immersive audio renderer 1722 performs binauralization, based on the listener pose 1762, to generate a pose-adjusted binaural signal, which is provided as the output audio signal 1760.

In response to the asset being stored locally, the operations 1800 include determining whether the asset is decoded, at operation 1810. In response to a determination that the asset has not been decoded, the operations 1800 include starting an asset decoder to decode the asset, at operation 1814. For example, based on a determination that the asset 1790 is stored locally at the memory 1750, the immersive audio player 1702 may selectively decode the asset 1790 based on a determination of whether the asset 1790 has been decoded. Otherwise, in response to a determination that the asset has been decoded, the local asset is retrieved, at operation 1812.

A seek operation 1816 is performed to determine a playout start point of the asset. In an example, the seek operation 1816 may correspond to a temporal seek operation that determines the playout start point based on at least one of a timestamp 1830 or an audio frame identifier 1832. In another example, the seek operation 1816 corresponds to a position seek operation that determines the playout start point based on the listener pose 1762. For example, an indication of the listener pose 1762 may be indicated as a parameter of the seek operation 1816.

If the asset has not yet been decoded, the seek operation 1816 may be used to identify a decoding start point for the decoding operation. For example, the asset decoder may be configured to parse metadata (e.g., timestamp, frame index, listener position, etc.) associated with frames, packets, or other portions of the encoded asset to identify a decoding start point corresponding to the timestamp 1830, the audio frame identifier 1832, or the listener pose 1762, respectively, of the seek operation 1816. Parsing the metadata to locate the decoding start point provides the technical benefit of being less computationally expensive and resulting in reduced latency as compared to decoding the entire asset.

The asset is then binauralized, at operation 1824. For example, the portion of the decoded asset 1790 beginning at the playout start point is sent to the immersive audio renderer 1722 as the local asset 1740. The immersive audio renderer 1722 performs binauralization to generate the output audio signal 1760 based on the playout start point.

Figure 19:
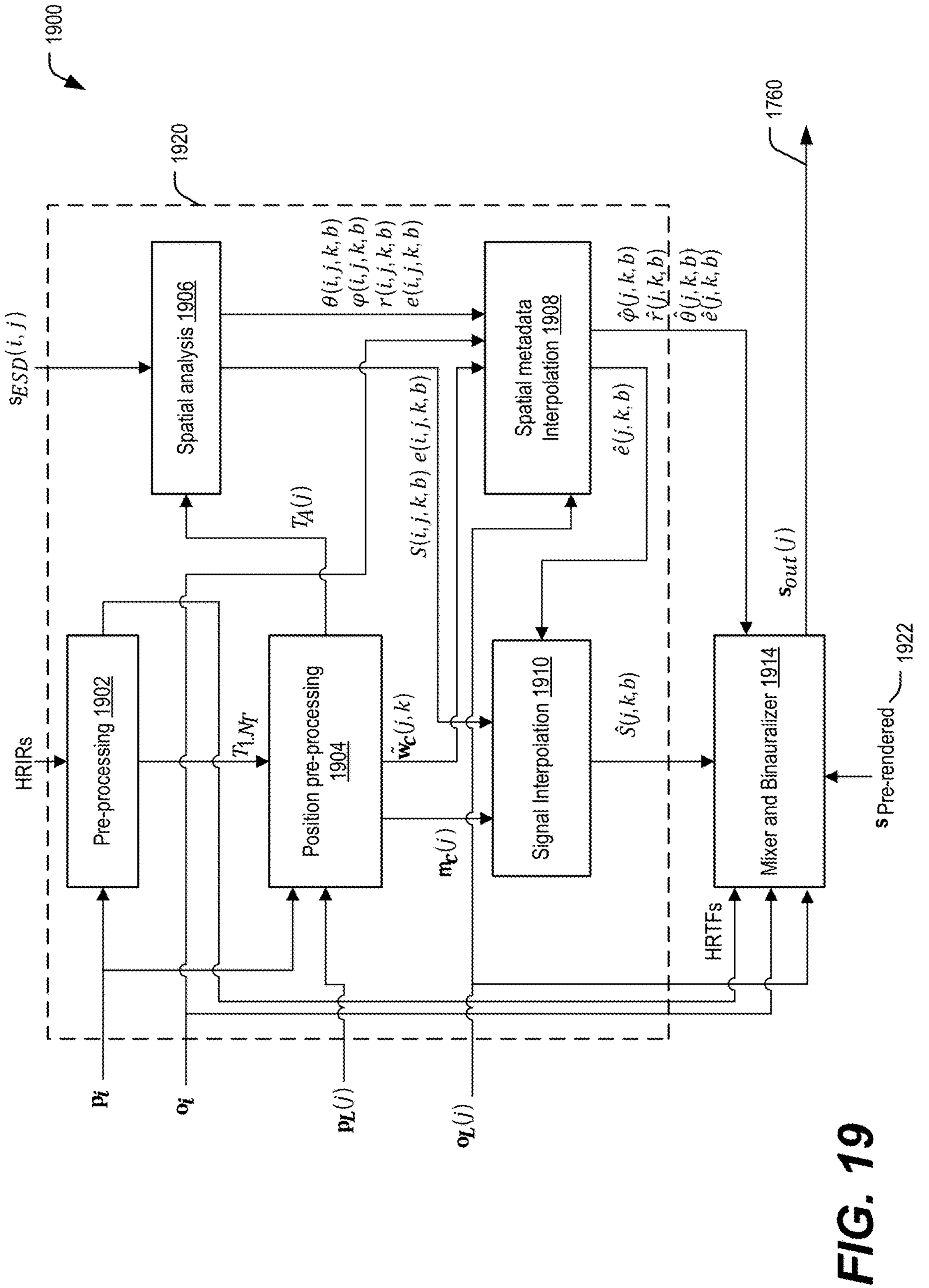
FIG. 19 is a block diagram illustrating an implementation of components and operations of a system for adjusting a sound field, in accordance with one more examples of the present disclosure.

FIG. 19 depicts an example of components 1900 that may be implemented in the immersive audio renderer 1722, including a renderer 1920 and a mixer and binauralizer 1914. In a particular aspect, the mixer and binauralizer 1914 includes, corresponds to, or is included within the binauralizer 1728 of FIG. 17. In FIG. 19, the renderer 1920 includes a pre-processing module 1902, a position pre-processing module 1904, a spatial analysis module 1906, a spatial metadata interpolation module 1908, a signal interpolation module 1910, a mixer and binauralizer 1914. In a particular implementation, the components 1900 are configured to generate the output audio signal 1760, which in FIG. 19 corresponds to a binaural output signal $S_{out}(j)$ based on processing an asset that represents an immersive audio environment using ambisonics representations.

When a non-rendered asset is received, the pre-processing module 1902 is configured to receive head-related impulse response information (HRIRs) and audio source position information $\mathbf{p}_i$ (where boldface lettering indicates a vector, and where i is an audio source index), such as (x, y, z) coordinates of the location of each audio source in an audio scene. The pre-processing module 1902 is configured to generate HRTFs and a representation of the audio source locations as a set of triangles $T_{1 . N_T}$ (where $N_T$ denotes the number of triangles) having an audio source at each triangle vertex.

The position pre-processing module 1904 is configured to receive the representation of the audio source locations $T_{1 . N_T}$, the audio source position information $\mathbf{p}_i$, listener position information $\mathbf{p}_L(j)$ (e.g., x, y, z coordinates) that indicates a listener location for a frame j of the audio data to be rendered. The position pre-processing module 1904 is configured to generate an indication of the location of the listener relative to the audio sources, such as an active triangle $T_A(j)$, of the set of triangles, that includes the listener location; an audio source selection indication $m_C(j)$ (e.g., an index of a chosen HOA source for signal interpolation); and spatial metadata interpolation weights $\tilde{w}_c(j, k)$ (e.g., chosen spatial metadata interpolation weights for a subframe k of frame j).

The spatial analysis module 1906 receives the audio signals of the audio streams, illustrated as $S_{ESD}(i,j)$ (e.g., an equivalent spatial domain representation of the signals for each source i and frame j) and also receives the indication of the location of the active triangle $T_A(j)$ that includes the listener. The spatial analysis module 1906 can convert the input audio signals to an HOA format and generates orientation information for the HOA sources (e.g., θ(i, j, k, b) representing an azimuth parameter for HOA source i for sub-frame k of frame j and frequency bin b, and φ(i, j, k, b) representing an elevation parameter) and energy information (e.g., r (i, j, k, b) representing a direct-to-total energy ratio parameters and e(i, j, k, b) representing an energy value). The spatial analysis module 1906 also generates a frequency domain representation of the input audio, such as S(i, j, k, b) representing a time-frequency domain signal of HOA source i.

The spatial metadata interpolation module 1908 performs spatial metadata interpolation based on source orientation information $\mathbf{o}_i$, listener orientation information $\mathbf{o}_L(j)$, the HOA source orientation information and energy information from the spatial analysis module 1906, and the spatial metadata interpolation weights from the position pre-processing module 1904. The spatial metadata interpolation module 1908 generates energy and orientation information including ẽ(i, j, b) representing an average (over sub-frames) energy for HOA source i and audio frame j for frequency band b, Õ(i, j, b) representing an azimuth parameter for HOA source i for frame j and frequency bin b, φ̃(i, j, b) representing an elevation parameter for HOA source i for frame j and frequency bin b, and ř(i, j, b) representing a direct-to-total energy ratio parameter for HOA source i for frame j and frequency bin b.

The signal interpolation module 1910 receives energy information (e.g., ẽ(i, j, b)) from the spatial metadata interpolation module 1908, energy information (e.g., e(i, j, k, b)) and a frequency domain representation of the input audio (e.g., S(i, j, k, b)) from the spatial analysis module 1906, and the audio source selection indication $m_C(j)$ from the position pre-processing module 1904. The signal interpolation module 1910 generates an interpolated audio signal Ŝ(j, k, b).

When the renderer 1920 is used to render an asset, the mixer and binauralizer 1914 receives the source orientation information $\mathbf{o}_i$, the listener orientation information $\mathbf{o}_L(j)$, the HRTFs, and the interpolated audio signal Ŝ(j, k, b) and interpolated orientation and energy parameters from the signal interpolation module 1910 and the spatial metadata interpolation module 1908, respectively. When the asset is a pre-rendered asset 1922, the mixer and binauralizer 1914 receives the source orientation information $\mathbf{o}_i$, the HRTFs, and the interpolated audio signal Ŝ(j, k, b) and interpolated orientation and energy parameters as part of the pre-rendered asset 1922. Optionally, if the listener pose associated with a pre-rendered asset 1922 is specified in advance, the pre-rendered asset 1922 also includes the listener orientation information $O_L(j)$. Alternatively, if the listener pose associated with a pre-rendered asset 1922 is not specified in advance, the pre-rendered asset 1922 receives the listener orientation information $O_L(j)$ based on the listener pose 1762 of FIG. 17.

The mixer and binauralizer 1914 is configured to configured to apply one or more rotation operations based on an orientation of each interpolated signal and the listener's orientation; to binauralize the signals using the HRTFs; if multiple interpolated signals are received, to combine the signals (e.g., after binauralization); to perform one or more other operations; or any combination thereof, to generate the output audio signal 1760.

Figure 20:
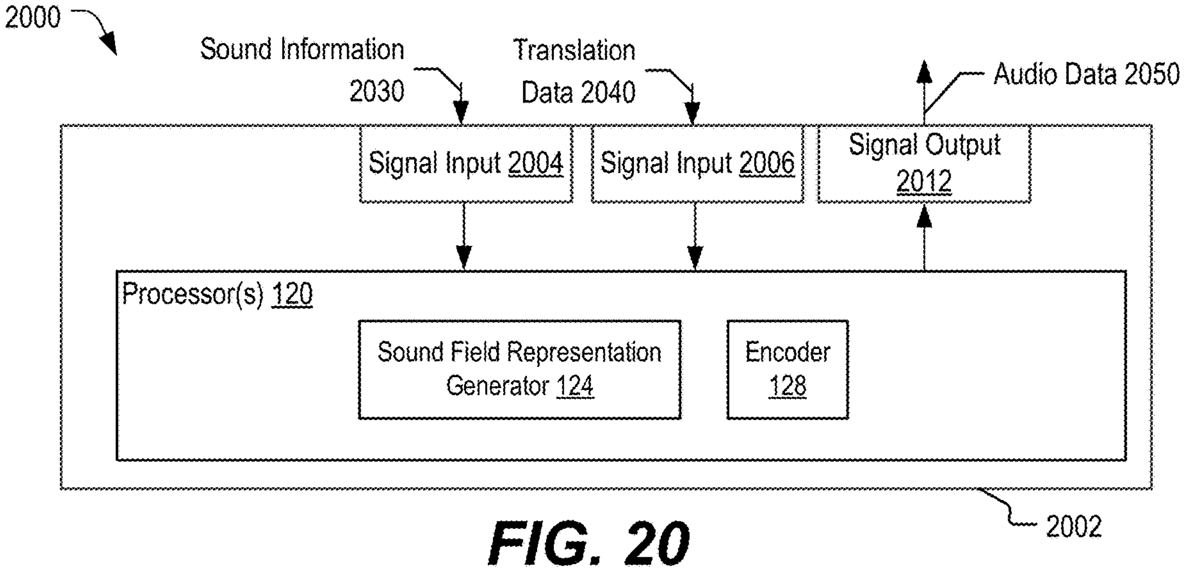
FIG. 20 is a block diagram illustrating a first implementation of an integrated circuit for adjusting a sound field.

FIG. 20 is a block diagram illustrating an implementation 2000 of the first device 102 as an integrated circuit 2002 for adjusting a sound field. The integrated circuit 2002 includes the one or more processors 120. The one or more processors 120 include the sound field representation generator 124, the encoder 128, or both. The integrated circuit 2002 also includes a signal input 2004 and a signal input 2006, such as bus interfaces, to enable sound information 2030 from an audio source (e.g., the sound information 123) and translation data 2040 from a playback device (e.g., the data 166) to be received. The integrated circuit 2002 also includes a signal output 2012, such as a bus interface, to enable sending of audio data 2050 (e.g., the encoded audio data 129) after adjusting the sound field based on the translation data 2040. The integrated circuit 2002 enables implementation of sound field adjustment as a component in a system that includes an audio source and a wireless transceiver, such as a streaming device as depicted in FIG. 3A-8C, 10A-10B, 14, or 17.

Figure 21:
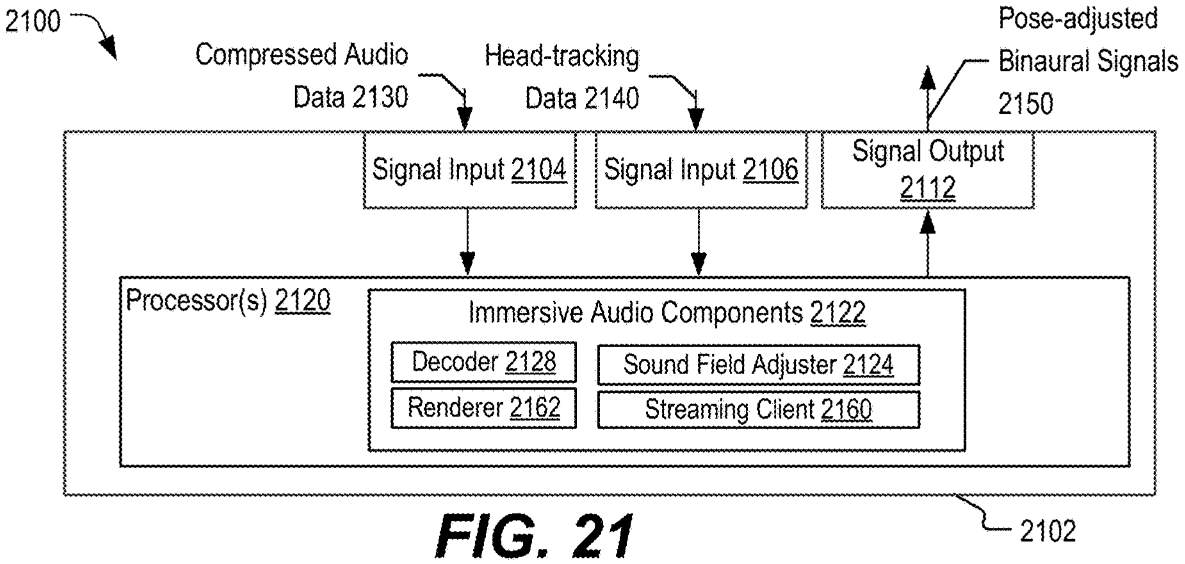
FIG. 21 is a block diagram illustrating a second implementation of an integrated circuit for adjusting a sound field.
Figure 24:
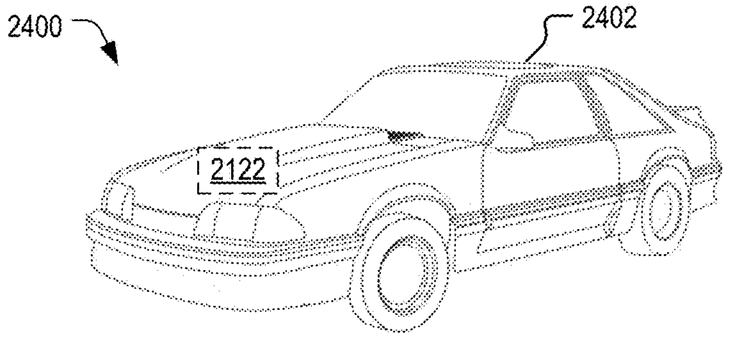
FIG. 24 is a diagram of a first implementation of a vehicle configured to adjust a sound field.
Figure 25:
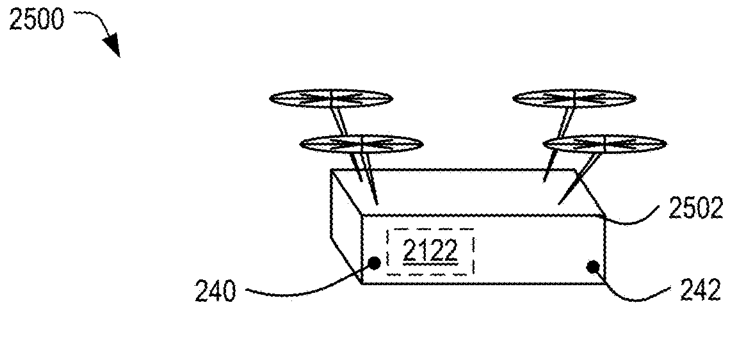
FIG. 25 is a diagram of a second implementation of a vehicle configured to adjust a sound field.
Figure 40:
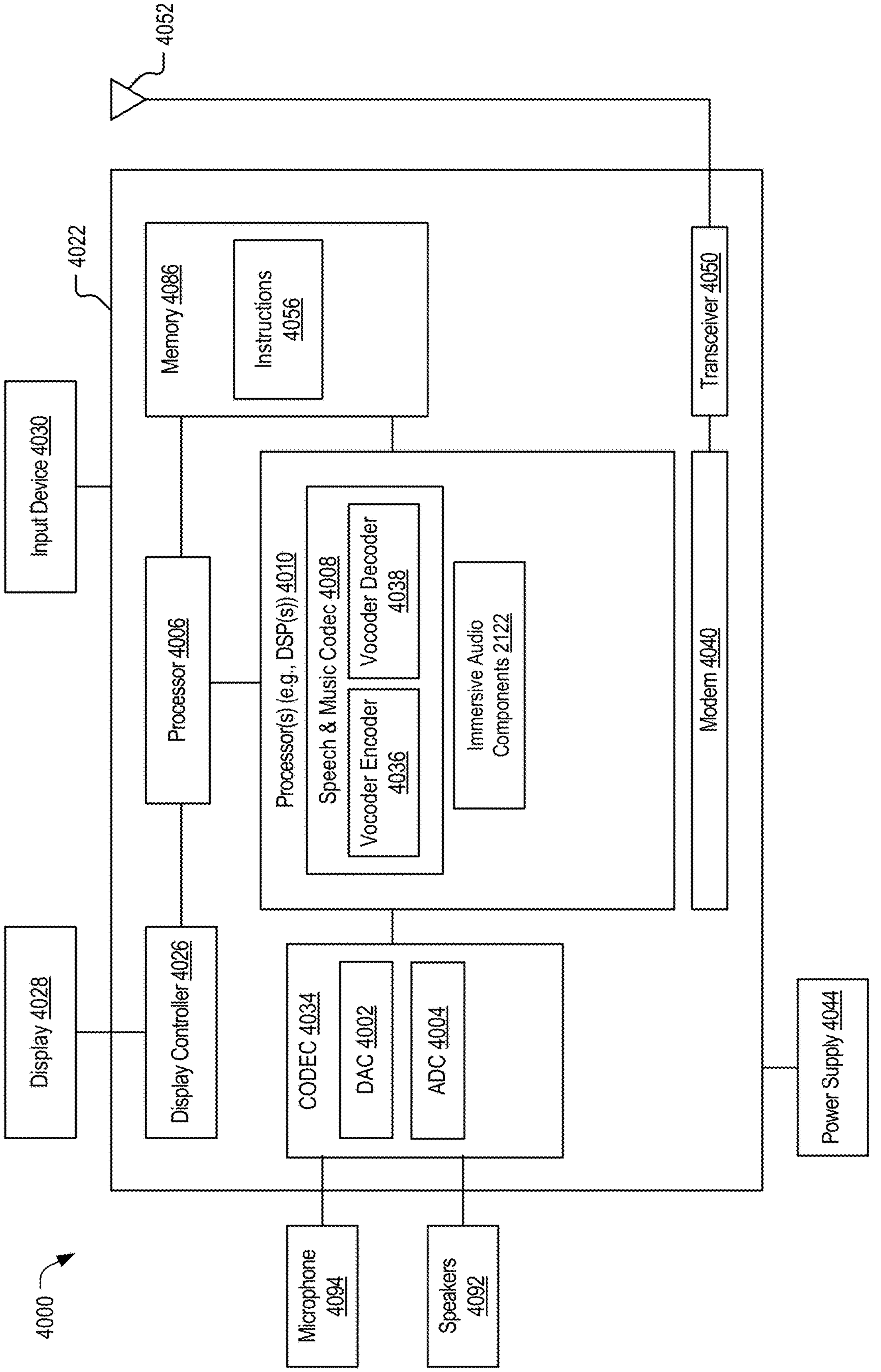
FIG. 40 is a block diagram of a particular illustrative example of a computing device that is operable to perform the techniques described with reference to FIGS. 1-39.

FIG. 21 is a block diagram illustrating an implementation 2100 of an integrated circuit 2102. The integrated circuit 2102 includes one or more processors 2120, such as the one or more processors 220, the one or more processors 1460, or the one or more processors 1752, as illustrative examples. The one or more processors 2120 include immersive audio components 2122. The immersive audio components may include a decoder 2128 (e.g., the decoder 228 or the decoder 1421), a sound field adjuster 2124 (e.g., the sound field adjuster 224), a renderer 2162 (e.g., the renderer 222, the immersive audio renderer 1422, or the immersive audio renderer 1722), a streaming client 2160 (e.g., the streaming client 806, the streaming client 906, the presentation engine streaming client 1420, or the presentation engine streaming client 1720) or any combination thereof. The integrated circuit 2102 also includes a signal input 2104 and a signal input 2106, such as bus interfaces, to enable compressed audio data 2130 (e.g., the encoded audio data 229) and head-tracking data 2140 from one or more sensors (e.g., the sensor data 246) to be received. The integrated circuit 2102 also includes a signal output 2112, such as one or more bus interfaces, to enable sending of pose-adjusted binaural signals 2150 (e.g., the signals 239, 241) after adjusting the sound field based on the head-tracking data 2140. The integrated circuit 2102 enables implementation of sound field adjustment, such as adjustment of an immersive audio environment based on a listener pose, as a component in a system that includes a wireless receiver and two or more speakers, such as a wearable device (e.g., a headphone device), as depicted in FIGS. 3A-10B, a speaker array as depicted in FIG. 22, a virtual reality, mixed reality, or augmented reality headset as depicted in FIG. 23, a vehicle as depicted in FIG. 24 or 25, or a wireless communication device as depicted in FIG. 40.

Figure 22:
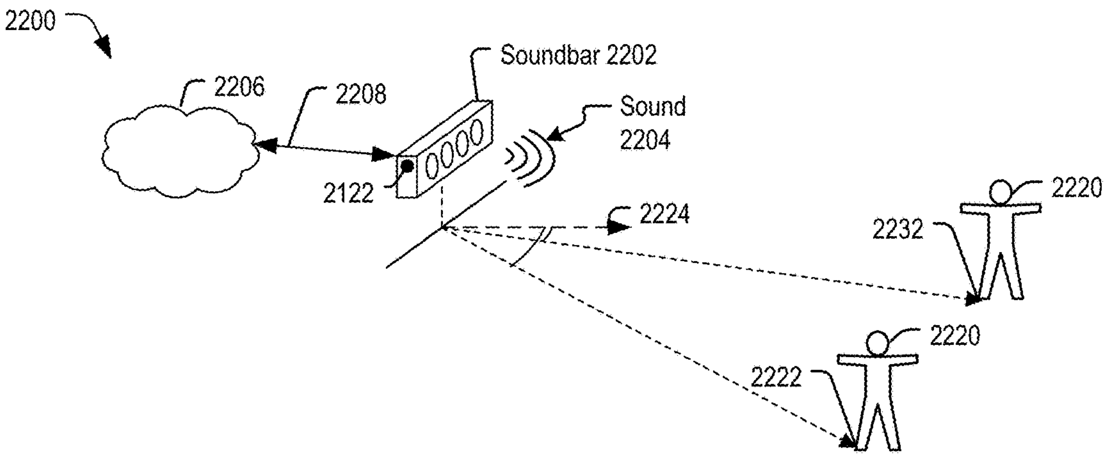
FIG. 22 is a block diagram illustrating an illustrative implementation of a system for adjusting a sound field and including external speakers.

FIG. 22 is a block diagram illustrating an implementation of a system 2200 for adjusting a sound field and in which the immersive audio components 2122 are integrated within a speaker array, such as a soundbar device 2202. The soundbar device 2202 is configured to perform a beam steering operation to steer binaural signals to a location associated with a user. The soundbar device 2202 may receive ambisonic audio data 2208 from a remote streaming server via a wireless network 2206. The soundbar device 2202 may include the one or more processors 220 (e.g., including the decoder 228, the sound field adjuster 224, or both) configured to adjust the sound field represented by the ambisonic audio data 2208, and perform the beam steering operation to steer binaural signals to a location associated with a listener 2220.

The soundbar device 2202 includes or is coupled to one or more sensors (e.g., cameras, structured light sensors, ultrasound, lidar, etc.) to enable detection of a pose of the listener 2220 and generation of head-tracker data of the listener 2220. For example, the soundbar device 2202 may detect a pose of the listener 2220 at a first location 2222 (e.g., at a first angle from a reference 2224), adjust the sound field based on the pose of the listener 2220, and perform a beam steering operation to cause emitted sound 2204 to be perceived by the listener 2220 as a pose-adjusted binaural signal. In an example, the beam steering operation is based on the first location 2222 and a first orientation of the listener 2220 (e.g., facing the soundbar device 2202). In response to a change in the pose of the listener 2220, such as movement of the listener 2220 to a second location 2232, the soundbar device 2202 adjusts the sound field (e.g., according to a 3DOF/3DOF+ or a 6DOF operation) and performs a beam steering operation to cause the resulting emitted sound 2204 to be perceived by the listener 2220 as a pose-adjusted binaural signal at the second location 2232.

Figure 23:
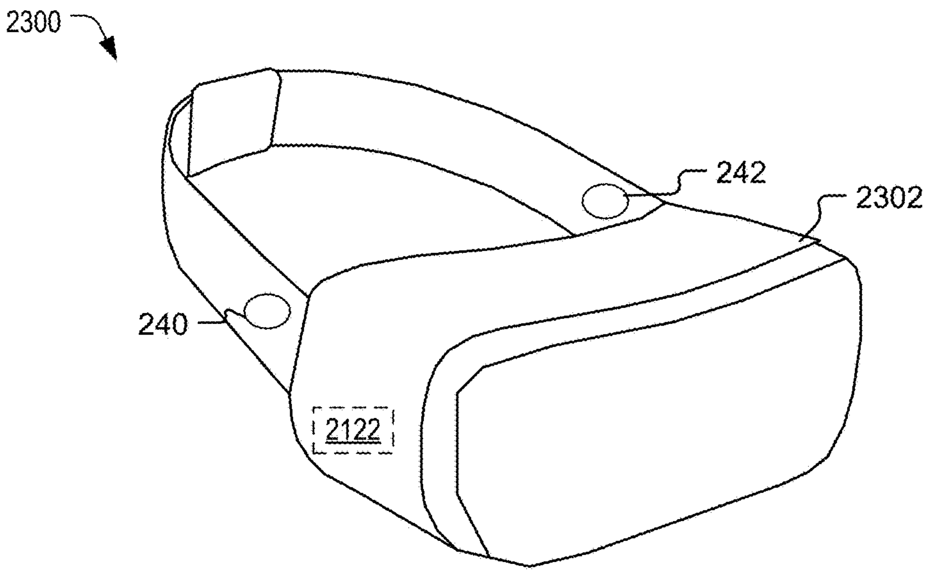
FIG. 23 is a diagram of an implementation of a portable electronic device for adjusting a sound field.

FIG. 23 depicts an implementation 2300 in which the immersive audio components 2122 are implemented in a portable electronic device that corresponds to a virtual reality, augmented reality, or mixed reality headset 2302. The one or more processors 2120 (e.g., including the immersive audio components 2122), the loudspeakers 240, 242, the memory 210, the one or more sensors 244, the transceiver 230, or a combination thereof, may be integrated into the headset 2302. Adjustment of a sound field corresponding to audio data received from a remote streaming server can be performed based on head-tracker data generated by the one or more sensors 244, such as described with reference to FIGS. 2-19.

FIG. 24 depicts an implementation 2400 in which the immersive audio components 2122 are implemented in a vehicle 2402, illustrated as a car. In some implementations, the immersive audio components 2122 are integrated into the vehicle 2402, and the data from the one or more sensors 244 indicates a translation of the vehicle 2402 and an orientation of the vehicle 2402. In some implementations, data indicating the translation of the vehicle 2402 and the orientation of the vehicle 2402 is sent to a remote server, such as the first device 102. Audio data from the remote server (e.g., navigation data) may be received at the vehicle 2402 and a sound field associated with the received audio data may be adjusted based on the translation, the orientation, or both, prior to playout at one or more loudspeakers of the vehicle 2402. For example, playout of navigation data (e.g., spoken driving directions to a destination) may be adjusted to appear to the occupants of the vehicle 2402 that the spoken directions originate from the location or direction of the navigation destination and may thus provide additional information, encoded into the perception of distance and direction of the source of the spoken navigation directions, to a driver of the vehicle 2402.

FIG. 25 depicts another implementation 2500 in which the immersive audio components 2122 are implemented in a vehicle 2502, illustrated as a manned or unmanned aerial device (e.g., a package delivery drone). In some implementations, the immersive audio components 2122 are integrated into the vehicle 2502, and the data from the one or more sensors 244 indicates a translation of the vehicle 2502 and an orientation of the vehicle 2502. In some implementations, the vehicle 2502 is manned (e.g., carries a pilot, one or more passengers, or both) and may adjust a sound field of received audio data in a similar manner as described with reference to the vehicle 2402. In another implementation in which the vehicle 2502 is unmanned and the loudspeakers 240, 242 are on an external surface of the vehicle 2502, the vehicle may function in a similar manner as described with reference to the speaker array of FIG. 22 to adapt beamforming during playing out audio to one or more listeners based on change in pose of the listener(s) (e.g., to function as a hovering speaker array). Alternatively, or in addition, the vehicle 2502 may move (e.g., circle an outdoor audience during a concert) while playing out audio, and the immersive audio components 2122 may perform operations to adjust the sound field based on translation and rotation of the vehicle 2502.

Figure 26:
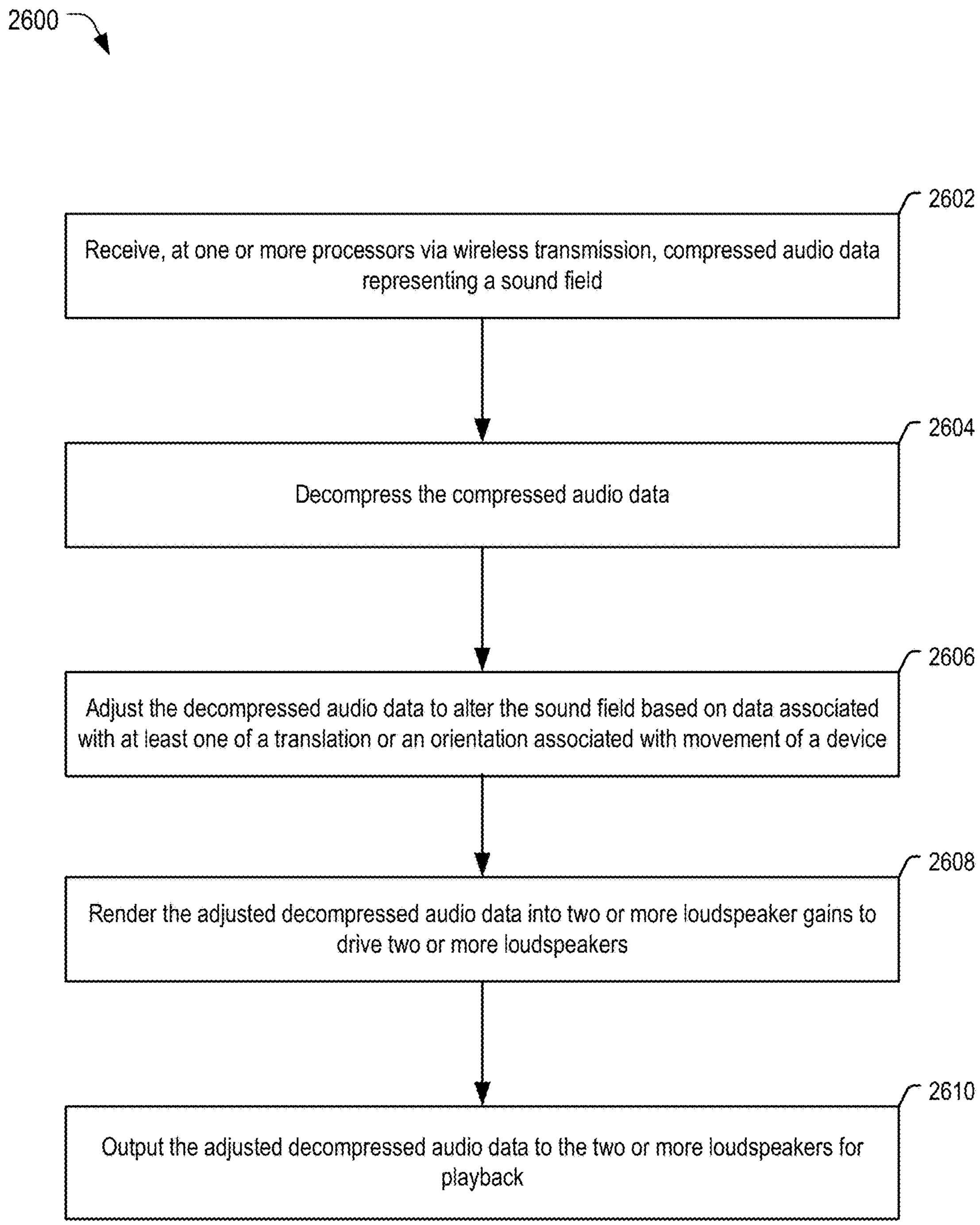
FIG. 26 illustrates a first example of a method for adjusting a sound field.

FIG. 26 illustrates a first example of a method 2600 for adjusting a sound field. The method 2600 may be performed by an electronic device, such as the second device 202, the wearable device 304, the wearable device 404, or the wearable device 504, as illustrative, non-limiting examples.

The method 2600 includes receiving, at one or more processors via wireless transmission, compressed audio data representing a sound field, at 2602. For example, in FIG. 2, the one or more processors 220 of the second device 202 receive the encoded audio data 229 representing the sound field 126. The encoded audio data 229 may be compressed and received as streaming data from a streaming device (e.g., the first device 102), and the streaming device may correspond to at least one of a portable electronic device or a server.

The method 2600 includes decompressing the compressed audio data, at 2604. For example, the decoder 228 of FIG. 2 may decompress the encoded audio data 229 to generate the audio data 227 (e.g., decompressed audio data). In some examples, the decompressed audio data (e.g., the audio data 227) includes ambisonics data.

The method 2600 includes adjusting the decompressed audio data to alter the sound field based on data associated with at least one of a translation or an orientation associated with movement of a device, at 2606. For example, the sound field adjuster 224 of FIG. 2 adjusts the sound field 226 based on the sensor data 246.

The method 2600 includes rendering the adjusted decompressed audio data into two or more loudspeaker gains to drive two or more loudspeakers, at 2608. For example, the renderer 222 of FIG. 2 renders the adjusted audio data 223 to generate the loudspeaker gains 219, 221.

The method 2600 includes outputting the adjusted decompressed audio data to the two or more loudspeakers for playback, at 2010. For example, the one or more processors 220 of FIG. 2 drive the loudspeakers 240, 242 with the pose-adjusted binaural audio signals 239, 241 based on the output the loudspeaker gains 219, 221.

In some implementations, the method 2600 includes performing binauralization of the adjusted decompressed audio data to generate the two or more loudspeaker gains, such as using HRTFs or BRIRs with or without headphone compensation filters associated with the electronic device.

In some implementations, the method 2600 also includes sending translation data to the streaming device (e.g., the first device 102), such as the data 166 or the translation metadata 478. The translation data is associated with the movement of the device (e.g., the second device 202). Responsive to sending the translation data, compressed updated audio data (e.g., the encoded audio data 229) is received from the streaming device (e.g., the first device 102). The compressed updated audio data (e.g., the encoded audio data 229) represents the sound field (e.g., the sound field 126) translated based on the translation data (e.g., the data 166 or the translation metadata 478). The compressed updated audio data (e.g., the encoded audio data 229) is decompressed to generate updated audio data (e.g., the audio data 227), and the updated audio data is adjusted to rotate the sound field (e.g., the sound field 226) based on the orientation. In some implementations, a first latency associated with sending the translation data (e.g., the data 166 or the translation metadata 478) to the streaming device (e.g., the first device 102) and receiving the compressed updated audio data (e.g., the encoded audio data 229) from the streaming device is larger than a second latency associated with adjusting the updated audio data (e.g., the audio data 227) to rotate the sound field (e.g., the sound field 226) based on the orientation.

In some implementations, the updated audio data (e.g., the audio data 227) is adjusted to translate the sound field (e.g., the sound field 226) based on a change of the translation of the device (e.g., the second device 202), and adjusting the updated audio data based on the change of the translation is restricted to translating the sound field forward, backward, left, or right, such as a 3DOF+effect described with reference to FIGS. 3A-4B, FIG. 6, and FIG. 7. In other implementations, the sound field (e.g., the sound field 226) represented by the decompressed audio data (e.g., the audio data 227) is independent of the movement of the device (e.g., the second device 202), and altering the sound field includes translating the sound field responsive to the data (e.g., the sensor data 246) indicating a change of the translation and rotating the sound field responsive to the data (e.g., the sensor data 246) indicating a change of the orientation, such as described with reference to the 6DOF scene displacement described with reference to FIGS. 5A and 5B.

By adjusting the decompressed audio data (e.g., the audio data 227) to alter the sound field (e.g., the sound field 226) based on movement of the device (e.g., the second device 202), latency associated with transmitting head tracking data (e.g., the data 166 or the translation metadata 478) to a remote source device (e.g., a streaming source device) is reduced. As a result, a user experience is improved.

Figure 27:
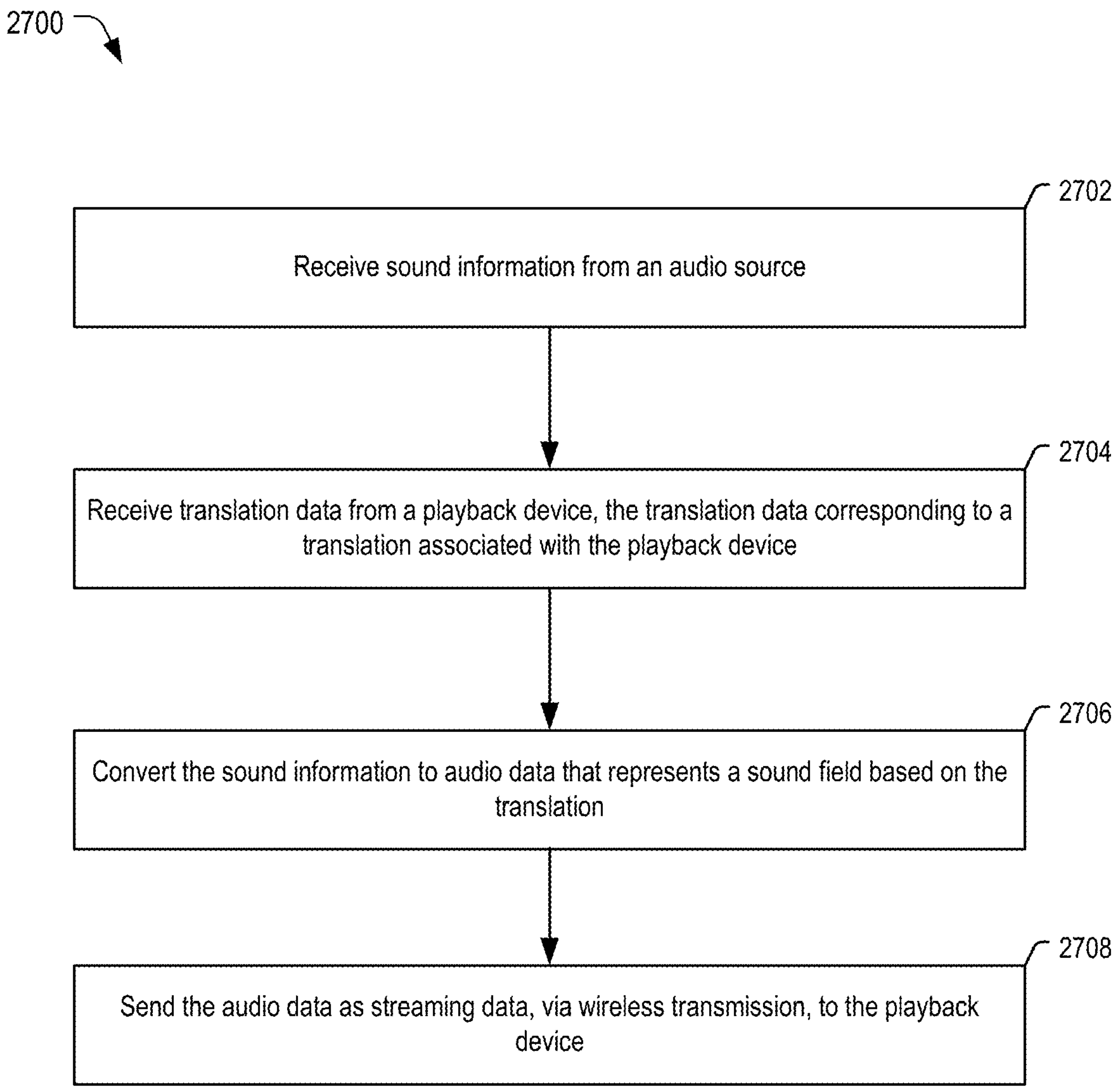
FIG. 27 illustrates a second example of a method for adjusting a sound field.

FIG. 27 illustrates a second example of a method for adjusting a sound field. The method 2700 may be performed by an electronic device, such as the first device 102, the streaming device 402, or the streaming device 602, as illustrative, non-limiting examples.

The method 2700 includes receiving sound information from an audio source, at 2702. For example, the sound information may correspond to the sound information 123, the streamed audio content 414, or the head-tracked audio portion 614.

The method 2700 includes receiving translation data from a playback device, the translation data corresponding to a translation associated with the playback device, at 2704. For example, the translation data may correspond to the data 166, the translation metadata 478, or the metadata 652.

The method 2700 includes converting the sound information to audio data that represents a sound field based on the translation, at 2706. For example, the sound field representation generator 124 of FIG. 2 converts the sound information 123 to the audio data 127 that represents the sound field 126 based on the translation indicated by the data 166.

The method 2700 includes sending the audio data as streaming data, via wireless transmission, to the playback device, at 2708. For example, the encoder 128 of FIG. 2 encodes the audio data 127 to generate the encoded audio data 129 and the transceiver 130 sends the encoded audio data 129 as the streaming data.

Converting the sound information (e.g., the sound information 123) to audio data (e.g., the audio data 127) that represents a sound field (e.g., the sound field 126) based on the translation (e.g., indicated by the data 166) and sending the audio data to the playback device (and not as binaural data) offloads more intensive translation computations from the playback device (e.g., the second device 202), enabling reduced power consumption and cost of the playback device, while enabling the playback device to perform less computation-intensive rotation processing and binauralization, reducing the delay experienced by a user for the sound field (e.g., the sound field 226) to a respond to a change of orientation and improving the user's experience.

Figure 28:
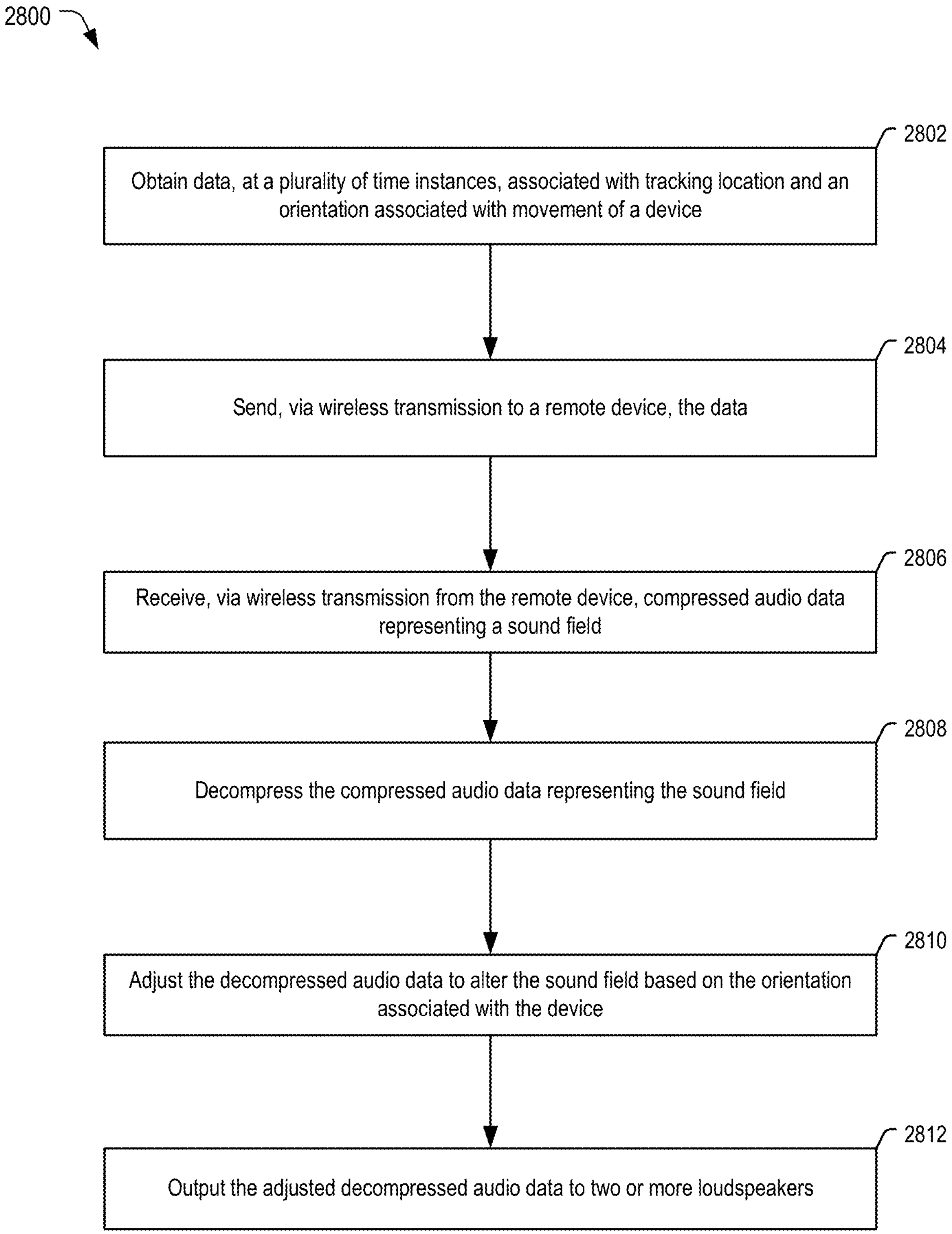
FIG. 28 illustrates a third example of a method for adjusting a sound field.

FIG. 28 illustrates a third example of a method 2800 for adjusting a sound field. The method 2800 may be performed by an electronic device, such as the second device 202 or the wearable device 604, as illustrative, non-limiting examples.

The method 2800 includes obtaining data, at a plurality of time instances, associated with tracking location and an orientation associated with movement of a device, at 2802. For example, the data may correspond to the data 166, the sensor data 246 the head-tracker data 648, the metadata 652, the time stamped user position data 656, the user position and time stamp data 766, or any combination thereof.

The method 2800 includes sending, via wireless transmission to a remote device, the data, at 2804. For example, the data may be sent to the first device 102, the streaming device 602, or to the wearable companion device 706.

The method 2800 includes receiving, via wireless transmission from the remote device, compressed audio data representing a sound field, at 2806. In an example, the compressed audio data includes ambisonics data. For example, the compressed audio data may correspond to the encoded audio data 229.

The method 2800 includes decompressing the compressed audio data representing the sound field, at 2808, and adjusting the decompressed audio data to alter the sound field based on the orientation associated with the device, at 2810. To illustrate, adjusting the decompressed audio data can be performed at the sound field adjuster 224 or at the ambisonics sound field 3DOF/3DOF+rotation and binauralization operation 364. In an example, adjusting the decompressed audio data is based on applying the data associated with tracking the location and the orientation associated with the movement of the device. In some implementations, the method 2800 also includes adjusting the decompressed audio data to translate the sound field based on a difference between a location of the device and a location associated with the sound field, where the adjusting of the decompressed audio data based on the difference is restricted to translation of the sound field forward, backward, left, or right, such as a 3DOF+effect.

The method 2800 includes outputting the adjusted decompressed audio data to two or more loudspeakers, at 2812.

In some implementations, the method 2800 includes receiving, via wireless transmission from the remote device, head-locked audio data, and combining the head-locked audio data with the adjusted decompressed audio data for output to the two or more loudspeakers, such as described with reference to the combiner 638. The adjusted decompressed audio data corresponds to pose-adjusted binaural audio (e.g., the pose-adjusted binaural audio data 636), and the head-locked audio data (e.g., the head-locked two-channel headphone audio stream 632) corresponds to pose-independent binaural audio.

In some implementations, the method 2800 includes receiving sound effect data ahead of time via wireless transmission and pre-buffering the sound effect data, such as the pre-buffered user interaction sound data 643. Responsive to an indication of user interaction with a virtual object associated with the sound effect data, a portion of the pre-buffered sound effect data corresponding to the virtual object is retrieved and combined (e.g., rendered as the user interaction sound 635) with the adjusted decompressed audio data (e.g., the pose-adjusted binaural audio data 636) for output to the two or more loudspeakers.

In some implementations, the method 2800 includes sending an indication of an ambisonic order to the remote device and, responsive to sending the indication, receiving updated audio data having the ambisonic order. For example, the indication of the ambisonic order can correspond to the request for a particular ambisonics order 654.

Figure 29:
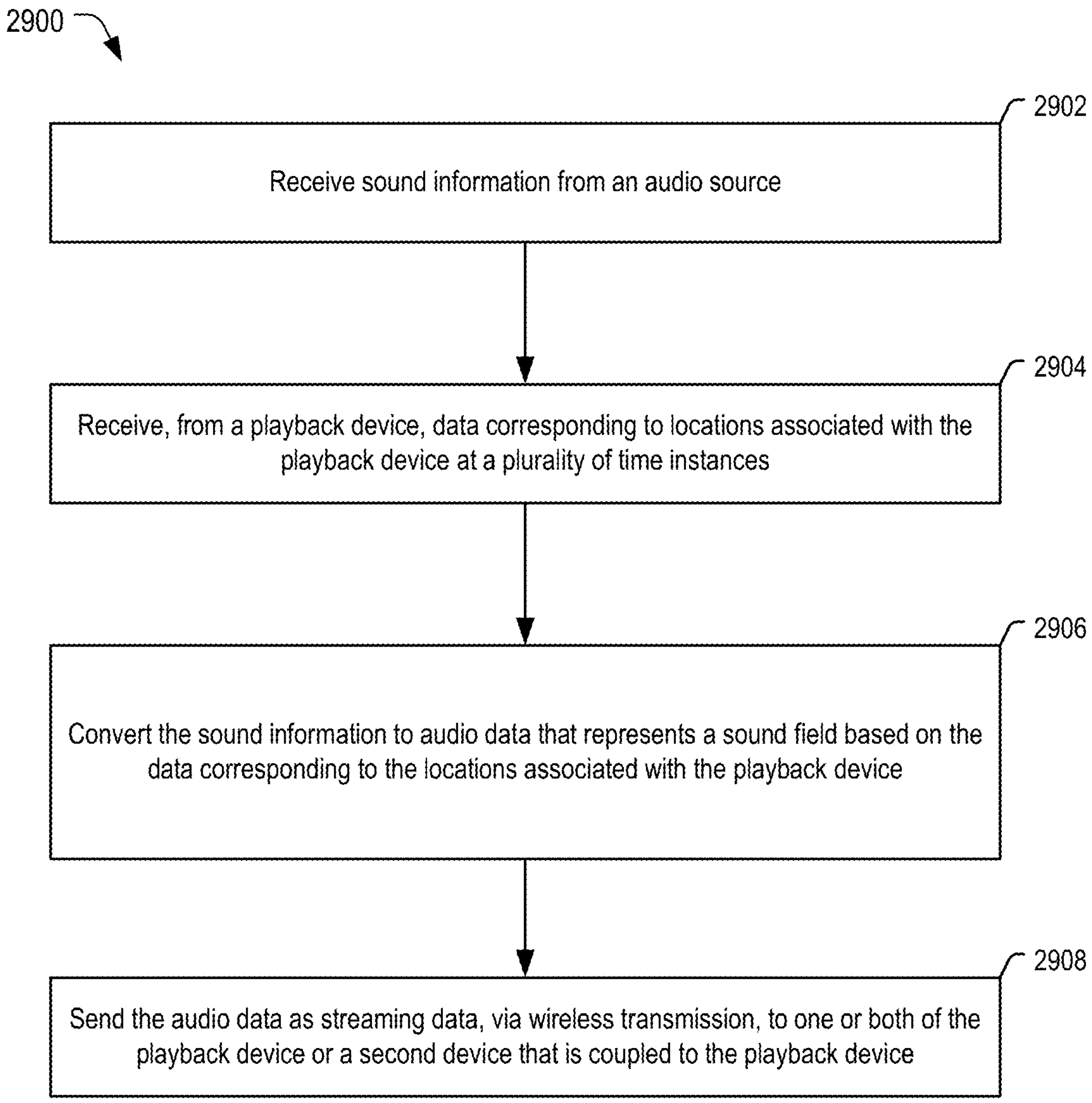
FIG. 29 illustrates a fourth example of a method for adjusting a sound field.

FIG. 29 illustrates a fourth example of a method for adjusting a sound field. The method 2900 may be performed by an electronic device, such as the first device 102, the streaming device 402, or the streaming device 602, as illustrative, non-limiting examples.

The method 2900 includes receiving sound information from an audio source, at 2902. For example, the audio source may correspond to the audio source 122 or the game audio engine 610.

The method 2900 includes receiving, from a playback device (e.g., the second device 202, the wearable device 404, or the wearable device 604), data corresponding to locations associated with the playback device at a plurality of time instances, at 2904. For example, the data may correspond to the data 166, the sensor data 246, the translation metadata 478, the head-tracker data 648, the metadata 652, the time stamped user position data 656, the user position and time stamp data 766, or any combination thereof.

The method 2900 includes converting the sound information to audio data that represents a sound field based on the data corresponding to the locations associated with the playback device, at 2906. For example, the sound information may be converted via the sound field representation generator 124, the rendering/conversion to ambisonics operation 416, or via rendering/conversion to HOA operation 616.

The method 2900 includes sending the audio data as streaming data, via wireless transmission, to one or both of the playback device (e.g., the second device 202, the wearable device 404, or the wearable device 604) or a second device (e.g., the wearable companion device 706) that is coupled to the playback device, at 2908.

Figure 30:
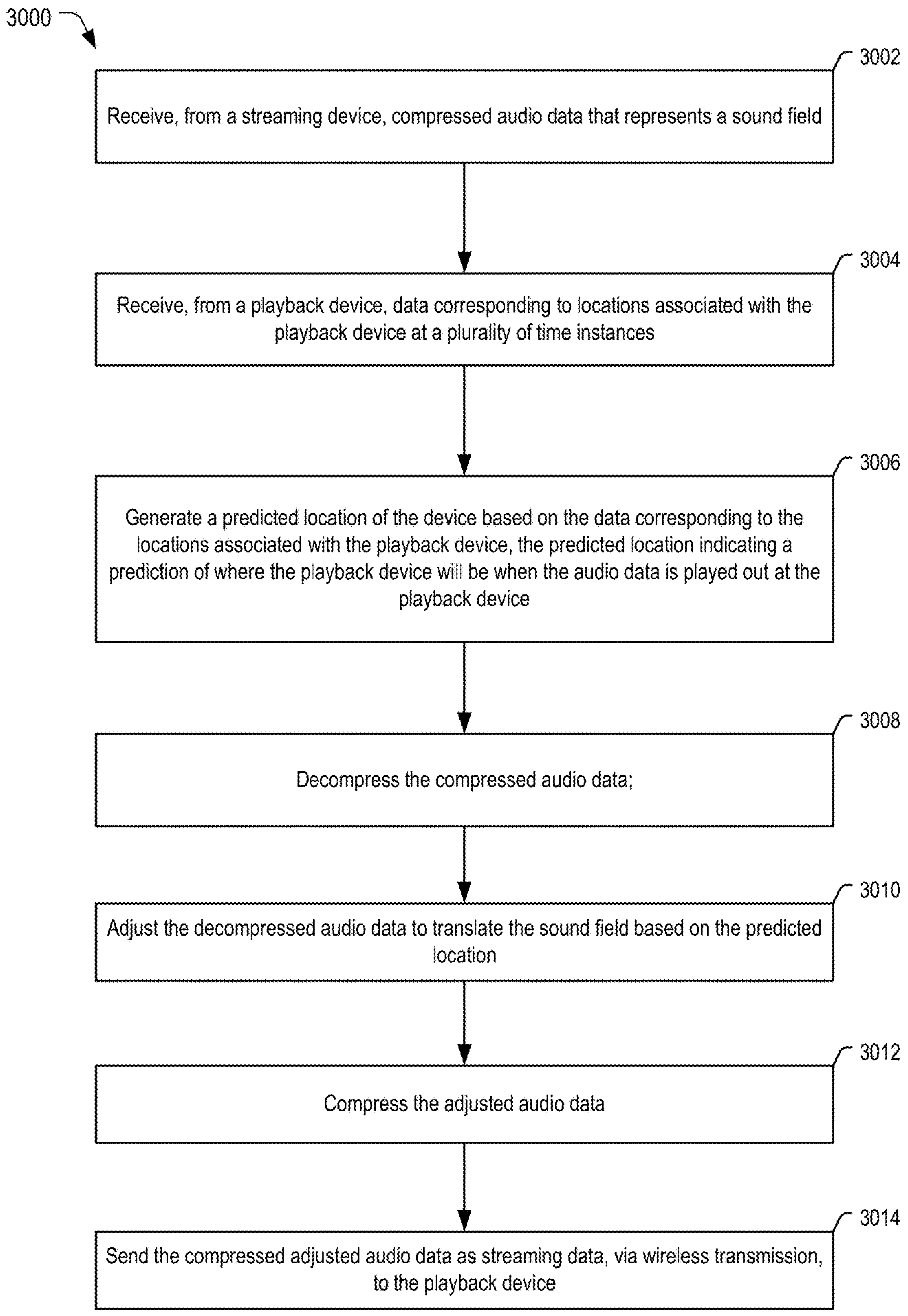
FIG. 30 illustrates a fifth example of a method for adjusting a sound field.

FIG. 30 illustrates a fifth example of a method 3000 for adjusting a sound field. The method 3000 may be performed by an electronic device, such as the wearable companion device 706.

The method 3000 includes receiving, from a streaming device, compressed audio data that represents a sound field, at 3002. For example, the compressed audio data may correspond to the encoded audio data 129 of FIG. 1 or a compressed version of the output ambisonics data 626 generated during an encoding portion of the audio coding operation 640.

The method 3000 includes receiving, from a playback device (e.g., the second device 202 or the wearable device 604), data corresponding to locations associated with the playback device at a plurality of time instances, at 3004. For example, the data may correspond to the user position and time stamp data 766.

The method 3000 may include generating a predicted location of the device based on the data corresponding to the locations associated with the playback device, at 3006. The predicted location indicates a prediction of where the playback device (e.g., the wearable device 604) will be when the audio data is played out at the playback device.

The method 3000 includes decompressing the compressed audio data, at 3008. For example, decompressing the audio data may be performed via a decoding portion of the audio coding operation 640.

The method 3000 includes adjusting the decompressed audio data to translate the sound field based on the predicted location, at 3010. For example, adjusting the decompressed audio data may be performed via the ambisonics sound field translation operation 768.

The method 3000 includes compressing the adjusted audio data (e.g., at an encoding portion of the audio coding operation 740), at 3012, and sending the compressed adjusted audio data as streaming data, via wireless transmission, to the playback device, at 3014. For example, the wearable companion device 706 generates compressed adjusted audio data by compressing the adjusted audio data 770 and sends the compressed adjusted audio data as streaming data, via the wireless transmission 750, to the wearable device 604.

Figure 31:
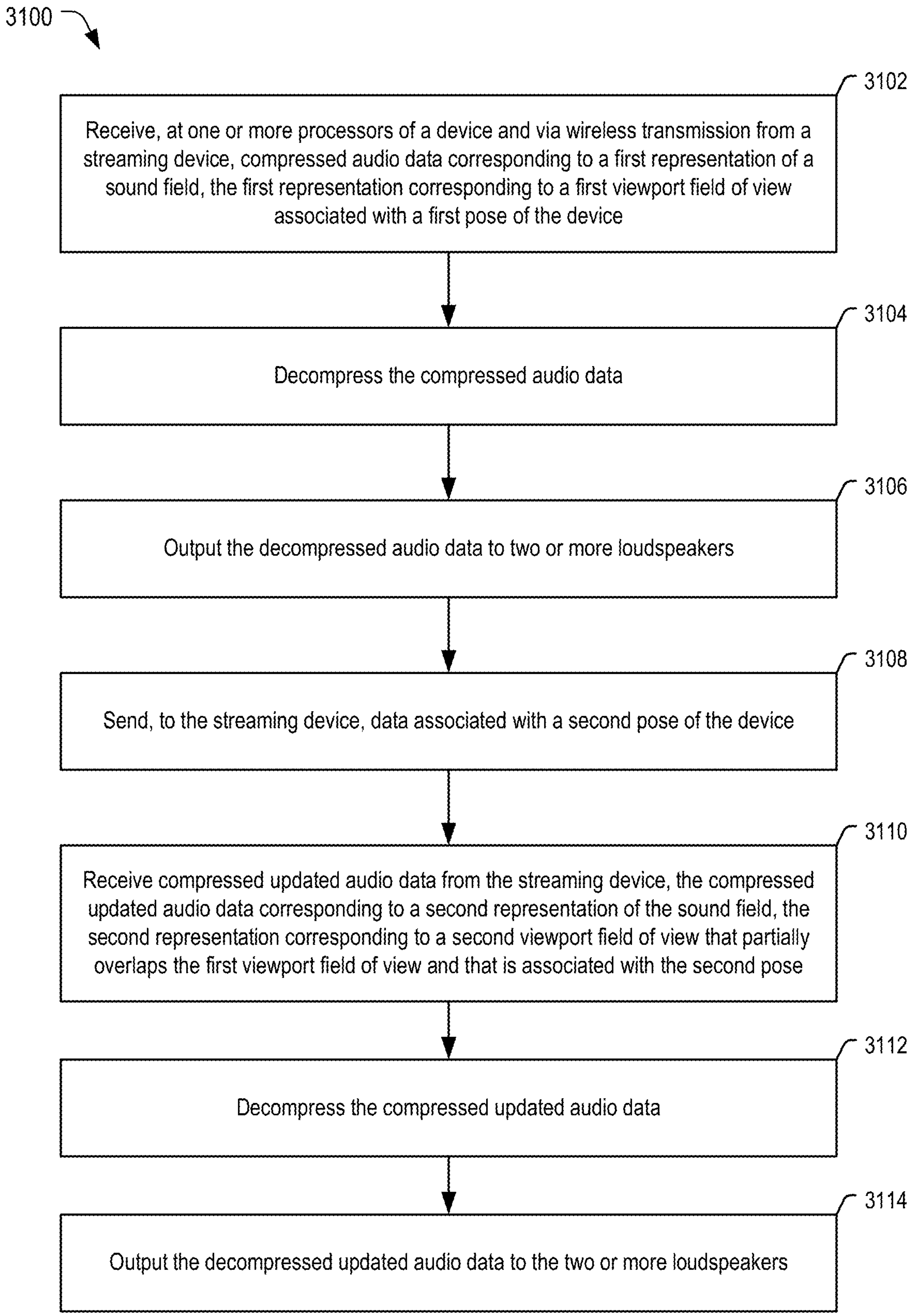
FIG. 31 illustrates a sixth example of a method for adjusting a sound field.

FIG. 31 illustrates a sixth example of a method for adjusting a sound field. The method 3100 may be performed by an electronic device, such as the second device 202 or the device 804, as illustrative, non-limiting examples.

The method 3100 includes receiving, at one or more processors of a device and via wireless transmission from a streaming device, compressed audio data corresponding to a first representation of a sound field, the first representation corresponding to a first viewport field of view associated with a first pose of the device, at 3102. For example, the device 804 may receive the audio stream 816 corresponding to the first ambisonics representation 822 which corresponds to the first viewport field of view 841 that is associated with a first pose of the device 804.

The method 3100 includes decompressing the compressed audio data, at 3104, and outputting the decompressed audio data to two or more loudspeakers, at 3106. For example, the audio decoder and binauralizer 808 may decompress a first portion of the audio stream 816 and output audio data to the speakers 834.

The method 3100 includes sending, to the streaming device, data associated with a second pose of the device, at 3108. For example, the device 804 sends the audio stream request 820 (e.g., indicating a second pose of the device 804) to the source device 802.

The method 3100 includes receiving compressed updated audio data from the streaming device, the compressed updated audio data corresponding to a second representation of the sound field, the second representation corresponding to a second viewport field of view that partially overlaps the first viewport field of view and that is associated with the second pose, at 3110. For example, the device 804 may receive a second portion of the audio stream 816 corresponding to the second ambisonics representation 824 which corresponds to the second viewport field of view 842 that is associated with the second pose of the device 804.

The method 3100 includes decompressing the compressed updated audio data, at 3112, and outputting the decompressed updated audio data to the two or more loudspeakers, at 3114. For example, the audio decoder and binauralizer 808 may decompress the second portion of the audio stream 816 and output the decompressed audio data to the speakers 834.

Figure 32:
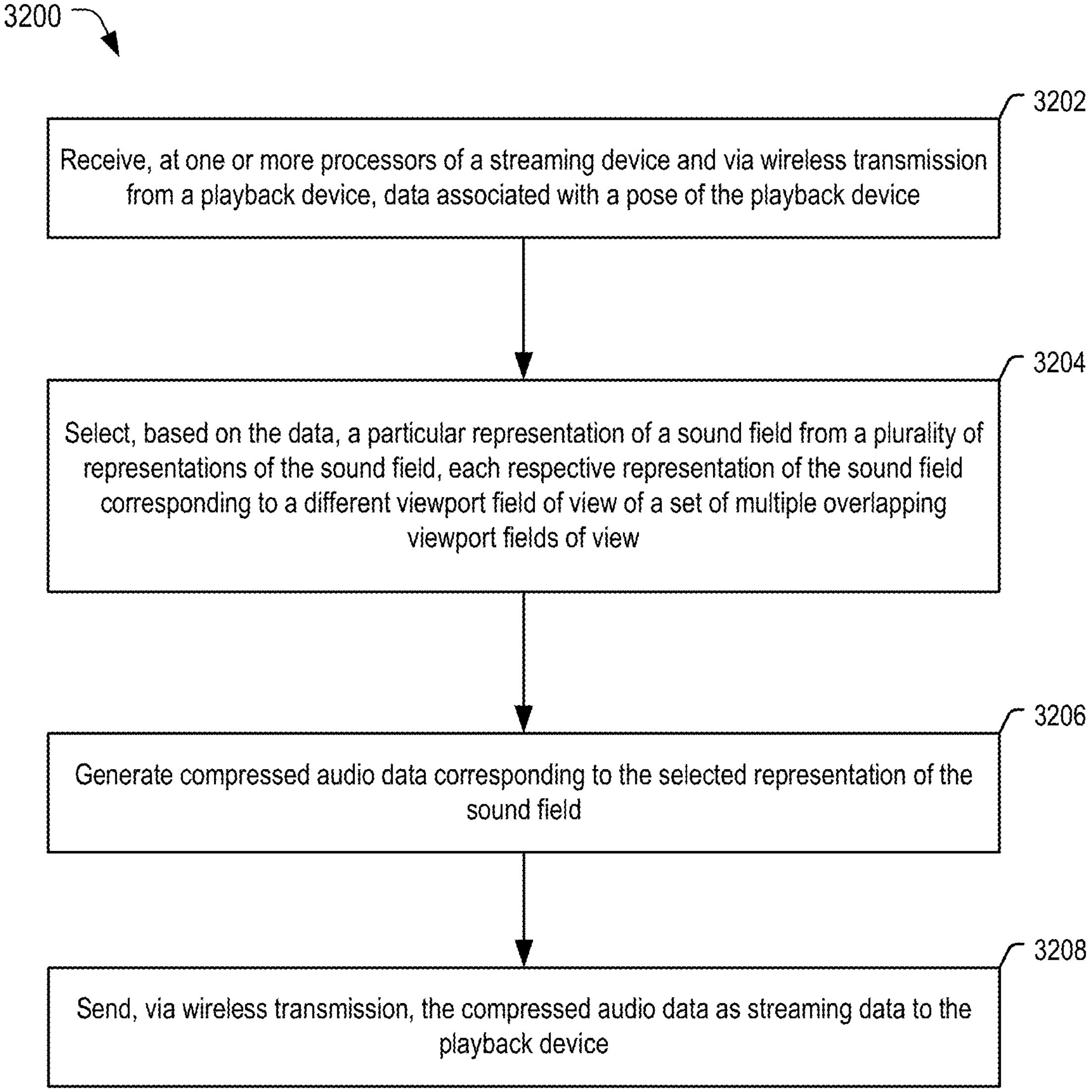
FIG. 32 illustrates a seventh example of a method for adjusting a sound field.

FIG. 32 illustrates a seventh example of a method for adjusting a sound field. The method 3200 may be performed by an electronic device, such as the first device 102 or the source device 802, as illustrative, non-limiting examples.

The method 3200 includes receiving, at one or more processors of a streaming device and via wireless transmission from a playback device, data associated with a pose of the playback device, at 3202. For example, the source device 802 receives the audio stream request 820.

The method 3200 includes selecting, based on the data, a particular representation of a sound field from a plurality of representations of the sound field, each respective representation of the sound field corresponding to a different viewport field of view of a set of multiple overlapping viewport fields of view, at 3204. For example, the source device 802 selects, based on the audio stream request 820 indicating a pose corresponding to the first viewport field of view 841, the first ambisonics representation 822 from the ambisonics representations 822-828 that correspond to overlapping viewport fields of view (e.g., VFOV 1-VFOV 8).

The method 3200 includes generating compressed audio data corresponding to the selected representation of the sound field, at 3206, and sending, via wireless transmission, the compressed audio data as streaming data to the playback device, at 3208. For example, the source device 802 sends the audio stream 816 corresponding to the first ambisonics representation 822 to the device 804.

Figure 33:
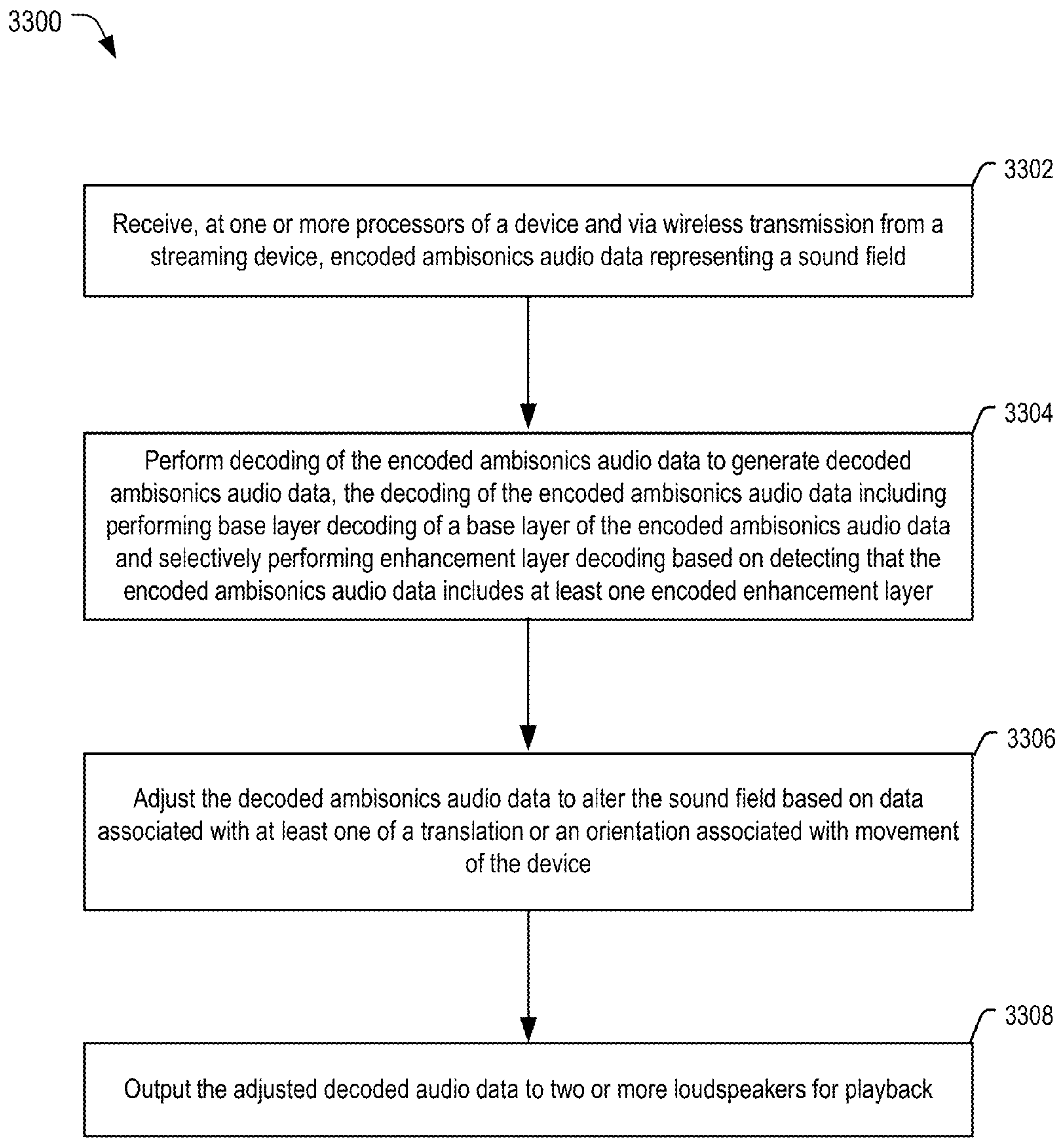
FIG. 33 illustrates an eighth example of a method for adjusting a sound field.

FIG. 33 illustrates an eighth example of a method for adjusting a sound field. The method 3300 may be performed by an electronic device, such as the second device 202 or the wearable device 1004, as illustrative, non-limiting examples.

The method 3300 includes receiving, at one or more processors of a device and via wireless transmission from a streaming device, encoded ambisonics audio data representing a sound field, at 3302. For example, the wearable device 1004 receives the encoded ambisonics audio data 1018 from the streaming device 1002.

The method 3300 includes performing decoding of the encoded ambisonics audio data to generate decoded ambisonics audio data, the decoding of the encoded ambisonics audio data including performing base layer decoding of a base layer of the encoded ambisonics audio data and selectively performing enhancement layer decoding based on detecting that the encoded ambisonics audio data includes at least one encoded enhancement layer, at 3304. For example, the wearable device 1004 preforms the ambisonics audio decoding operation 1020 using the base layer decoder 1040 for FOA frames and selectively using the first enhancement layer decoder 1042 when SOA frames are received.

The method 3300 includes adjusting the decoded ambisonics audio data to alter the sound field based on data associated with at least one of a translation or an orientation associated with movement of the device, at 3306, and outputting the adjusted decoded ambisonics audio data to two or more loudspeakers for playback, at 3308. For example, the wearable device 1004 performs the ambisonics sound field 3DOF/3DOF+rotation and binauralization and provides the pose-adjusted binaural audio signal 1026, 1028 to the loudspeakers 1030, 1032.

Figure 34:
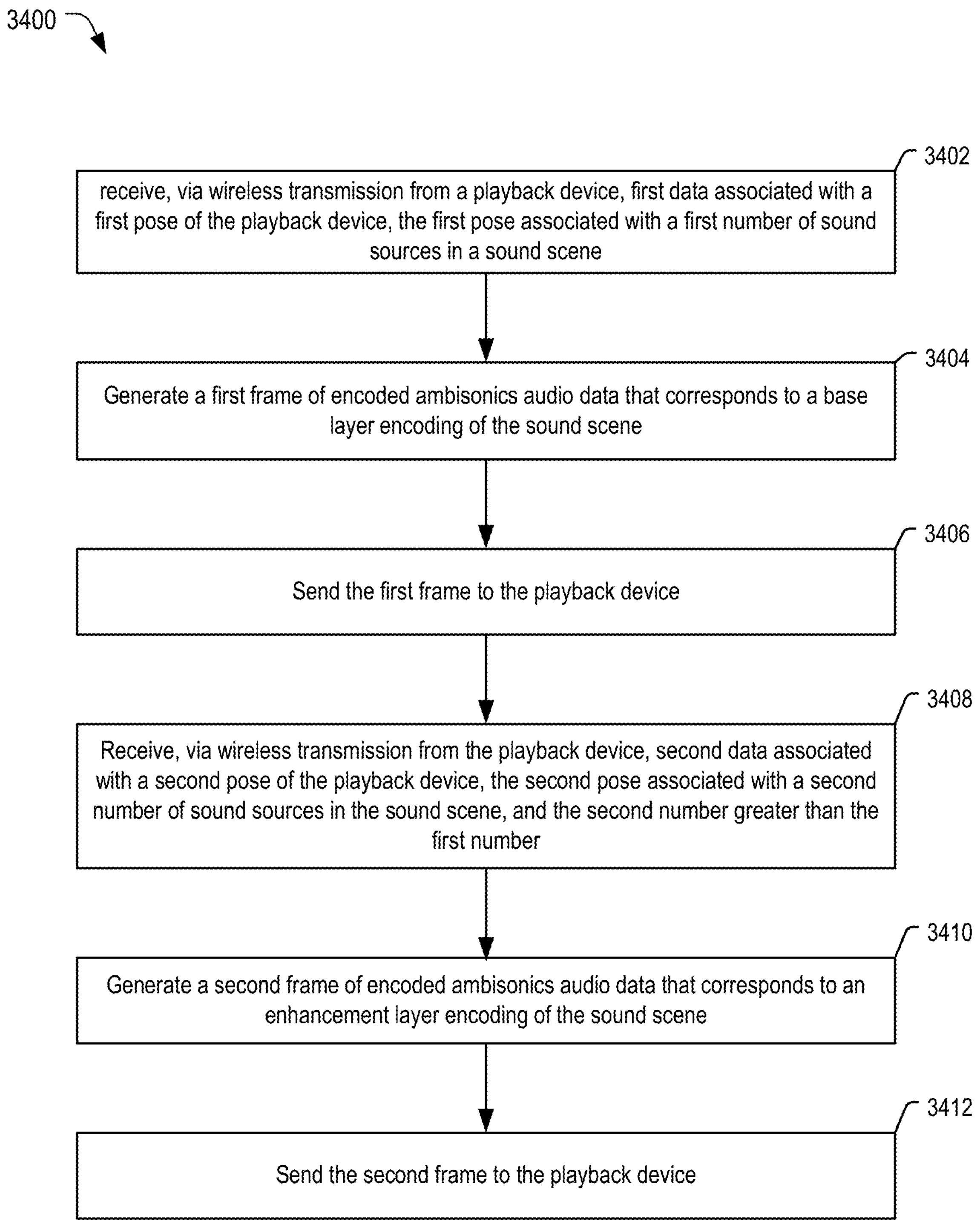
FIG. 34 illustrates a ninth example of a method for adjusting a sound field.

FIG. 34 illustrates a ninth example of a method for adjusting a sound field. The method 3400 may be performed by an electronic device, such as the first device 102 or the streaming device 1002, as illustrative, non-limiting examples.

The method 3400 includes receiving, via wireless transmission from a playback device, first data associated with a first pose of the playback device, the first pose associated with a first number of sound sources in a sound scene, at 3402. For example, the streaming device 1002 may receive at least a portion of the head-tracker data 1036.

The method 3400 includes generating a first frame of encoded ambisonics audio data that corresponds to a base layer encoding of the sound scene, at 3404, and sending the first frame to the playback device, at 3406. For example, the streaming device 1002 generates a frame corresponding to base level encoding, such as the first order ambisonics frame 1054, and transmits the frame to the wearable device 1004 via the wireless transmission 1006.

The method 3400 includes receiving, via wireless transmission from the playback device, second data associated with a second pose of the playback device, the second pose associated with a second number of sound sources in the sound scene, and the second number greater than the first number, at 3408. The method 3400 includes generating a second frame of encoded ambisonics audio data that corresponds to an enhancement layer encoding of the sound scene, at 3410, and sending the second frame to the playback device, at 3412. For example, the frames 1051-1054 can correspond to the wearable device 1004 on a user's head and oriented toward the first viewport field of view 841 of FIG. 8 having a relatively small number of sound sources. In response to the streaming device 1002 receiving data indicating the user's head movement changing the orientation of the wearable device 1004 to another viewport field of view (e.g., the second viewport field of view 842) that includes a greater number of audio sources than the first viewport field of view 841, the streaming device 1002 generates the subsequent frame 1055 that corresponds to an enhancement layer encoding for higher resolution to accommodate the larger number of sound sources.

Figure 35:
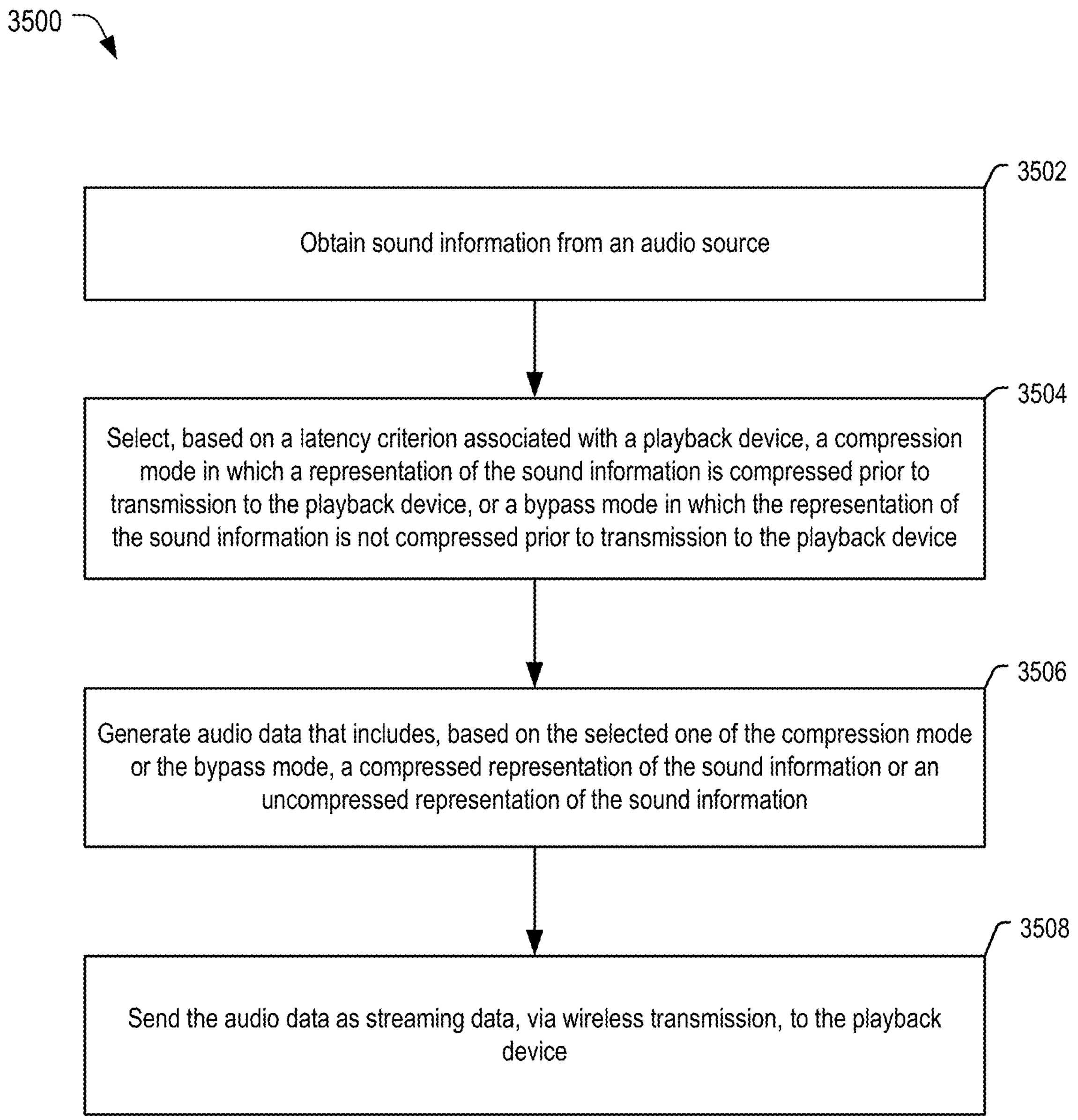
FIG. 35 illustrates a tenth example of a method for adjusting a sound field.

FIG. 35 is a flowchart illustrating a particular example of a method 3500 of processing audio data. According to a particular aspect, the method 3500 may be initiated, performed, or controlled by an electronic device, such as the first device 102 of FIG. 2, the streaming device 302 of FIG. 3B, the streaming device 402 of FIG. 4B, or the streaming device 502 of FIG. 5B, as illustrative, non-limiting examples.

The method 3500 includes, at 3502, obtaining sound information from an audio source. For example, the streaming device 302 receives the ambisonics data 312 from the audio source 310. According at a particular aspect, the sound information includes ambisonic data and corresponds to at least one of 2D audio data that represents a 2D sound field or 3D audio data that represents a 3D sound field.

The method 3500 also includes, at 3504, selecting, based on a latency criterion associated with a playback device, a compression mode in which a representation of the sound information is compressed prior to transmission to the playback device or a bypass mode in which the representation of the sound information is not compressed prior to transmission to the playback device. For example, the encoding operation 380 includes selection between the compression mode 330 and the bypass mode 329 based on the latency criterion 331.

In some implementations, the latency criterion is based on whether a playback latency associated with streaming data exceeds a latency threshold. In such implementations, the method 3500 may further include receiving, from the playback device, an indication that the playback latency associated with the streaming data exceeds the latency threshold and selecting the bypass mode based on receiving the indication. To illustrate, the streaming device 302 receives, from the playback device 304, an indication 333 that the playback latency associated with the streaming data exceeds the latency threshold 332, and the streaming device 302 selects the bypass mode 329 based on receiving the indication 333.

In a particular implementation, the latency criterion is based on a bandwidth of a wireless link to the playback device, such as described with reference to the latency criterion 331 that is at least partially based on a bandwidth of a wireless link associated with the wireless transmission 350 from the streaming device 302 to the playback device 304.

The method 3500 further includes, at 3506, generating audio data that includes, based on the selected one of the compression mode or the bypass mode, a compressed representation of the sound information or an uncompressed representation of the sound information. For example, the audio data 382 output from the encoding operation 380 can include compressed ambisonics coefficients from the compression encoding 324 or non-compressed ambisonics coefficients from the bypass operation 326.

In some implementations, in the bypass mode, generating the audio data includes discarding a high-resolution portion of the uncompressed representation based on a bandwidth of a wireless link to the playback device. In such implementations, for example, the uncompressed representation includes ambisonic coefficients, and the high-resolution portion of the uncompressed representation corresponds to a subset of the ambisonic coefficients, such as described with reference to the truncation operation 327.

The method 3500 also includes, at 3508, sending the audio data as streaming data, via wireless transmission, to the playback device.

In some implementations, the method 3500 includes determining whether a wireless link to the playback device corresponds to a higher-bandwidth wireless link (such as, for example, a 5G cellular digital network or a WiFi-type network) or to a lower-bandwidth wireless link (such as, for example, a Bluetooth network). In such implementations, the method 3500 may include selecting the bypass mode based on the wireless link corresponding to the higher-bandwidth wireless link. Alternatively, in such implementations, the method 3500 may include selecting the compression mode based on the wireless link corresponding to the lower-bandwidth wireless link.

In some implementations, the method 3500 includes receiving, from the playback device, a request for compressed audio data or for uncompressed audio data. In such implementations, the method 3500 may also include selecting the bypass mode or the compression mode based on the request.

In some implementations, the method 3500 further includes receiving translation data from the playback device. For example, the translation data may correspond to a translation associated with the playback device. In such implementations, the method 3500 may further include converting the sound information to audio data that represents a sound field based on the translation.

In some implementations, the method 3500 includes receiving, from the playback device, data corresponding to a location and an orientation associated with movement of the playback device. In such implementations, the method 3500 also includes updating the sound information to alter a sound field based on the received data. In some examples of such implementations, the method 3500 also includes sending, via wireless transmission, compressed audio data representing the sound field to the playback device. The compressed audio data representing the sound field may enable the playback device to decompress the compressed audio data representing the sound field, to adjust the decompressed audio data to alter the sound field based on the orientation associated with the device, and to output the adjusted decompressed audio data to two or more loudspeakers. In other examples of such implementation, the method 3500 includes sending, via wireless transmission, uncompressed audio data representing the sound field to the playback device. The uncompressed audio data may enable the playback device to adjust the audio data to alter the sound field based on the orientation associated with the device and to output the adjusted audio data to two or more loudspeakers.

Figure 36:
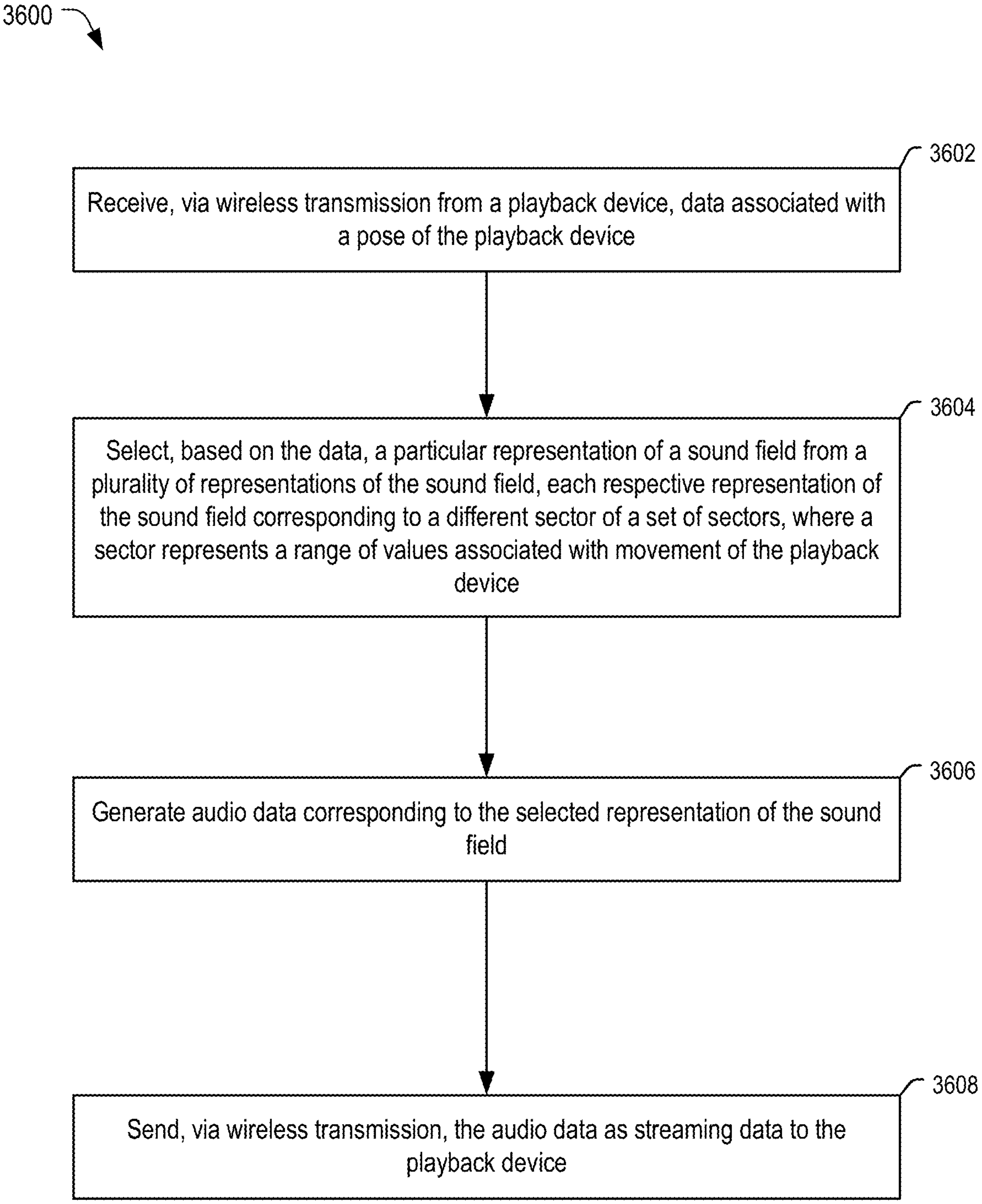
FIG. 36 illustrates an eleventh example of a method for adjusting a sound field.

FIG. 36 is a flowchart illustrating a particular example of a method 3600 of processing audio data. According to a particular aspect, the method 3600 may be initiated, performed, or controlled by an electronic device, such as the first device 102 of FIG. 2 or the source device 802 of FIG. 8B or FIG. 8C, as illustrative, non-limiting examples.

The method 3600 includes receiving, via wireless transmission from a playback device, data associated with a pose of the playback device, at 3602. For example, the source device 802 may receive the pose data 871 via the audio stream request 820.

The method 3600 also includes selecting, based on the data, a particular representation of a sound field from a plurality of representations of the sound field, at 3604. For example, the source device 802 selects one of the ambisonics representations 862-868 or one of the stereo representations 872-878 based on the pose data 871. Each respective representation of the sound field corresponds to a different sector of a set of sectors. A sector represents a range of values associated with movement of the playback device.

The method 3600 further includes generating audio data corresponding to the selected representation of the sound field, at 3606, and sending, via wireless transmission, the audio data as streaming data to the playback device, at 3008. For example, the source device 802 generates and sends the audio stream 816 based on the selected representation of the sound field.

Figure 37:
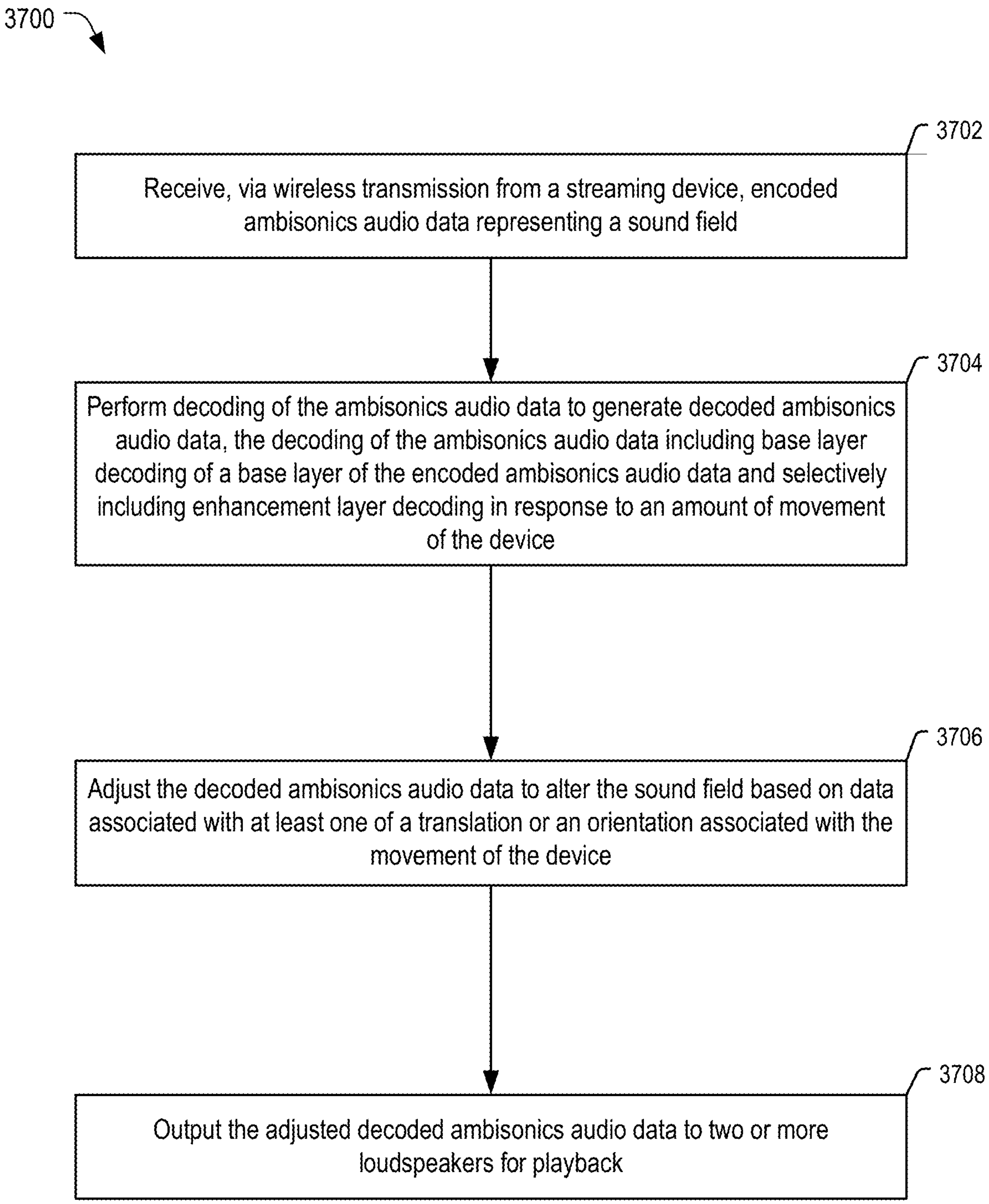
FIG. 37 illustrates a twelfth example of a method for adjusting a sound field.

FIG. 37 is a flowchart illustrating a particular example of a method 3700 of processing audio data. According to a particular aspect, the method 3700 may be initiated, performed, or controlled by an electronic device, such as the second device 202 of FIG. 2 or the wearable device 1004 of FIG. 10B, as illustrative, non-limiting examples.

The method 3700 includes receiving, via wireless transmission from a streaming device, encoded ambisonics audio data representing a sound field, at 3702. For example, the wearable device 1004 receives the encoded ambisonics audio data 1018 from the streaming device 1002.

The method 3700 also includes performing decoding of the ambisonics audio data to generate decoded ambisonics audio data, at 3704. For example, the wearable device 1004 performs the ambisonics audio decoding operation 1020 to generate the decode ambisonics audio data 1022. The decoding of the ambisonics audio data includes base layer decoding of a base layer of the encoded ambisonics audio data and selectively includes enhancement layer decoding in response to an amount of movement of the device. For example, the movement-based resolution selection 1070 generates the signals 1080-1086 to control the ambisonics audio decoding operation 1020 and operation of the base layer decoder 1040, the first enhancement layer decoder 1042, and the second enhancement layer decoder 1044 based on the amount of the movement 1072.

The method 3700 further includes adjusting the decoded ambisonics audio data to alter the sound field based on data associated with at least one of a translation or an orientation associated with the movement of the device, at 3706, and outputting the adjusted decoded ambisonics audio data to two or more loudspeakers for playback, at 3708. For example, the wearable device 1004 performs the ambisonics sound field 3DOF/DOF+rotation and binauralization operation 1024 to provide pose-adjusted binaural audio signals 1026, 1028 to loudspeakers 1030, 1032 based on head-tracker data 1036 from one or more sensors 1034.

Figure 38:
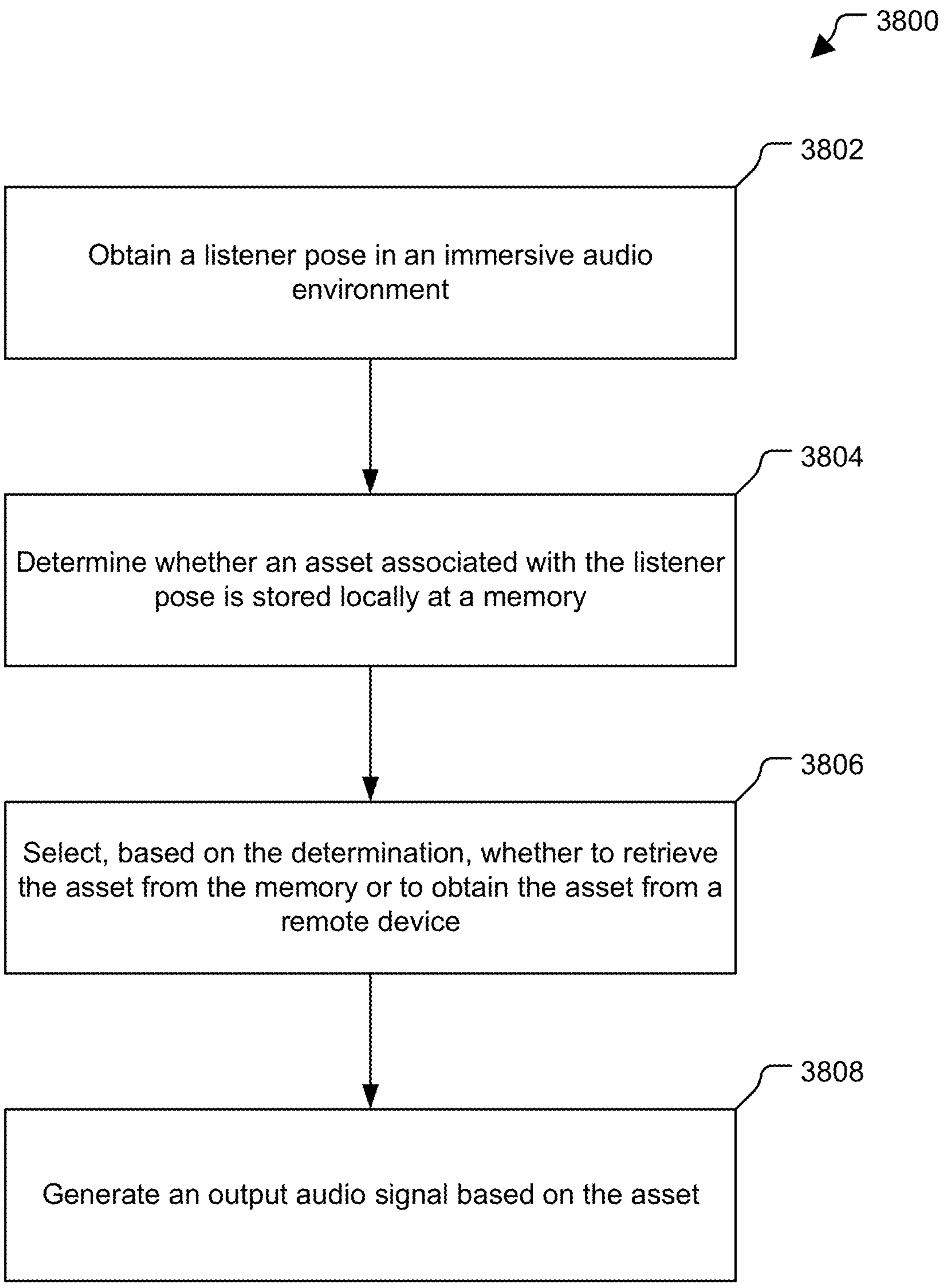
FIG. 38 illustrates another example of a method for adjusting a sound field.

FIG. 38 depicts an example of a method 3800 that may be performed by an audio playback device, such as the immersive audio player 1402 of FIG. 14. In a particular example, the method 3800 may be performed by the one or more processors 1460 of FIG. 14.

The method 3800 includes, at 3802, obtaining a listener pose in an immersive audio environment. For example, the audio asset selector 1424 of the immersive audio renderer 1422 of FIG. 14 obtains the listener pose 1452 from the pose selector 1450. To illustrate, the listener pose 1452 can be obtained via processing the pose data 1410 that received from the pose sensor 1408, or the listener pose 1452 can be received as a parameter of the position seek 1444, such as described with reference to the operation 1516 of FIG. 15. In some examples, the listener pose indicates a position of a listener in the immersive audio environment. In some examples, the listener pose indicates a position of a listener and an orientation of the listener in the immersive audio environment.

The method 3800 includes, at 3804, determining whether an asset associated with the listener pose is stored locally at a memory. According to some aspects, the asset corresponds to one or more audio streams associated with the immersive audio environment. In an example, the asset location selector 1430 of FIG. 14 determines whether or not the asset indicated by the asset retrieval request 1438 is stored locally at the memory 1470, such as one of pre-fetched assets 1426.

The method 3800 includes, at 3806, selecting, based on the determination, whether to retrieve the asset from the memory or to obtain the asset from a remote device. For example, the asset location selector 1430 of FIG. 14 can select to retrieve the asset 1490 from the memory 1470 when the asset 1490 determined to be stored in the memory 1470, or to retrieve the asset 1490 from the remote device 1412 when the asset 1490 is determined to not be stored in the memory 1470.

In an illustrative example, the method 3800 can include, based on a determination that the asset is not stored locally at the memory, selecting to obtain the asset from the remote device, such as the remote device 1412 of FIG. 14; initiating retrieval of the asset from the remote device, such as via the audio stream request 1436; and decoding the asset at an audio stream decoder, such as the decoder 1421. The output audio signal may be generated at a renderer, as described in further detail below. In another illustrative example, the method 3800 includes, based on a determination that the asset is stored locally at the memory, selectively decoding the asset at an audio stream decoder based on a determination of whether the asset has been decoded, such as described with reference to operations 1510 and 1514 of FIG. 15; performing a seek operation to determine a playout start point of the asset, such as described with reference to the seek operation 1516, and generating the output audio signal at the renderer based on the playout start point.

To illustrate, the method 3800 may optionally include performing a seek operation (e.g., the position seek 1444 and/or the seek operation 1516) to determine a playout start point of one or more audio streams. The seek operation may correspond to a temporal seek operation that determines the playout start point based on at least one of a timestamp or an audio frame identifier (e.g., the timestamp 1530 and/or the audio frame identifier 1532 of the seek operation 1516). Alternatively, or in addition, the seek operation may correspond to a position seek operation that determines the playout start point based on the listener pose, and the listener pose is received as a parameter of the seek operation (e.g., the listener pose 1452 of the seek operation 1516).

The method 3800 includes, at 3808, generating, at the one or more processors, an output audio signal based on the asset, such as the output audio signal 1480 of FIG. 14. In some implementations, the output audio signal includes an output binaural signal, and generating the output audio signal includes binauralizing an output of the rendering operation, such as described with reference to the immersive audio renderer 1422 and the binauralizer 1428 of FIG. 14. Alternatively, the asset can correspond to a pre-rendered representation of an audio scene, and generating the output audio signal includes binauralizing the asset. For example, the method 3800 may optionally include selecting the asset as one of a pre-rendered asset or a non-rendered asset based on whether the pre-rendered asset is available, such as described with reference to FIGS. 16-19.

By selecting to retrieve the requested asset from local memory when available, the method 3800 reduces latency associated with retrieving the requested asset from the remote device. Such reduction in latency results in higher spatial accuracy and reduced lag in the adaptation of the immersive sound field responsive to changes in the listener's pose, enhancing the listener's experience. In addition, use of the seek operation to select a start point for decoding further reduces latency in updating the immersive sound field responsive to changes in the listener's pose as compared to decoding the entire asset. Such reductions in latency associated with updating the immersive sound field responsive to changes in the listener's pose can reduce or eliminate user-perceivable artifacts, interruption, or delay associated with updating the immersive audio environment and enhance the listener's immersive audio experience.

Figure 39:
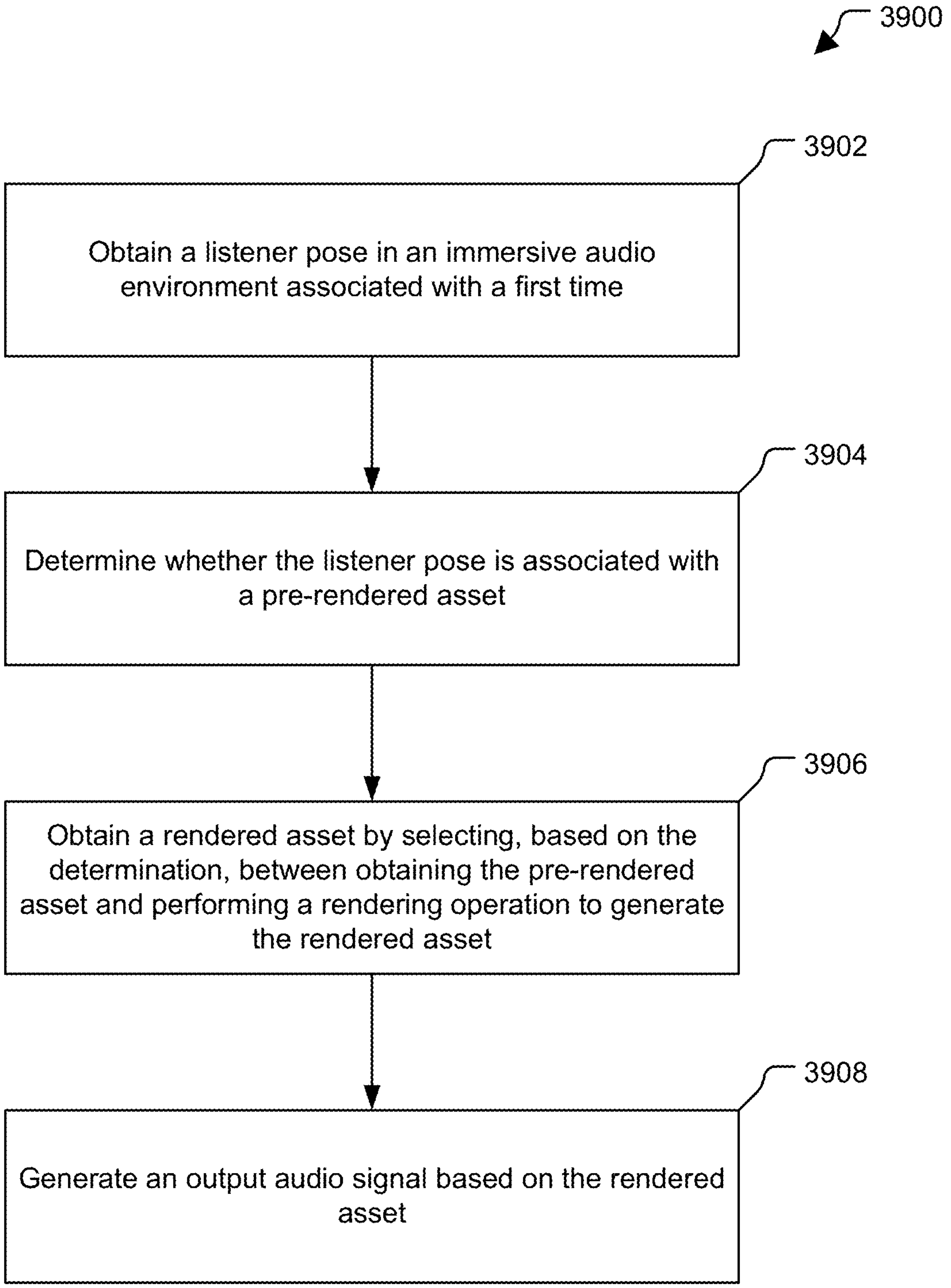
FIG. 39 illustrates another example of a method for adjusting a sound field.

FIG. 39 depicts an example of a method 3900 that may be performed by an audio playback device, such as the immersive audio player 1702 of FIG. 17. In a particular example, the method 3900 may be performed by the one or more processors 1752 of FIG. 17.

The method 3900 includes, at 3902, obtaining a listener pose in an immersive audio environment associated with a first time. To illustrate, the immersive audio renderer 1722 of FIG. 17 can obtain the listener pose 1762. For example, the immersive audio renderer 1722 can receive the listener pose as a parameter (e.g., the seek parameter 1744) of a seek operation. In another example, the immersive audio renderer 1722 can receive pose data from a pose sensor. In this example, the pose data can indicate the listener pose. Alternatively, in this example, the pose data can be used to predict the listener pose. To illustrate, the pose data can be associated with a listener pose a second time that is prior to the first time and obtaining the listener pose can include predicting the listener pose associated with the first time based on the pose data associated with the second time. The listener pose can indicate a position of a listener in the immersive audio environment or a position and an orientation of the listener in the immersive audio environment.

The method 3900 includes, at 3904, determining whether the listener pose is associated with a pre-rendered asset. For example, the audio asset selector 1724 can determine whether the listener pose 1762 is associated with a pre-rendered asset (e.g., based on the manifest of streams 1734 or a listing of pre-rendered assets). In some implementations, determining whether the listener pose is associated with a pre-rendered asset includes determining whether a local storage device includes the pre-rendered asset. Additionally, or alternatively, determining whether the listener pose is associated with a pre-rendered asset includes determining whether the pre-rendered asset is available from a remote device.

The method 3900 includes, at 3906, obtaining a rendered asset by selecting, based on the determination, between obtaining the pre-rendered asset and performing a rendering operation to generate the rendered asset. That is, the rendered asset can include an asset that was previously rendered (e.g., a pre-rendered asset) or a non-rendered asset that is subjected to rendering operations. The method 3900 also includes, at 3908, generating an output audio signal based on the rendered asset. The output audio signal can include or correspond to an output binaural signal, which can include multiple output audio channels.

In a particular aspect, if a pre-rendered asset associated with the listener pose 1762 is available, the audio asset selector 1724 selects the pre-rendered asset as the asset 1790 to be processed. If a pre-rendered asset associated with the listener pose 1762 is not available, the audio asset selector 1724 selects a non-rendered asset as the asset 1790 to be processed.

For example, if a pre-rendered asset associated with the listener pose 1762 is available, the audio asset selector 1724 sends the asset retrieval request 1738 identifying the asset 1790 (which in this case is a pre-rendered asset). If the pre-rendered asset is among the pre-fetched assets 1726, the pre-rendered asset is obtained from the memory 1750 as a local asset 1740. In this case, the immersive audio renderer 1722 can forgo rendering operations because the asset 1790 is already a rendered asset. Accordingly, the immersive audio renderer 1722 can process the asset 1790 by performing binauralization operations based on the rendered asset 1790. In this example, generating the output audio signal includes binauralizing the pre-rendered asset.

Alternatively, if a pre-rendered asset associated with the listener pose 1762 is not available, the audio asset selector 1724 obtains a non-rendered asset. For example, the audio asset selector 1724 sends the asset retrieval request 1738 identifying the asset 1790 (which in this case is a non-rendered asset). The pre-fetch controller 1730 determines whether the non-rendered asset is stored locally (e.g., is among the pre-fetched assets 1726). Based on a determination that the non-rendered asset is stored locally, the pre-fetch controller 1730 retrieves the non-rendered asset from local storage (e.g., the memory 1750) and provides the non-rendered asset to the immersive audio renderer 1722 as a local asset 1740. Based on a determination that the non-rendered asset is not stored locally, the presentation engine streaming client 1720 can retrieve the non-rendered asset from remote storage (e.g., the server 1712) and provide the non-rendered asset to the immersive audio renderer 1722 as a remote asset 1742.

When the method 3900 includes obtaining a non-rendered asset, the non-rendered asset can be subjected to rendering operations based on the listener pose. For example, the method 3900 can include determining sound field characteristics associated with a location of a listener in the immersive audio environment. To illustrate, the operations described with reference to the renderer 1920 can be performed to determine the sound field characteristics (e.g., the source orientation information $o_i$, the listener orientation information $O_L(j)$, the interpolated audio signal $\hat{S}(j, k, b)$, interpolated orientation, and the energy parameters). In this example, the method 3900 can also include applying head-related transfer functions to the sound field characteristics, where the head-related transfer functions are based on an orientation of the listener in the immersive audio environment.

In implementations in which an asset to be processed (e.g., the asset 1790 of FIG. 17) is encoded or compressed, the method 3900 can also include decoding or decompressing the asset 1790. In such implementations, the method 3900 can also include performing a seek operation to determine a playout start point for the rendered asset.

Referring to FIG. 40, a block diagram of a particular illustrative implementation of a device is depicted and generally designated 4000. In various implementations, the device 4000 may have more or fewer components than illustrated in FIG. 40. In an illustrative implementation, the device 4000 may correspond to the first device 102 or the second device 202. In an illustrative implementation, the device 4000 may perform one or more operations described with reference to FIGS. 2-39.

In a particular implementation, the device 4000 includes a processor 4006 (e.g., a central processing unit (CPU)). The device 4000 may include one or more additional processors 4010 (e.g., one or more DSPs). In a particular implementation, the processor 220 of FIG. 2 corresponds to the processor 4006, the processors 4010, or a combination thereof. For example, the processors 4010 may include a speech and music coder-decoder (CODEC) 4008, one or more of the immersive audio components 2122, or a combination thereof. In another particular implementation, the processor 120 of FIG. 2 corresponds to the processor 4006, the processors 4010, or a combination thereof. For example, the processors 4010 may include the speech and music coder-decoder (CODEC) 4008, the sound field representation generator 124, the encoder 128, or a combination thereof. The speech and music codec 4008 may include a voice coder ("vocoder") encoder 4036, a vocoder decoder 4038, or both.

The device 4000 may include a memory 4086 and a CODEC 4034. The memory 4086 may include instructions 4056, that are executable by the one or more additional processors 4010 (or the processor 4006) to implement the functionality described with reference to one or more of the immersive audio components 2122. In some implementations, the memory 4086 stores one or more pre-fetched assets, such as the pre-fetched assets 1426 or the pre-fetched assets 1726. The device 4000 may include a modem 4040 coupled, via a transceiver 4050, to an antenna 4052. The transceiver 4050 may correspond to the transceiver 230 of FIG. 2. In implementations in which the device 4000 corresponds to a sending device, the modem 4040 may be configured to modulate audio data for transmission to a playback device, and the antenna 4052 may be configured to transmit the modulated audio data to the playback device. In implementations in which the device 4000 corresponds to a playback device, the antenna 4052 may be configured to receive modulated transmission data that represents encoded audio data, and the modem 4040 may be configured to demodulate the received modulated transmission data to generate the encoded audio data.

The device 4000 may include a display 4028 coupled to a display controller 4026. Multiple speakers 4092 (e.g., the loudspeakers 240, 242) and one or more microphones, such as a microphone 4094, may be coupled to the CODEC 4034. The CODEC 4034 may include a digital-to-analog converter (DAC) 4002 and an analog-to-digital converter (ADC) 4004. In a particular implementation, the CODEC 4034 may receive analog signals from the microphone 4094, convert the analog signals to digital signals using the analog-to-digital converter 4004, and send the digital signals to the speech and music codec 4008. In a particular implementation, the speech and music codec 4008, the immersive audio components 2122, or both, may provide digital signals to the CODEC 4034. The CODEC 4034 may convert the digital signals to analog signals using the digital-to-analog converter 4002 and may provide the analog signals to the speakers 4092.

In a particular implementation, the device 4000 may be included in a system-in-package or system-on-chip device 4022. In a particular implementation, the memory 4086, the processor 4006, the processors 4010, the display controller 4026, the CODEC 4034, and the modem 4040 are included in a system-in-package or system-on-chip device 4022. In a particular implementation, an input device 4030 (e.g., the one or more sensors 244) and a power supply 4044 are coupled to the system-on-chip device 4022. Moreover, in a particular implementation, as illustrated in FIG. 40, the display 4028, the input device 4030, the speakers 4092, the microphone 4094, the antenna 4052, and the power supply 4044 are external to the system-on-chip device 4022. In a particular implementation, each of the display 4028, the input device 4030, the speakers 4092, the microphone 4094, the antenna 4052, and the power supply 4044 may be coupled to a component of the system-on-chip device 4022, such as an interface or a controller.

The device 4000 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described techniques, a first apparatus includes means for obtaining a listener pose in an immersive audio environment, such as the transceiver 230, the receiver 234, the one or more processors 220, the immersive audio player 1402, the pose selector 1450, the immersive audio renderer 1422, the one or more processors 1460, the modem 1454, the processor 4006, the processor 4010, the transceiver 4050, one or more other circuits or devices configured to obtain a listener pose in an immersive audio environment, or a combination thereof.

The first apparatus includes means for determining whether an asset associated with the listener pose is stored locally at a memory, such as the one or more processors 1460, the asset location selector 1430, the memory 1470, the processor 4006, the processor 4010, one or more other circuits or devices configured to determine whether an asset associated with the listener pose is stored locally at a memory, or a combination thereof.

The first apparatus includes means for selecting, based on the determination, whether to retrieve the asset from the memory or to obtain the asset from a remote device, such as the one or more processors 1460, the asset location selector 1430, the processor 4006, the processor 4010, one or more other circuits or devices configured to select, based on the determination, whether to retrieve the asset from the memory or to obtain the asset from a remote device, or a combination thereof.

The first apparatus includes means for generating an output audio signal based on the asset, such as the renderer 222, the one or more processors 220, the immersive audio renderer 1422, the binauralizer 1428, the one or more processors 1460, the immersive audio player 1402, the processor 4006, the processor 4010, one or more other circuits or devices configured to generate an output audio signal based on the asset, or a combination thereof.

In conjunction with the described techniques and implementations, a second apparatus includes means for obtaining a listener pose in an immersive audio environment associated with a first time. For example, the means for obtaining a listener pose can correspond to the transceiver 230, the receiver 234, the one or more processors 220, the immersive audio player 1402, the pose selector 1450, the immersive audio renderer 1422, the immersive audio player 1702, the immersive audio renderer 1722, the one or more processors 1460, the modem 1454, the one or more processors 1752, the modem 1754, the processor 4006, the processor 4010, the transceiver 4050, one or more other circuits or components configured to obtain a listener pose, or any combination thereof.

The second apparatus also includes means for determining whether the listener pose is associated with a pre-rendered asset. For example, the means for determining whether the listener pose is associated with a pre-rendered asset can correspond to the immersive audio player 1702, the presentation engine streaming client 1720, the immersive audio renderer 1722, the audio asset selector 1724, the memory 1750, the one or more processors 1752, the processor 4006, the processor 4010, one or more other circuits or components configured to determine whether the listener pose is associated with a pre-rendered asset, or any combination thereof.

The second apparatus also includes means for obtaining a rendered asset by selecting, based on the determination, between obtaining the pre-rendered asset and performing a rendering operation to generate the rendered asset. For example, the means for obtaining the rendered asset can correspond to the immersive audio player 1702, the presentation engine streaming client 1720, the immersive audio renderer 1722, the audio asset selector 1724, the memory 1750, the one or more processors 1752, the processor 4006, the processor 4010, one or more other circuits or components configured to obtain a rendered asset by selecting between obtaining a pre-rendered asset and performing a rendering operation to generate the rendered asset, or any combination thereof.

The second apparatus also includes means for generating an output audio signal based on the rendered asset. For example, the means for generating an output audio signal based on the rendered asset can correspond to the immersive audio renderer 1722, the binauralizer 1728, the one or more processors 1752, the immersive audio player 1702, the mixer and binauralizer 1914, the processor 4006, the processor 4010, one or more other circuits or components configured to generate an output audio signal based on the rendered asset, or any combination thereof.

In some implementations, a non-transitory computer-readable medium (e.g., a computer-readable storage device, such as the memory 110, the memory 210, the memory 762, the memory 830, the memory 930, the memory 1470, the memory 1750, or the memory 4086) includes instructions (e.g., the instructions 112, the instructions 212, the instructions 1756, or the instructions 4056) that, when executed by one or more processors (e.g., the one or more processors 120, the one or more processors 220, the one or more processors 832, the one or more processors 1460, the one or more processors 1752, the processor 4006, or the one or more processors 4010), cause the one or more processors to perform operations corresponding to at least a portion of any of the techniques described with reference to FIGS. 1-25 or FIG. 40, any of the methods of FIGS. 26-39, or any combination thereof.

Particular aspects of the disclosure are described below in the following sets of interrelated examples:

According to Example 1, a device includes a memory configured to store audio data associated with an immersive audio environment; one or more processors configured to obtain a listener pose in the immersive audio environment associated with a first time; determine whether the listener pose is associated with a pre-rendered asset; obtain a rendered asset by selecting, based on the determination, between obtaining the pre-rendered asset and performing a rendering operation to generate the rendered asset; and generate an output audio signal based on the rendered asset.

Example 2 includes the device of Example 1, wherein, to determine whether the listener pose is associated with a pre-rendered asset, the one or more processors are configured to determine whether the memory includes the pre-rendered asset.

Example 3 includes the device of Example 1 or Example 2, wherein, to determine whether the listener pose is associated with a pre-rendered asset, the one or more processors are configured to determine whether the pre-rendered asset is available from a remote device.

Example 4 includes the device of any of Examples 1 to 3, wherein, to perform the rendering operation, the one or more processors are configured to obtain a non-rendered asset; and process the non-rendered asset based on the listener pose to generate the rendered asset.

Example 5 includes the device of Example 4, wherein, to obtain the non-rendered asset, the one or more processors are configured to determine whether the non-rendered asset is among the audio data stored at the memory; and retrieve the non-rendered asset from the memory based on a determination that the non-rendered asset is among the audio data stored at the memory.

Example 6 includes the device of Example 5, wherein the one or more processors are configured to retrieve the non-rendered asset from remote storage based on a determination that the non-rendered asset is not among the audio data stored at the memory.

Example 7 includes the device of Example 4, wherein, to process the non-rendered asset based on the listener pose, the one or more processors are configured to determine sound field characteristics associated with a location of a listener in the immersive audio environment; and apply head-related transfer functions to the sound field characteristics, wherein the head-related transfer functions are based on an orientation of the listener in the immersive audio environment.

Example 8 includes the device of any of Examples 1 to 7, wherein the pre-rendered asset is specific to a particular position of a listener in the immersive audio environment.

Example 9 includes the device of any of Examples 1 to 8, wherein the pre-rendered asset is specific to a particular position of a listener and a particular orientation of the listener in the immersive audio environment.

Example 10 includes the device of any of Examples 1 to 9, wherein the output audio signal includes an output binaural signal.

Example 11 includes the device of any of Examples 1 to 10, wherein the output audio signal includes multiple output audio channels.

Example 12 includes the device of any of Examples 1 to 11, wherein the listener pose indicates a position of a listener in the immersive audio environment.

Example 13 includes the device of any of Examples 1 to 12, wherein the listener pose indicates a position of a listener and an orientation of the listener in the immersive audio environment.

Example 14 includes the device of any of Examples 1 to 13, wherein the listener pose is received as a parameter of a seek operation.

Example 15 includes the device of any of Examples 1 to 13, wherein, to obtain the listener pose, the one or more processors are configured to receive pose data from a pose sensor.

Example 16 includes the device of Example 15, wherein the pose data is associated with a second time prior to the first time, and to obtain the listener pose, the one or more processors are configured to predict the listener pose associated with the first time based on the pose data associated with the second time.

Example 17 includes the device of any of Examples 1 to 16, wherein the one or more processors are configured to perform a seek operation to determine a playout start point for the rendered asset.

Example 18 includes the device of any of Examples 1 to 17, wherein, to generate the output audio signal when the pre-rendered asset is obtained, the one or more processors are configured to binauralize the pre-rendered asset.

Example 19 includes the device of any of Examples 1 to 18 and further includes a modem coupled to the one or more processors, wherein the modem is configured to facilitate communication with a remote device to receive at least a portion of the audio data.

According to Example 20, a method includes obtaining a listener pose in an immersive audio environment associated with a first time; determining whether the listener pose is associated with a pre-rendered asset; obtaining a rendered asset by selecting, based on the determination, between obtaining the pre-rendered asset and performing a rendering operation to generate the rendered asset; and generating an output audio signal based on the rendered asset.

Example 21 includes the method of Example 20, wherein determining whether the listener pose is associated with a pre-rendered asset includes determining whether a local storage device includes the pre-rendered asset.

Example 22 includes the method of Example 20 or Example 21, wherein determining whether the listener pose is associated with a pre-rendered asset includes determining whether the pre-rendered asset is available from a remote device.

Example 23 includes the method of any of Examples 20 to 22, wherein performing the rendering operation comprises: obtaining a non-rendered asset; and processing the non-rendered asset based on the listener pose to generate the rendered asset.

Example 24 includes the method of Example 23, wherein obtaining the non-rendered asset comprises: determining whether the non-rendered asset is stored locally; and retrieving the non-rendered asset from local storage based on determining that the non-rendered asset is stored locally.

Example 25 includes the method of Example 24 and further includes retrieving the non-rendered asset from remote storage based on determining that the non-rendered asset is not stored locally.

Example 26 includes the method of Example 23, wherein processing the non-rendered asset based on the listener pose includes: determining sound field characteristics associated with a location of a listener in the immersive audio environment; and applying head-related transfer functions to the sound field characteristics, wherein the head-related transfer functions are based on an orientation of the listener in the immersive audio environment.

Example 27 includes the method of any of Examples 20 to 26, wherein the pre-rendered asset is specific to a particular position of a listener in the immersive audio environment.

Example 28 includes the method of any of Examples 20 to 27, wherein the pre-rendered asset is specific to a particular position of a listener and a particular orientation of the listener in the immersive audio environment.

Example 29 includes the method of any of Examples 20 to 28, wherein the output audio signal includes an output binaural signal.

Example 30 includes the method of any of Examples 20 to 29, wherein the output audio signal includes multiple output audio channels.

Example 31 includes the method of any of Examples 20 to 30, wherein the listener pose indicates a position of a listener in the immersive audio environment.

Example 32 includes the method of any of Examples 20 to 31, wherein the listener pose indicates a position of a listener and an orientation of the listener in the immersive audio environment.

Example 33 includes the method of any of Examples 20 to 32, wherein the listener pose is received as a parameter of a seek operation.

Example 34 includes the method of any of Examples 20 to 32, wherein obtaining the listener pose includes receiving pose data from a pose sensor.

Example 35 includes the method of Example 34, wherein the pose data is associated with a second time prior to the first time, and wherein obtaining the listener pose includes predicting the listener pose associated with the first time based on the pose data associated with the second time.

Example 36 includes the method of any of Examples 20 to 35 and further includes performing a seek operation to determine a playout start point for the rendered asset.

Example 37 includes the method of any of Examples 20 to 36, wherein, when the pre-rendered asset is obtained, generating the output audio signal includes binauralizing the pre-rendered asset.

According to Example 38, a computer-readable device storing instructions that are executable by one or more processors to cause the one or more processors to obtain a listener pose in an immersive audio environment associated with a first time; determine whether the listener pose is associated with a pre-rendered asset; obtain a rendered asset by selecting, based on the determination, between obtaining the pre-rendered asset and performing a rendering operation to generate the rendered asset; and generate an output audio signal based on the rendered asset.

Example 39 includes the computer-readable device of Example 38, wherein, to determine whether the listener pose is associated with a pre-rendered asset, the instructions cause the one or more processors to determine whether a local storage device includes the pre-rendered asset.

Example 40 includes the computer-readable device of Example 38 or Example 39, wherein, to determine whether the listener pose is associated with a pre-rendered asset, the instructions cause the one or more processors to determine whether the pre-rendered asset is available from a remote device.

Example 41 includes the computer-readable device of any of Examples 38 to 40, wherein, to perform the rendering operation, the instructions cause the one or more processors to obtain a non-rendered asset; and process the non-rendered asset based on the listener pose to generate the rendered asset.

Example 42 includes the computer-readable device of Example 41, wherein, to obtain the non-rendered asset, the instructions cause the one or more processors to determine whether the non-rendered asset is stored locally; and retrieve the non-rendered asset from local storage based on determining that the non-rendered asset is stored locally.

Example 43 includes the computer-readable device of Example 42, wherein the instructions further cause the one or more processors to retrieve the non-rendered asset from remote storage based on determining that the non-rendered asset is not stored locally.

Example 44 includes the computer-readable device of Example 41, wherein, to process the non-rendered asset based on the listener pose, the instructions cause the one or more processors to determine sound field characteristics associated with a location of a listener in the immersive audio environment; and apply head-related transfer functions, based on an orientation of the listener in the immersive audio environment, to the sound field characteristics.

Example 45 includes the computer-readable device of any of Examples 38 to 44, wherein the pre-rendered asset is specific to a particular position of a listener in the immersive audio environment.

Example 46 includes the computer-readable device of any of Examples 38 to 45, wherein the pre-rendered asset is specific to a particular position of a listener and a particular orientation of the listener in the immersive audio environment.

Example 47 includes the computer-readable device of any of Examples 38 to 46, wherein the output audio signal includes an output binaural signal.

Example 48 includes the computer-readable device of any of Examples 38 to 47, wherein the output audio signal includes multiple output audio channels.

Example 49 includes the computer-readable device of any of Examples 38 to 48, wherein the listener pose indicates a position of a listener in the immersive audio environment.

Example 50 includes the computer-readable device of any of Examples 38 to 49, wherein the listener pose indicates a position of a listener and an orientation of the listener in the immersive audio environment.

Example 51 includes the computer-readable device of any of Examples 38 to 50, wherein the listener pose is received as a parameter of a seek operation.

Example 52 includes the computer-readable device of any of Examples 38 to 50, wherein, to obtain the listener pose, the instructions cause the one or more processors to receive pose data from a pose sensor.

Example 53 includes the computer-readable device of Example 52, wherein the pose data is associated with a second time prior to the first time, and wherein, to obtain the listener pose, the instructions cause the one or more processors to predict the listener pose associated with the first time based on the pose data associated with the second time.

Example 54 includes the computer-readable device of any of Examples 38 to 53, wherein the instructions further cause the one or more processors to perform a seek operation to determine a playout start point for the rendered asset.

Example 55 includes the computer-readable device of any of Examples 38 to 54, wherein, when the pre-rendered asset is obtained, the instructions cause the one or more processors to binauralizing the pre-rendered asset to generate the output audio signal.

According to Example 56, an apparatus includes means for obtaining a listener pose in an immersive audio environment associated with a first time; means for determining whether the listener pose is associated with a pre-rendered asset; means for obtaining a rendered asset by selecting, based on the determination, between obtaining the pre-rendered asset and performing a rendering operation to generate the rendered asset; and means for generating an output audio signal based on the rendered asset.

Example 57 includes the apparatus of Example 56, wherein the means for determining whether the listener pose is associated with a pre-rendered asset is configured to determine whether a local storage device includes the pre-rendered asset.

Example 58 includes the apparatus of Example 56 or Example 57, wherein the means for determining whether the listener pose is associated with a pre-rendered asset is configured to determine whether the pre-rendered asset is available from a remote device.

Example 59 includes the apparatus of any of Examples 56 to 58 and further includes means for performing the rendering operation which includes: means for obtaining a non-rendered asset; and means for processing the non-rendered asset based on the listener pose to generate the rendered asset.

Example 60 includes the apparatus of Example 59, wherein the means for obtaining the non-rendered asset comprises: means for determining whether the non-rendered asset is stored locally; and means for retrieving the non-rendered asset from local storage based on determining that the non-rendered asset is stored locally.

Example 61 includes the apparatus of Example 60 and further includes means for retrieving the non-rendered asset from remote storage based on a determination that the non-rendered asset is not stored locally.

Example 62 includes the apparatus of Example 59, wherein the means for processing the non-rendered asset based on the listener pose includes: means for determining sound field characteristics associated with a location of a listener in the immersive audio environment; and means for applying head-related transfer functions, based on an orientation of the listener in the immersive audio environment, to the sound field characteristics.

Example 63 includes the apparatus of any of Examples 56 to 62, wherein the pre-rendered asset is specific to a particular position of a listener in the immersive audio environment.

Example 64 includes the apparatus of any of Examples 56 to 63, wherein the pre-rendered asset is specific to a particular position of a listener and a particular orientation of the listener in the immersive audio environment.

Example 65 includes the apparatus of any of Examples 56 to 64, wherein the output audio signal includes an output binaural signal.

Example 66 includes the apparatus of any of Examples 56 to 65, wherein the output audio signal includes multiple output audio channels.

Example 67 includes the apparatus of any of Examples 56 to 66, wherein the listener pose indicates a position of a listener in the immersive audio environment.

Example 68 includes the apparatus of any of Examples 56 to 67, wherein the listener pose indicates a position of a listener and an orientation of the listener in the immersive audio environment.

Example 69 includes the apparatus of any of Examples 56 to 68, wherein the means for obtaining the listener pose is configured to receive pose data from a pose sensor.

Example 70 includes the apparatus of any of Examples 56 to 68, wherein the means for obtaining the listener pose is configured to receive the listener pose as a parameter of a seek operation.

Example 71 includes the apparatus of Example 69, wherein the pose data is associated with a second time prior to the first time, and wherein the means for obtaining the listener pose includes means for predicting the listener pose associated with the first time based on the pose data associated with the second time.

Example 72 includes the apparatus of any of Examples 56 to 71 and further includes means for performing a seek operation to determine a playout start point for the rendered asset.

Example 73 includes the apparatus of any of Examples 56 to 72, wherein the means for generating the output audio signal includes means for binauralizing the pre-rendered asset.

According to Example 74, a device includes a memory configured to store audio data associated with an immersive audio environment; and one or more processors configured to: obtain a listener pose in the immersive audio environment; determine whether an asset associated with the listener pose is stored locally at the memory; based on the determination, select whether to retrieve the asset from the memory or to obtain the asset from a remote device; and generate an output audio signal based on the asset.

Example 75 includes the device of Example 74, wherein the asset corresponds to one or more audio streams associated with the immersive audio environment.

Example 76 includes the device of Example 74 or Example 75, wherein the one or more processors are configured to perform a seek operation to determine a playout start point of the one or more audio streams.

Example 77 includes the device of any of Examples 74 to 76, wherein the seek operation corresponds to a temporal seek operation that determines the playout start point based on at least one of a timestamp or an audio frame identifier.

Example 78 includes the device of any of Examples 74 to 77, wherein the output audio signal is based on the listener pose, and wherein the listener pose is based on pose data from a pose sensor.

Example 79 includes the device of any of Examples 74 to 78, wherein the seek operation corresponds to a position seek operation that determines the playout start point based on the listener pose, and wherein the listener pose is received as a parameter of the seek operation.

Example 80 includes the device of any of Examples 74 to 79, wherein the one or more processors are configured to perform a rendering operation on the asset during generation of the output audio signal.

Example 81 includes the device of any of Examples 74 to 80, wherein the output audio signal includes an output binaural signal, and wherein the one or more processors are further configured to binauralize an output of the rendering operation to generate the output binaural signal.

Example 82 includes the device of any of Examples 74 to 79, wherein the asset corresponds to a pre-rendered representation of an audio scene, and wherein generation of the output audio signal includes binauralizing the asset.

Example 83 includes the device of any of Examples 74 to 82, wherein the one or more processors are configured to, based on a determination that the asset is not stored locally at the memory: select to obtain the asset from the remote device; initiate retrieval of the asset from the remote device; decode the asset at an audio stream decoder; and generate the output audio signal at a renderer.

Example 84 includes the device of any of Examples 74 to 83, wherein the one or more processors are configured to, based on a determination that the asset is stored locally at the memory: selectively decode the asset at an audio stream decoder based on a determination of whether the asset has been decoded; perform a seek operation to determine a playout start point of the asset; and generate the output audio signal at a renderer based on the playout start point.

Example 85 includes the device of any of Examples 74 to 84, wherein the one or more processors are configured to select the asset as one of a pre-rendered asset or a non-rendered asset based on whether the pre-rendered asset is available.

Example 86 includes the device of any of Examples 74 to 85, wherein the listener pose indicates a position of a listener in the immersive audio environment.

Example 87 includes the device of any of Examples 74 to 86, wherein the listener pose indicates a position of a listener and an orientation of the listener in the immersive audio environment.

According to Example 88, a method includes obtaining, at one or more processors, a listener pose in an immersive audio environment; determining, at the one or more processors, whether an asset associated with the listener pose is stored locally at a memory; selecting, at the one or more processors and based on the determination, whether to retrieve the asset from the memory or to obtain the asset from a remote device; and generating, at the one or more processors, an output audio signal based on the asset.

Example 89 includes the method of Example 88, wherein the asset corresponds to one or more audio streams associated with the immersive audio environment.

Example 90 includes the method of Example 88 or Example 89, further comprising performing a seek operation to determine a playout start point of the one or more audio streams.

Example 91 includes the method of any of Examples 88 to 90, wherein the seek operation corresponds to a temporal seek operation that determines the playout start point based on at least one of a timestamp or an audio frame identifier.

Example 92 includes the method of any of Examples 88 to 91, wherein the output audio signal is based on the listener pose, and wherein the listener pose is based on pose data from a pose sensor.

Example 93 includes the method of any of Examples 88 to 90, wherein the seek operation corresponds to a position seek operation that determines the playout start point based on the listener pose, and wherein the listener pose is received as a parameter of the seek operation.

Example 94 includes the method of any of Examples 88 to 93, wherein generating the output audio signal includes performing a rendering operation.

Example 95 includes the method of any of Examples 88 to 94, wherein the output audio signal includes an output binaural signal, and wherein generating the output audio signal includes binauralizing an output of the rendering operation.

Example 96 includes the method of any of Examples 88 to 93, wherein the asset corresponds to a pre-rendered representation of an audio scene, and wherein generating the output audio signal includes binauralizing the asset.

Example 97 includes the method of any of Examples 88 to 96 and further includes, based on a determination that the asset is not stored locally at the memory: selecting to obtain the asset from the remote device; initiating retrieval of the asset from the remote device; decoding the asset at an audio stream decoder; and generating the output audio signal at a renderer.

Example 98 includes the method of any of Examples 88 to 97 and further includes, based on a determination that the asset is stored locally at the memory: selectively decoding the asset at an audio stream decoder based on a determination of whether the asset has been decoded; performing a seek operation to determine a playout start point of the asset; and generating the output audio signal at a renderer based on the playout start point.

Example 99 includes the method of any of Examples 88 to 98 and further includes selecting the asset as one of a pre-rendered asset or a non-rendered asset based on whether the pre-rendered asset is available.

Example 100 includes the method of any of Examples 88 to 99, wherein the listener pose indicates a position of a listener in the immersive audio environment.

Example 101 includes the method of any of Examples 88 to 100, wherein the listener pose indicates a position of a listener and an orientation of the listener in the immersive audio environment.

According to Example 102, a computer-readable device stores instructions that are executable by one or more processors to cause the one or more processors to obtain a listener pose in an immersive audio environment; determine whether an asset associated with the listener pose is stored locally at a memory; select, based on the determination, whether to retrieve the asset from the memory or to obtain the asset from a remote device; and generate an output audio signal based on the asset.

Example 103 includes the computer-readable device of Example 102, wherein the asset corresponds to one or more audio streams associated with the immersive audio environment.

Example 104 includes the computer-readable device of Example 102 or Example 103, wherein the instructions further cause the one or more processors to perform a seek operation to determine a playout start point of the one or more audio streams.

Example 105 includes the computer-readable device of any of Examples 102 to 104, wherein the seek operation corresponds to a temporal seek operation that determines the playout start point based on at least one of a timestamp or an audio frame identifier.

Example 106 includes the computer-readable device of any of Examples 102 to 105, wherein the output audio signal is based on the listener pose, and wherein the listener pose is based on pose data from a pose sensor.

Example 107 includes the computer-readable device of any of Examples 102 to 106, wherein the seek operation corresponds to a position seek operation that determines the playout start point based on the listener pose, and wherein the listener pose is received as a parameter of the seek operation.

Example 108 includes the computer-readable device of any of Examples 102 to 107, wherein generation of the output audio signal includes performance of a rendering operation.

Example 109 includes the computer-readable device of any of Examples 102 to 108, wherein the output audio signal includes an output binaural signal, and wherein generation of the output audio signal includes binauralization of an output of the rendering operation.

Example 110 includes the computer-readable device of any of Examples 102 to 107, wherein the asset corresponds to a pre-rendered representation of an audio scene, and wherein generation of the output audio signal includes binauralization of the asset.

Example 111 includes the computer-readable device of any of Examples 102 to 110, wherein the instructions further cause the one or more processors to, based on a determination that the asset is not stored locally at the memory: select to obtain the asset from the remote device; initiate retrieval of the asset from the remote device; decode the asset at an audio stream decoder; and generate the output audio signal at a renderer.

Example 112 includes the computer-readable device of any of Examples 102 to 111, wherein the instructions further cause the one or more processors to, based on a determination that the asset is stored locally at the memory: selectively decode the asset at an audio stream decoder based on a determination of whether the asset has been decoded; perform a seek operation to determine a playout start point of the asset; and generate the output audio signal at a renderer based on the playout start point.

Example 113 includes the computer-readable device of any of Examples 102 to 112, wherein the instructions further cause the one or more processors to select the asset as one of a pre-rendered asset or a non-rendered asset based on whether the pre-rendered asset is available.

Example 114 includes the computer-readable device of any of Examples 102 to 113, wherein the listener pose indicates a position of a listener in the immersive audio environment.

Example 115 includes the computer-readable device of any of Examples 102 to 114, wherein the listener pose indicates a position of a listener and an orientation of the listener in the immersive audio environment.

According to Example 116, an apparatus includes means for obtaining a listener pose in an immersive audio environment; means for determining whether an asset associated with the listener pose is stored locally at a memory; means for selecting, based on the determination, whether to retrieve the asset from the memory or to obtain the asset from a remote device; and means for generating an output audio signal based on the asset.

Example 117 includes the apparatus of Example 116, wherein the asset corresponds to one or more audio streams associated with the immersive audio environment.

Example 118 includes the apparatus of Example 116 or Example 117, and further includes means for performing a seek operation to determine a playout start point of the one or more audio streams.

Example 119 includes the apparatus of any of Examples 116 to 118, wherein the seek operation corresponds to a temporal seek operation that determines the playout start point based on at least one of a timestamp or an audio frame identifier.

Example 120 includes the apparatus of any of Examples 116 to 119, wherein the output audio signal is based on the listener pose, and wherein the listener pose is based on pose data from a pose sensor.

Example 121 includes the apparatus of any of Examples 116 to 120, wherein the seek operation corresponds to a position seek operation that determines the playout start point based on the listener pose, and wherein the listener pose is received as a parameter of the seek operation.

Example 122 includes the apparatus of any of Examples 116 to 121, wherein the means for generating the output audio signal includes means for performing a rendering operation.

Example 123 includes the apparatus of any of Examples 116 to 122, wherein the output audio signal includes an output binaural signal, and wherein the means for generating the output audio signal includes means for binauralizing an output of the rendering operation.

Example 124 includes the apparatus of any of Examples 116 to 121, wherein the asset corresponds to a pre-rendered representation of an audio scene, and wherein the means for generating the output audio signal includes means for binauralizing the asset.

Example 125 includes the apparatus of any of Examples 116 to 124, and further includes means for selecting to obtain the asset from the remote device based on a determination that the asset is not stored locally at the memory; means for initiating retrieval of the asset from the remote device; means for decoding the asset; and means for generating the output audio signal.

Example 126 includes the apparatus of any of Examples 116 to 125, and further includes means for selectively decoding the asset at an audio stream decoder based on a determination of whether the asset has been decoded; means for performing a seek operation to determine a playout start point of the asset; and means for generating the output audio signal based on the playout start point.

Example 127 includes the apparatus of any of Examples 116 to 126 and further includes means for selecting the asset as one of a pre-rendered asset or a non-rendered asset based on whether the pre-rendered asset is available.

Example 128 includes the apparatus of any of Examples 116 to 127, wherein the listener pose indicates a position of a listener in the immersive audio environment.

Example 129 includes the apparatus of any of Examples 116 to 128, wherein the listener pose indicates a position of a listener and an orientation of the listener in the immersive audio environment.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The foregoing techniques may be performed with respect to any number of different contexts and audio ecosystems. A number of example contexts are described below, although the techniques should not be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based on one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, ambisonics audio data format, on-device rendering, consumer audio, TV, and accessories, and car audio systems.

The broadcast recording audio objects, the professional audio systems, and the consumer on-device capture may all code their output using ambisonics audio format. In this way, the audio content may be coded using the ambisonics audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.).

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the ambisonics coefficients for playback by one or more of the playback elements. For instance, a user of the mobile device may record (acquire a sound field of) a live event (e.g., a meeting, a conference, a play, a concert, etc.), and code the recording into ambisonics coefficients.

The mobile device may also utilize one or more of the playback elements to playback the ambisonics coded sound field. For instance, the mobile device may decode the ambisonics coded sound field and output a signal to one or more of the playback elements that causes the one or more of the playback elements to recreate the sound field. As one example, the mobile device may utilize the wired and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into ambisonics, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of ambisonics signals. For instance, the one or more DAWs may include ambisonics plugins and/or tools which may be configured to operate with (e.g., work with) one or more game audio systems. In some examples, the game studios may output new stem formats that support ambisonics audio data. In any case, the game studios may output coded audio content to the rendering engines which may render a sound field for playback by the delivery systems.

The techniques may also be performed with respect to exemplary audio acquisition devices. For example, the techniques may be performed with respect to an Eigen microphone which may include a plurality of microphones that are collectively configured to record a 3D sound field. In some examples, the plurality of microphones of the Eigen microphone may be located on the surface of a substantially spherical ball with a radius of approximately 4 cm.

Another exemplary audio acquisition context may include a production truck which may be configured to receive a signal from one or more microphones, such as one or more Eigen microphones. The production truck may also include an audio encoder.

The mobile device may also, in some instances, include a plurality of microphones that are collectively configured to record a 3D sound field. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. Moreover, in some examples, headphone playback devices may be coupled to a decoder via either a wired or a wireless connection. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a renderer to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components. This division of components is for illustration only. In an alternate implementation, a function performed by a particular component may be divided amongst multiple components. Moreover, in an alternate implementation, two or more components may be integrated into a single component or module. Each component may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, circuits, and algorithm steps described in connection with the implementations disclosed herein may be implemented as electronic hardware, computer software executed by a processing device such as a hardware processor, or combinations of both. Various illustrative components, blocks, configurations, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:

a memory configured to store audio data associated with an immersive audio environment; and one or more processors configured to:

obtain a listener pose in the immersive audio environment associated with a first time;

determine whether the listener pose is associated with a pre-rendered asset;

obtain a rendered asset by selecting, based on the determination, between obtaining the pre-rendered asset and performing a rendering operation to generate the rendered asset; and generate an output audio signal based on the rendered asset.

2. The device of claim 1, wherein, to perform the rendering operation, the one or more processors are configured to:

obtain a non-rendered asset; and process the non-rendered asset based on the listener pose to generate the rendered asset.

3. The device of claim 2, wherein, to obtain the non-rendered asset, the one or more processors are configured to:

determine whether the non-rendered asset is among the audio data stored at the memory; and retrieve the non-rendered asset from the memory based on a determination that the non-rendered asset is among the audio data stored at the memory.

4. The device of claim 3, wherein the one or more processors are configured to retrieve the non-rendered asset from remote storage based on a determination that the non-rendered asset is not among the audio data stored at the memory.

5. The device of claim 2, wherein, to process the non-rendered asset based on the listener pose, the one or more processors are configured to:

determine sound field characteristics associated with a location of a listener in the immersive audio environment; and apply head-related transfer functions to the sound field characteristics, wherein the head-related transfer functions are based on an orientation of the listener in the immersive audio environment.

6. The device of claim 1, wherein the pre-rendered asset is specific to a particular position of a listener in the immersive audio environment.

7. The device of claim 1, wherein the pre-rendered asset is specific to a particular position of a listener and a particular orientation of the listener in the immersive audio environment.

8. The device of claim 1, wherein the output audio signal includes multiple output audio channels.

9. The device of claim 1, wherein the listener pose is received as a parameter of a seek operation.

10. The device of claim 1, wherein, to obtain the listener pose, the one or more processors are configured to receive pose data from a pose sensor.

11. The device of claim 10, wherein the pose data is associated with a second time prior to the first time, and to obtain the listener pose, the one or more processors are configured to predict the listener pose associated with the first time based on the pose data associated with the second time.

12. The device of claim 1, wherein the one or more processors are configured to perform a seek operation to determine a playout start point for the rendered asset.

13. The device of claim 1, wherein, to generate the output audio signal when the pre-rendered asset is obtained, the one or more processors are configured to binauralize the pre-rendered asset.

14. The device of claim 1, further comprising a modem coupled to the one or more processors, wherein the modem is configured to facilitate communication with a remote device to receive at least a portion of the audio data.

15. A method comprising:

obtaining a listener pose in an immersive audio environment associated with a first time;

determining whether the listener pose is associated with a pre-rendered asset;

obtaining a rendered asset by selecting, based on the determination, between obtaining the pre-rendered asset and performing a rendering operation to generate the rendered asset; and generating an output audio signal based on the rendered asset.

16. The method of claim 15, wherein performing the rendering operation comprises:

determining whether a non-rendered asset is stored locally;

retrieving the non-rendered asset from local storage based on determining that the non-rendered asset is stored locally; and processing the non-rendered asset based on the listener pose to generate the rendered asset.

17. The method of claim 16, further comprising retrieving the non-rendered asset from remote storage based on determining that the non-rendered asset is not stored locally.

18. The method of claim 16, wherein processing the non-rendered asset based on the listener pose includes:

determining sound field characteristics associated with a location of a listener in the immersive audio environment; and applying head-related transfer functions to the sound field characteristics, wherein the head-related transfer functions are based on an orientation of the listener in the immersive audio environment.

19. The method of claim 15, wherein the pre-rendered asset is specific to a particular position of a listener and a particular orientation of the listener in the immersive audio environment.

20. A computer-readable device storing instructions that are executable by one or more processors to cause the one or more processors to:

obtain a listener pose in an immersive audio environment associated with a first time;

determine whether the listener pose is associated with a pre-rendered asset;

obtain a rendered asset by selecting, based on the determination, between obtaining the pre-rendered asset and performing a rendering operation to generate the rendered asset; and generate an output audio signal based on the rendered asset.

* * * * *